US012362924B2

(12) United States Patent
Tie et al.

(10) Patent No.: US 12,362,924 B2
(45) Date of Patent: Jul. 15, 2025

(54) IDENTITY AUTHENTICATION METHOD AND APPARATUS, DEVICE, CHIP, STORAGE MEDIUM, AND PROGRAM

(71) Applicant: CHINA IWNCOMM CO., LTD., Shaanxi (CN)

(72) Inventors: Manxia Tie, Xi'an (CN); Jun Cao, Xi'an (CN); Xiaolong Lai, Xi'an (CN); Xiaorong Zhao, Xi'an (CN); Qin Li, Xi'an (CN); Bianling Zhang, Xi'an (CN); Zhenhai Huang, Xi'an (CN)

(73) Assignee: CHINA IWNCOMM CO., LTD., Shaanxi (CN)

( * ) Notice: Subject to any disclaimer, the term of this patent is extended or adjusted under 35 U.S.C. 154(b) by 177 days.

(21) Appl. No.: 18/259,307

(22) PCT Filed: Dec. 21, 2021

(86) PCT No.: PCT/CN2021/140078
§ 371 (c)(1),
(2) Date: Jun. 26, 2023

(87) PCT Pub. No.: WO2022/135392
PCT Pub. Date: Jun. 30, 2022

(65) Prior Publication Data
US 2024/0064011 A1 Feb. 22, 2024

(30) Foreign Application Priority Data
Dec. 26, 2020 (CN) .......................... 202011569237.3

(51) Int. Cl.
*H04L 9/08* (2006.01)
*H04L 9/32* (2006.01)
(52) U.S. Cl.
CPC .......... *H04L 9/0861* (2013.01); *H04L 9/0838* (2013.01); *H04L 9/3247* (2013.01)

(58) Field of Classification Search
CPC ....................................................... H04L 9/0861
See application file for complete search history.

(56) References Cited

U.S. PATENT DOCUMENTS 8,312,262 B2 * 11/2012 Mauro, II ............. H04L 9/3263
713/176
8,892,869 B2 * 11/2014 Grebovich ............ H04L 9/3265
726/29

(Continued)

FOREIGN PATENT DOCUMENTS

CN 101364875 A 2/2009
CN 101631113 A 1/2010

(Continued)

OTHER PUBLICATIONS

International Search Report in the international application No. PCT/CN2021/140073, mailed on Mar. 1, 2022, 3 pages.

(Continued)

*Primary Examiner* — Simon P Kanaan
(74) *Attorney, Agent, or Firm* — Finch & Maloney PLLC

(57) ABSTRACT

Disclosed in embodiments of the present application are an identity authentication method and apparatus, a device, a chip, a storage medium, and a program. Identify information of a requesting device and an authentication access controller is subjected to confidential processing to prevent the identify information of the requesting device and the authentication access controller from being exposed in a transmission process, so as to ensure that an attacker cannot obtain the private and sensitive information. Moreover, an authentication server is introduced, such that real-time authentication of bidirectional identity between the requesting device (Continued)

and the authentication access controller is achieved while the confidentiality of entity identity related information is guaranteed.

20 Claims, 14 Drawing Sheets

(56) References Cited

U.S. PATENT DOCUMENTS

| | | | |
|---|---|---|---|
| 9,450,944 | B1 | 9/2016 | Sousley |
| 2005/0021968 | A1* | 1/2005 | Zimmer ................ G06F 21/572 713/176 |
| 2005/0283608 | A1* | 12/2005 | Halcrow ............. H04L 63/0823 713/175 |
| 2011/0055561 | A1 | 3/2011 | Lai |
| 2013/0205374 | A1 | 8/2013 | Du |
| 2013/0318588 | A1 | 11/2013 | Metzger |
| 2015/0244695 | A1 | 8/2015 | Lin et al. |
| 2017/0063843 | A1 | 3/2017 | Vijayasankar et al. |
| 2017/0085557 | A1 | 3/2017 | Hu et al. |
| 2017/0155629 | A1 | 6/2017 | Gomi et al. |
| 2018/0124597 | A1 | 5/2018 | Malthankar et al. |
| 2018/0181739 | A1 | 6/2018 | Zhong et al. |
| 2018/0278625 | A1* | 9/2018 | Cammarota .......... H04L 9/3268 |
| 2018/0302395 | A1 | 10/2018 | Tse et al. |
| 2018/0375663 | A1 | 12/2018 | Le Saint . |
| 2019/0158468 | A1 | 5/2019 | Duong |
| 2020/0250670 | A1 | 8/2020 | Capuzzello |

FOREIGN PATENT DOCUMENTS

| | | | |
|---|---|---|---|
| CN | 101631114 | A | 1/2010 |
| CN | 101635709 | A | 1/2010 |
| CN | 101958890 | A | 1/2011 |
| CN | 104009889 | A | 8/2014 |
| CN | 107948189 | A | 4/2018 |
| CN | 109787988 | A | 5/2019 |
| CN | 111314072 | A | 6/2020 |
| JP | 2006350905 | A | 12/2006 |
| JP | 2013544052 | A | 12/2013 |
| JP | 2018530269 | A | 10/2018 |
| RU | 2733828 | C1 | 10/2020 |
| WO | 2011020279 | A1 | 2/2011 |

OTHER PUBLICATIONS

English translation of the Written Opinion of the International Search Authority in the international application No. PCT/CN2021/140073, mailed on Mar. 1, 2022, 4 pages.
Supplementary European Search Report in the European application No. 21909387.9, mailed on Apr. 26, 2024, 6 pages.
National Information Security Standardization Technical Committee), "Information security technology-Entity authentication involving a trusted third party and access architecture specification", (National Standards of the People's Republic of China GB/T 28455-2012), Jun. 29, 2012(Jun. 29, 2012), full text, pp. 1-230.
LI Ming et al., "The Implementation and Application of Trusted Connect Architecture", (Journal of Information Security Research), Apr. 30, 2017, entire document.
International Search Report in the international application No. PCT/CN2021/140097, mailed on Mar. 1, 2022, 3 pages.
English translation of the Written Opinion of the International Search Authority in the international application No. PCT/CN2021/140097, mailed on Mar. 1, 2022, 4 pages.
Supplementary European Search Report in the European application No. 21909394.5, mailed on May 27, 2024, 6 pages.
Notice of Allowance of the Japanese application No. 2023-539136, issued on Jul. 9, 2024,5 pages with English translation.
Notice of Allowance of the Russian application No. 2023119361, issued on Sep. 27, 2023, 46 pages with English translation.
International Search Report in the international application No. PCT/CN2021/140078, mailed on Mar. 22, 2022, 2 pages.
English translation of the Written Opinion of the International Search Authority in the international application No. PCT/CN2021/140078, mailed on Mar. 22, 2022, 3 pages.
Supplementary European Search Report in the European application No. 21909388.7, mailed on Apr. 26, 2024, 6 pages.
Non-Final Office Action of the U.S. Appl. No. 18/259,295, issued on Apr. 9, 2025, 21 pages.
Notice of Allowance of the U.S. Appl. No. 18/259,308, issued on Mar. 17, 2025, 52 pages.

* cited by examiner

IDENTITY AUTHENTICATION METHOD AND APPARATUS, DEVICE, CHIP, STORAGE MEDIUM, AND PROGRAM

CROSS-REFERENCE TO RELATED APPLICATION

This application is a national stage of International Application No. PCT/CN2021/140078, filed on Dec. 21, 2021, which claims priority to Chinese Patent Application No. 202011569237.3, filed on Dec. 26, 2020 and entitled "IDENTITY AUTHENTICATION METHOD AND APPARATUS", the disclosures of which are hereby incorporated by reference in their entireties.

TECHNICAL FIELD

The present application relates to the technical field of network communication security, and in particular, to an identity authentication method and apparatus, and a device, a chip, a storage medium and a program.

BACKGROUND

In a communication network, a Requester (REQ) may access a network through an Authentication Access Controller (AAC). In some conditions which require high security, the AAC performs authentication on an identity of the REQ, and the REQ also performs authentication on an identity of the AAC, to ensure that the REQ accessing the network is a legal user, and the network to which the REQ accesses is a legal network. In addition, a trust relationship is established between different nodes in node-to-node transmission in a blockchain technology. Therefore, the identity authentication for the nodes is also very important.

During the Mutual Identity Authentication (MIA) on the REQ and the AAC, each of the REQ and the AAC provides identity information for identity authentication. However, such identity information usually carries private and sensitive information, such as ID numbers, home addresses, bank card information, geographical location information, and affiliated institution information. During a practical application process, such identity information is generally contained in a physical digital certificate, and the digital certificate is used as a physical identity certificate.

If the identity information is intercepted by an attacker for illegal use during MIA of the REQ and the AAC, a great security risk is caused to the AAC, the REQ and the network.

SUMMARY

The present disclosure provides an identity authentication method and apparatus, and a device, a chip, a storage medium and a program. An authentication server is introduced, which can achieve real-time mutual identity authentication between the REQ and the AAC while the confidentiality of entity identity related information is guaranteed.

A first aspect of an embodiment of the present disclosure provides an identity authentication method. The method includes the following operations.

An authentication access controller (AAC) acquires an identity ciphertext message sent by a requester (REQ). The identity ciphertext message includes identity information ciphertext of the REQ, and the identity information ciphertext of the REQ is obtained by encrypting to-be-encrypted data including a digital certificate of the REQ using a message encryption key.

The AAC sends a first authentication request message to a first Authentication Server (AS) which is trusted by the AAC. The first authentication request message includes identity information ciphertext of the AAC and the digital certificate of the REQ. The identity information ciphertext of the AAC is obtained by encrypting to-be-encrypted data including a digital certificate of the AAC using a public key of an encryption certificate, and the digital certificate of the REQ is obtained by decrypting the identity information ciphertext of the REQ by the AAC using the message encryption key.

The AAC receives a first authentication response message sent by the first AS. The first authentication response message includes first authentication result information ciphertext, a first digital signature, second authentication result information and a second digital signature. The first authentication result information ciphertext is obtained by encrypting information including first authentication result information. The first authentication result information includes a first verification result for the digital certificate of the AAC. The first digital signature is a digital signature which is generated by calculating, by a second AS trusted by the REQ, to-be-signed data including the first authentication result information ciphertext. The second authentication result information includes a second verification result for the digital certificate of the REQ, and the second digital signature is a digital signature which is generated by calculating, by the first AS, to-be-signed data including the second authentication result information.

The AAC verifies the second digital signature by using a public key of the first AS. In response to the verification being successful, the AAC determines an identity authentication result for the REQ according to the second verification result in the second authentication result information. When the AAC determines that the identity authentication result for the REQ indicates that the REQ is legal, a third authentication response message is sent to the REQ.

Alternatively, the AAC verifies the second digital signature by using the public key of the first AS. In response to the verification being successful, the AAC sends the third authentication response message to the REQ and determining the identity authentication result for the REQ according to the second verification result in the second authentication result information.

Alternatively, the AAC verifies the second digital signature by using the public key of the first AS. In response to the verification for the second digital signature being successful, the AAC determines the identity authentication result for the REQ according to the second verification result in the second authentication result information. The AAC sends the third authentication response message to the REQ.

The third authentication response message includes authentication result information ciphertext. The authentication result information ciphertext is generated by encrypting to-be-encrypted data including the first authentication result information ciphertext and the first digital signature using the message encryption key.

After receiving the third authentication response message, the REQ decrypts the authentication result information ciphertext using the message encryption key, to obtain the first authentication result information ciphertext and the first digital signature. The REQ verifies the first digital signature by using a public key of the second AS. In response to the verification being successful, the REQ determines an identity authentication result for the AAC according to the first verification result in the first authentication result information that is obtained by decrypting the first authentication result information ciphertext.

A second aspect of an embodiment of the present disclosure provides an AAC. The AAC includes an acquiring portion, a first sending portion, a first receiving portion, and a first verifying portion.

The acquiring portion is configured to acquire an identity ciphertext message sent by a requester (REQ). The identity ciphertext message includes identity information ciphertext of the REQ, and the identity information ciphertext of the REQ is obtained by encrypting to-be-encrypted data including a digital certificate of the REQ using a message encryption key.

The first sending portion is configured to send a first authentication request message to a first Authentication Server (AS) which is trusted by the AAC. The first authentication request message includes the identity information ciphertext of the AAC and the digital certificate of the REQ. The identity information ciphertext of the AAC is obtained by encrypting to-be-encrypted data including a digital certificate of the AAC using a public key of an encryption certificate, and the digital certificate of the REQ is obtained by decrypting the identity information ciphertext of the REQ by the AAC using the message encryption key.

The first receiving portion is configured to receive a first authentication response message sent by the first AS. The first authentication response message includes first authentication result information ciphertext, a first digital signature, second authentication result information and a second digital signature. The first authentication result information ciphertext is obtained by encrypting information including first authentication result information. The first authentication result information includes a first verification result for the digital certificate of the AAC. The first digital signature is a digital signature which is generated by calculating, by a second AS trusted by the REQ, to-be-signed data including the first authentication result information ciphertext. The second authentication result information includes a second verification result for the digital certificate of the REQ, and the second digital signature is a digital signature which is generated by calculating, by the first AS, to-be-signed data including the second authentication result information.

The first verifying portion is configured to verify the second digital signature by using a public key of the first AS. In response to the verification being successful, a first determining portion is configured to determine an identity authentication result for the REQ according to the second verification result in the second authentication result information. When the first determining portion determines that the identity authentication result for the REQ indicates that the REQ is legal, a second sending portion is configured to send a third authentication response message to the REQ.

Alternatively, the first verifying portion is configured to verify the second digital signature by using the public key of the first AS. In response to the verification being successful, the second sending portion is configured to send the third authentication response message to the REQ, and the first determining portion is configured to determine the identity authentication result for the REQ according to the second verification result in the second authentication result information.

Alternatively, the first verifying portion is configured to verify the second digital signature by using the public key of the first AS. In response to the verification for the second digital signature being successful, the first determining portion is configured to determine the identity authentication result for the REQ according to the second verification result in the second authentication result information. The second sending portion is configured to send the third authentication response message to the REQ.

The third authentication response message includes authentication result information ciphertext. The authentication result information ciphertext is generated by encrypting to-be-encrypted data including the first authentication result information ciphertext and the first digital signature using the message encryption key.

A third aspect of an embodiment of the present disclosure provides a requester (REQ). The REQ includes a sending portion, a first receiving portion, a first decrypting portion, a first verifying portion, and a first determining portion.

The sending portion is configured to send an identity ciphertext message to an AAC. The identity ciphertext message includes identity information ciphertext of the REQ, and the identity information ciphertext of the REQ is obtained by encrypting to-be-encrypted data including a digital certificate of the REQ using a message encryption key.

The first receiving portion is configured to receive a third authentication response message sent by the AAC. The third authentication response message includes authentication result information ciphertext, and the authentication result information ciphertext is generated by encrypting to-be-encrypted data including first authentication result information ciphertext and a first digital signature using the message encryption key. The first authentication result information ciphertext is obtained by encrypting information including first authentication result information. The first authentication result information includes a first verification result for a digital certificate of the AAC.

The first decrypting portion is configured to decrypt the authentication result information ciphertext using the message encryption key, to obtain the first authentication result information ciphertext and the first digital signature.

The first verifying portion is configured to verify the first digital signature by using a public key of a second AS.

The first determining portion is configured to, in response to the verification for the first digital signature being successful, determine an identity authentication result for the AAC according to the first verification result in the first authentication result information that is obtained by decrypting the first authentication result information ciphertext.

A fourth aspect of an embodiment of the present disclosure provides a first authentication server (AS). The first AS is an AS trusted by an AAC, and includes a first receiving portion and a first sending portion.

The first receiving portion is configured to receive a first authentication request message sent by the AAC. The first authentication request message includes identity information ciphertext of the AAC and a digital certificate of an REQ. The identity information ciphertext of the AAC is generated by encrypting to-be-encrypted data including a digital certificate of the AAC using a public key of an encryption certificate.

The first sending portion is configured to send a first authentication response message to the AAC. The first authentication response message includes first authentication result information ciphertext, a first digital signature, second authentication result information and a second digital signature. The first authentication result information ciphertext is obtained by encrypting information including first authentication result information. The first authentication result information includes a first verification result for the digital certificate of the AAC. The first digital signature is a digital signature which is generated by calculating, by a second AS trusted by the REQ, to-be-signed data including the first authentication result information ciphertext. The second authentication result information includes a second verification result for the digital certificate of the REQ, and the second digital signature is a digital signature which is generated by calculating, by the first AS, to-be-signed data including the second authentication result information.

A fifth aspect of an embodiment of the present disclosure provides a second authentication server (AS). The second AS is an AS trusted by an REQ. If a first AS trusted by an AAC and the second AS trusted by the REQ are different ASs, the second AS includes a receiving portion, a first verifying portion, a second verifying portion, a generating portion, and a sending portion.

The receiving portion is configured to receive a second authentication request message sent by the first AS. The second authentication request message includes first authentication result information ciphertext, a digital certificate of the REQ, and a third digital signature of the first AS. The third digital signature is a digital signature which is generated by calculating, by the first AS, to-be-signed data including the first authentication result information ciphertext and the digital certificate of the REQ.

The first verifying portion is configured to verify the third digital signature.

The second verifying portion is configured to, in response to the verification for the third digital signature being successful, perform legality verification on the digital certificate of the REQ, to obtain a second verification result.

The generating portion is configured to generate second authentication result information according to information including the second verification result.

The sending portion is configured to send a second authentication response message to the first AS. The second authentication response message includes the first authentication result information ciphertext, a first digital signature, the second authentication result information and a fourth digital signature. The first digital signature is a digital signature which is generated by calculating, by the second AS, to-be-signed data including the first authentication result information ciphertext, and the fourth digital signature is a digital signature which is generated by calculating, by the second AS, to-be-signed data including the second authentication result information.

A sixth aspect of an embodiment of the present disclosure provides an authentication access control (AAC). The AAC includes a processor and a memory. The memory is configured to store a computer program, and the processor is configured to call and run the computer program stored in the memory, to execute operations which are executed by the AAC in the identity authentication method as described in the first aspect.

A seventh aspect of an embodiment of the present disclosure provides a requester (REQ). The REQ includes a processor and a memory. The memory is configured to store a computer program, and the processor is configured to call and run the computer program stored in the memory, to execute operations which are executed by the REQ in the identity authentication method as described in the first aspect.

An eighth aspect of an embodiment of the present disclosure provides a first authentication server (AS). The first AS is an AS trusted by an AAC, and includes a processor and a memory. The memory is configured to store a computer program, and the processor is configured to call and run the computer program stored in the memory, to execute operations which are executed by the first AS in the identity authentication method as described in the first aspect.

A ninth aspect of an embodiment of the present disclosure provides a second authentication server (AS). The second AS is an AS trusted by an REQ. If a first AS trusted by an AAC and the second AS trusted by the REQ are different ASs, the second AS includes a processor and a memory. The memory is configured to store a computer program, and the processor is configured to call and run the computer program stored in the memory, to execute operations which are executed by the second AS in the identity authentication method as described in the first aspect.

A tenth aspect of an embodiment of the present disclosure provides a chip. The chip includes: a processor configured to call and run a computer program from a memory, to enable an AAC installed with the chip to execute operations which are executed by the AAC in the identity authentication method as described in the first aspect, or enable a Requester (REQ) installed with the chip to execute operations which are executed by the REQ in the identity authentication method as described in the first aspect, or enable a first AS installed with the chip to execute operations which are executed by the first AS in the identity authentication method as described in the first aspect, enable a second AS installed with the chip to execute operations which are executed by the second AS in the identity authentication method as described in the first aspect.

An eleventh aspect of an embodiment of the present disclosure provides a computer storage medium. The computer storage medium is configured to store a computer program. The computer program enables an AAC to execute operations which are executed by the AAC in the identity authentication method as described in the first aspect, or enables an REQ to execute operations which are executed by the REQ in the identity authentication method as described in the first aspect, or enables a first AS to execute operations which are executed by the first AS in the identity authentication method as described in the first aspect, or enables a second AS to execute operations which are executed by the second AS in the identity authentication method as described in the first aspect.

A twelfth aspect of an embodiment of the present application provides a computer program. The computer program enables an AAC to execute operations which are executed by the AAC in the identity authentication method as described in the first aspect, or enables an REQ to execute operations which are executed by the REQ in the identity authentication method as described in the first aspect, or enables a first AS to execute operations which are executed by the first AS in the identity authentication method as described in the first aspect, or enables a second AS to execute operations which are executed by the second AS in the identity authentication method as described in the first aspect.

From the above technical solutions, identify information of the REQ and the AAC is subject to confidential processing, to prevent the identify information of the REQ and the AAC from being exposed during a transmission process, thereby avoiding an attacker from obtaining private and sensitive information. Moreover, an authentication server is introduced, thereby achieving real-time mutual identity authentication between the REQ and the AAC while the confidentiality of entity identity related information is guaranteed. This can provides the foundation for communication only between a legal user and a legal network.

In order to make the above purposes, features and advantages of the present disclosure more obvious and easier to understand, detailed descriptions of preferred embodiments are made below with reference to the drawings.

BRIEF DESCRIPTION OF THE DRAWINGS

In order to more clearly illustrate the embodiments of the present disclosure or the technical solutions in the prior art, the drawings used in the description of the embodiments or the prior art will be briefly described below. It is apparent that the drawings in the following descriptions are merely some embodiments of the present disclosure. Other drawings can be obtained from those skilled in the art according to these drawings without any creative work.

DETAILED DESCRIPTION

Figure 1:
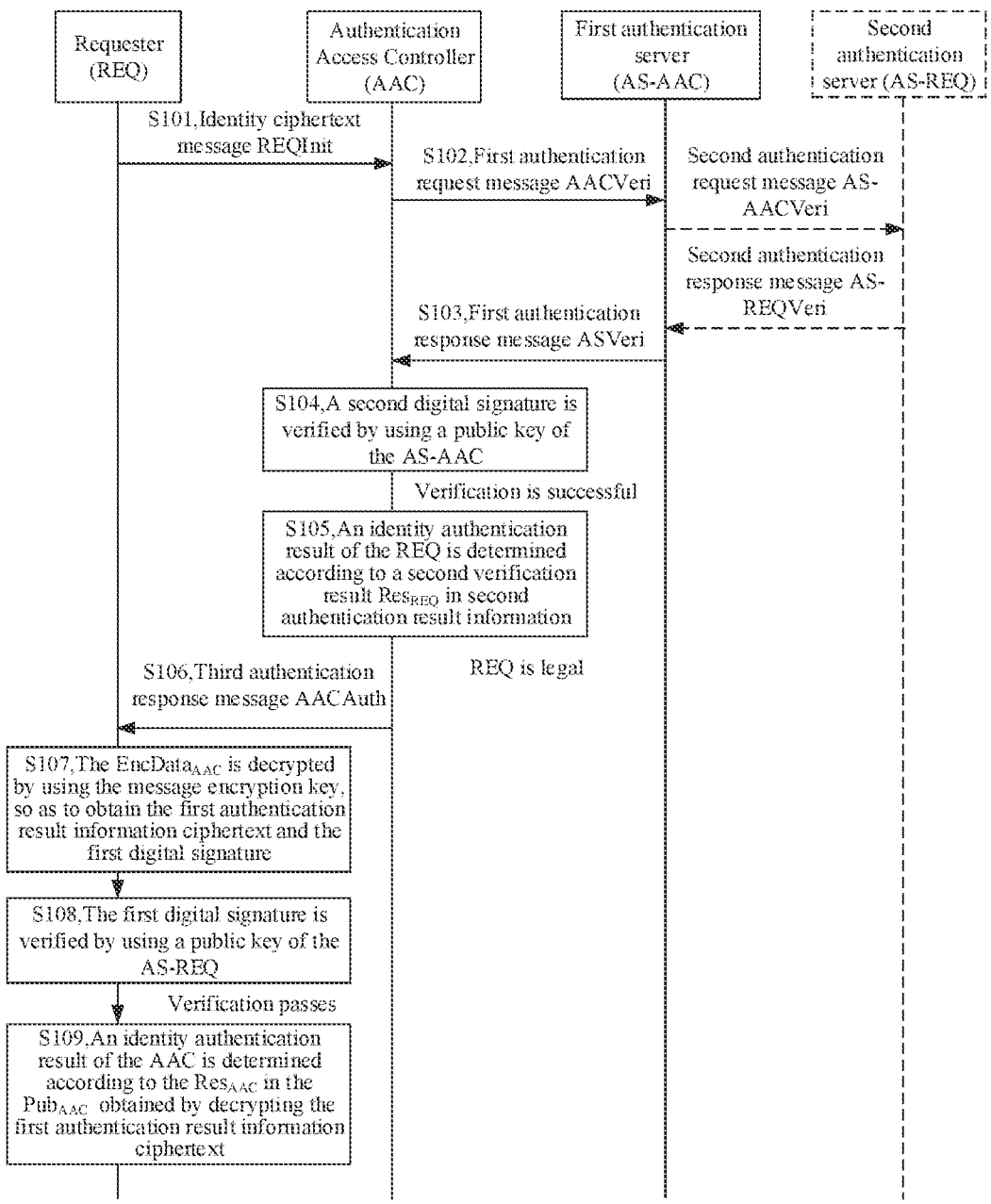
FIG. 1 is a schematic diagram of an identity authentication method according to an embodiment of the present disclosure.

The technical solutions in the embodiments of the present disclosure will be described below with reference to the drawings in the embodiments of the present disclosure. It is apparent that the described embodiments are only a part of the embodiments of the present disclosure, rather than all the embodiments. All other embodiments obtained by those of ordinary skill in the art on the basis of the embodiments in the present disclosure without creative work all fall within the scope of protection of the present application.

The technical solutions described in the embodiments of the present disclosure may be arbitrarily combined without conflict.

In a communication network, a requester (REQ) may access a network through an authentication access controller (AAC). In order to ensure that a legal user accesses a legal network, the AAC performs identity authentication on the REQ, and the REQ performs identity authentication on the AAC.

By using a current wireless communication and mobile communication scenario as an example, in a scenario that the REQ accesses a wireless network through the AAC, the REQ may be a terminal device such as a mobile phone, a Personal Digital Assistant (PDA) and a tablet computer, and the AAC may be a network-side device such as a wireless access point and a wireless router. In a scenario that the REQ accesses a wired network through the AAC, the REQ may be the terminal device such as a desktop computer and a notebook computer; and the AAC may be the network-side device such as a switch and a router. In a scenario that the REQ accesses a 4th/5th Generation mobile communication technology (4G/5G) network through the AAC, the REQ may be the terminal device such as the mobile phone and the tablet computer, and the AAC may be the network-side device such as a base station. Definitely, the present disclosure is also suitable for various data communication scenarios such as other wired networks and short-range communication networks.

However, during Mutual Identity Authentication (MIA) on the REQ and the AAC, each of the REQ and the AAC provides identity information. For example, the identity information of the REQ may be included in a digital certificate of the REQ, and the identity information of the AAC may be included in a digital certificate of the AAC. If an attacker intercepts such digital certificates during identity authentication, the attacker acquires private and sensitive information for illegal use, causing great security risk to the AAC, the REQ and even the network.

In order to solve the above technical problems, an embodiment of the present disclosure provides an identity authentication method. An AAC acquires an identity ciphertext message sent by an REQ. The identity ciphertext message includes identity information ciphertext of the REQ, and the identity information ciphertext of the REQ is obtained by encrypting to-be-encrypted data including a digital certificate of the REQ using a message encryption key. The AAC sends a first authentication request message to a first authentication server (AS) which is trusted by the AAC. The first authentication request message includes the identity information ciphertext of the AAC and the digital certificate of the REQ. The identity information ciphertext of the AAC is obtained by encrypting to-be-encrypted data including a digital certificate of the AAC by the AAC using a public key of an encryption certificate, and the digital certificate of the REQ is obtained by decrypting the identity information ciphertext of the REQ by the AAC using the message encryption key. The AAC receives a first authentication response message sent by the first AS. The first authentication response message includes first authentication result information ciphertext, a first digital signature, second authentication result information and a second digital signature. The first authentication result information ciphertext is obtained by encrypting information including first authentication result information. The first authentication result information includes a first verification result for the digital certificate of the AAC. The first digital signature is a digital signature which is generated by calculating, by a second AS trusted by the REQ, to-be-signed data including the first authentication result information ciphertext. The second authentication result information includes a second verification result for the digital certificate of the REQ, and the second digital signature is a digital signature which is generated by calculating, by the first AS, to-be-signed data including the second authentication result information. The AAC verifies the second digital signature by using a public key of the first AS. In response to the verification being successful, the identity authentication result for the REQ is determined according to the second verification result in the second authentication result information. When the AAC determines that the REQ is legal, the AAC sends a third authentication response message to the REQ. The third authentication response message includes authentication result information ciphertext. The authentication result information ciphertext is generated by encrypting to-be-encrypted data including first authentication result information ciphertext and a first digital signature using the message encryption key. The REQ decrypts the authentication result information ciphertext using the message encryption key, to obtain the first authentication result information ciphertext and the first digital signature, verifies the first digital signature by using the public key of the second AS, and after the verification is successful, determines an identity authentication result for the AAC according to the first verification result in the first authentication result information that is obtained by decrypting the first authentication result information ciphertext.

It is understandable that, the first authentication result information mentioned in this embodiment of the present disclosure is obtained by performing, by the first AS trusted by the AAC, legality verification on the digital certificate of the AAC. The second authentication result information is obtained by performing, by the second AS trusted by the REQ, legality verification on the digital certificate of the REQ. The above first AS and the second AS may be two independent servers for identity authentication, or the same server for identity authentication. The above are only some examples of the REQ, the AAC and the AS, and shall not be understood as limitations to the REQ, the AAC and the AS. In other possible implementations of the embodiments of the present application, the REQ, the AAC and the AS may be other devices.

The identity authentication method provided in the embodiments of the present disclosure is used for implementing mutual identity authentication (MIA) between the REQ and the AAC.

For ease of introduction, in the embodiments of the present disclosure, the identity authentication method of the present disclosure is introduced by taking the REQ, the AAC and the AS as examples.

The AS trusted by the AAC is called a first AS AS-AAC, and the AS trusted by the REQ is called a second AS AS-REQ. The AS-AAC has the capability of verifying the legality of a digital certificate of the AAC, and the AS-AAC has the digital certificate complying with regulations of ISO/IEC 9594-8/ITU X.509, other standards or other technical systems, and a private key corresponding to the digital certificate. The AS-REQ has the capability of verifying the legality of the digital certificate of the REQ, and the AS-REQ also has the digital certificate complying with regulations of ISO/IEC 9594-8/ITU X.509, other standards or other technical systems, and a private key corresponding to the digital certificate. The AS-AAC and the AS-REQ can transmit the digital certificate to other ASs for verification, and can also transmit verification result information of the digital certificate to other ASs. When the AS-AAC is different from the AS-REQ, the AS-AAC and the AS-REQ are trusted with each other, and know the digital certificate or the public key in the digital certificate with each other. A Certificate Sever-Decrypt (CS-DEC) has an encryption certificate complying with regulations of ISO/IEC 9594-8/ITU X.509, other standards or other technical systems, and a private key corresponding to the encryption certificate. The CS-DEC may be an independent server, or may reside in the AS-AAC.

The REQ may be one endpoint involved in an identity authentication process, and establishes a connection with the AAC, accesses services provided by the AAC, and accesses the AS through the AAC. The REQ has the digital certificate complying with regulations of ISO/IEC 9594-8/ITU X.509, other standards or other technical systems, and a private key corresponding to the digital certificate, and knows the digital certificate of the AS-REQ or the public key in the digital certificate. The AAC may be the other endpoint involved in the identity authentication process, establishes a connection with the REQ, provides services to the REQ, communicates with the REQ, and may directly access the AS-AAC. The AAC has the digital certificate complying with regulations of ISO/IEC 9594-8/ITU X.509, other standards or other technical systems, and a private key corresponding to the digital certificate, knows the digital certificate of the AS-AAC or the public key in the digital certificate, and knows the encryption certificate of the CS-DEC or the public key in the encryption certificate.

The identity authentication method provided in the embodiments of the present disclosure is described below in combination with FIG. 1. The method includes the following operations S101 to S109.

At S101, an authentication access controller (AAC) acquires an identity ciphertext message REQInit sent by a requester (REQ).

The REQInit includes identity information ciphertext $EncData_{REQ}$ of the REQ. The $EncData_{REQ}$ is generated by encrypting to-be-encrypted data including a digital certificate $Cert_{REQ}$ of the REQ by the REQ using a message encryption key with a symmetric encryption algorithm. During the transmission of the identity information between the REQ and the AAC, the identity information of the REQ is subjected to confidential processing, to prevent the identity information of the REQ from being exposed during transmission. The message encryption key may be obtained by negotiation between the REQ and the AAC, or may be shared by the REQ and the AAC in advance. How to negotiate the message encryption key between the REQ and the AAC is introduced later. In the present disclosure, an object to be encrypted is called the to-be-encrypted data.

At S102, the AAC sends a first authentication request message AACVeri to an AS-AAC trusted by the AAC.

The AACVeri includes identity information ciphertext $EncPub_{AS}$ of the AAC and the $Cert_{REQ}$. The $EncPub_{AS}$ is generated by encrypting to-be-encrypted data including a digital certificate $Cert_{AAC}$ of the AAC through the AAC using a public key of an encryption certificate. Therefore, during the transmission of the identity information between the AAC and the AS-AAC, the identity information of the AAC is subjected to confidential processing, to prevent the identity information of the AAC from being exposed during transmission. The $Cert_{REQ}$ is obtained by decrypting the $EncData_{REQ}$ through the AAC using the message encryption key with the symmetric encryption algorithm after the AAC receives the $EncData_{REQ}$ sent by the REQ.

It is to be noted that, the $EncPub_{AS}$ may be decrypted by the AS-AAC using the private key corresponding to the encryption certificate, or may be decrypted in a case that the AS-AAC sends the $EncPub_{AS}$ to the CS-DEC having an interaction and trust relationship with the AS-AAC. The CS-DEC may be an independent server dedicated to certificate decryption, or may be integrated in an AS to execute decryption. For example, in this embodiment, the CS-DEC may reside in the AS-AAC.

At S103, the AAC receives a first authentication response message ASVeri sent by the AS-AAC.

The ASVeri includes first authentication result information ciphertext, a first digital signature, second authentication result information and a second digital signature. The first authentication result information ciphertext is obtained by encrypting information including first authentication result information $Pub_{AAC}$. The $Pub_{AAC}$ includes a first verification result $Res_{AAC}$ for the $Cert_{AAC}$. The first digital signature is a digital signature which is generated by calculating, by the AS-REQ trusted by the REQ, to-be-signed data including the first authentication result information ciphertext. The second authentication result information $Pub_{REQ}$ includes a second verification result $Res_{REQ}$ for the $Cert_{REQ}$, and the second digital signature is a digital signature which is generated by calculating, by the AS-AAC, to-be-signed data including the $Pub_{REQ}$.

It is to be noted that, when the AS-REQ and the AS-AAC are the same AS, that is, both the REQ and the AAC trust the same AS (non-roaming), the AS trusted by both the REQ and the AAC may be represented by the AS-AAC (or the AS-REQ). In this case, the AS-AAC (or the AS-REQ) may perform legality verification on the $Cert_{AAC}$ that is obtained by decrypting the $EncPub_{AS}$ to obtain a first verification result $Res_{AAC}$, and perform legality verification on the $Cert_{REQ}$ to obtain a second verification result $Res_{REQ}$. The $Pub_{AAC}$ is generated according to the information including the $Res_{AAC}$, and is encrypted, to obtain the first authentication result information ciphertext. The $Pub_{REQ}$ is generated according to the information including the $Res_{REQ}$. The first digital signature $Sig_{AS\_AAC1}$ (which may also be represented as $Sig_{AS\_REQ1}$) is generated by calculating the to-be-signed data including the first authentication result information ciphertext. The second digital signature $Sig_{AS\_ACC2}$ (which may also be represented as $Sig_{AS\_REQ2}$) is generated by calculating to-be-signed data including the second authentication result information $Pub_{REQ}$. The first authentication response message ASVeri is generated according to information including the first authentication result information ciphertext, the $Sig_{AS\_AAC1}$ (which may also be represented as the $Sig_{AS\_REQ1}$), the second authentication result information $Pub_{REQ}$ and the $Sig_{AS\_AAC2}$ (which may also be represented as the $Sig_{AS\_REQ2}$). The ASVeri is sent to the AAC.

The manner of encrypting and decrypting the first authentication result information ciphertext may be set in advance. For example, the AAC may generate a key for encrypting the $Pub_{AAC}$ in advance, and then send the key to the AS-AAC by the $EncPub_{AS}$. The AS-AAC may encrypt the information including the $Pub_{AAC}$ using the key, to obtain the first authentication result information ciphertext. As an implementation, the key for encrypting the $Pub_{AAC}$ that is generated by the AAC may be a second protection nonce $Non-ce_{AACPub}$. The AS-AAC encrypts the information including the $Pub_{AAC}$ using the $Nonce_{AACPub}$. For example, an exclusive or operation (XOR) may be performed on the $Nonce_{AACPub}$ and the $Pub_{AAC}$, to obtain the first authentication result information ciphertext $Pub_{AAC} \oplus Nonce$.

In the case that the AS-REQ trusted by the REQ and the AS-AAC trusted by the AAC are different ASs (roaming), after the AS-AAC receives the AACVeri, the AS-AAC performs legality verification on the $Cert_{AAC}$ that is obtained by decrypting the $EncPub_{AS}$ to obtain the $Res_{AAC}$, generates the first authentication result information $Pub_{AAC}$ according to the information including the $Res_{AAC}$, encrypting the $Pub_{AAC}$ to generate the first authentication result information ciphertext, and sends a second authentication request message AS-AACVeri to the AS-REQ. The AS-AACVeri includes the first authentication result information ciphertext, the $Cert_{REQ}$ and a third digital signature $Sig_{AS\_AAC3}$. The $Sig_{AS\_AAC3}$ is a digital signature generated by calculating, by the AS-AAC, the to-be-signed data including the first authentication result information ciphertext and the $Cert_{REQ}$ in the AS-AACVeri. The AS-REQ verifies the $Sig_{AS\_AAC3}$ by using the public key of the AS-AAC. If the verification is successful, legality verification is performed on the $Cert_{REQ}$, to obtain the second verification result $Res_{REQ}$. The second authentication result information $Pub_{REQ}$ is generated according to the information including the $Res_{REQ}$, and a second authentication response message AS-REQVeri is sent to the AS-AAC. The AS-REQVeri includes the first authentication result information ciphertext, the first digital signature $Sig_{AS\_REQ1}$, the $Pub_{REQ}$ and a fourth digital signature $Sig_{AS\_REQ4}$. The $Sig_{AS\_REQ4}$ is a digital signature, which is generated by calculating, by the AS-REQ, to-be-signed data including the $Pub_{REQ}$. The $Sig_{AS\_REQ1}$ is a digital signature which is generated by calculating, by the AS-REQ, to-be-signed data including the first authentication result information ciphertext. After receiving the AS-REQVeri, the AS-AAC verifies the $Sig_{AS\_REQ4}$ by using the public key of the AS-REQ. If the verification is successful, the AS-AAC calculates the to-be-signed data including the $Pub_{REQ}$, to generate the second digital signature $Sig_{AS\_AAC2}$, generates the first authentication response message ASVeri according to information including the first authentication result information ciphertext, the $Sig_{AS\_REQ1}$, the second authentication result information $Pub_{REQ}$ and the $Sig_{AS\_AAC2}$. The ASVeri is sent to the AAC.

At S104, the AAC verifies the second digital signature by using the public key of the AS-AAC.

At S105, the AAC determines an identity authentication result for the REQ according to the second verification result $Res_{REQ}$ in the second authentication result information $Pub_{REQ}$.

Since whether the REQ is legal can be indicated by the $Res_{REQ}$, the AAC may determine, according to the $Res_{REQ}$ in the second authentication result information $Pub_{REQ}$, whether the REQ is legal, for ensuring that only a legal REQ can access a network.

At S106, the AAC sends a third authentication response message AACAuth to the REQ.

The AACAuth includes authentication result information ciphertext $EncData_{AAC}$. The $EncData_{AAC}$ is generated by encrypting to-be-encrypted data including the first authentication result information ciphertext and the first digital signature by the AAC by using the message encryption key.

It is to be noted that, the order of executing S104 to S106 does not affect the implementation of the present disclosure. In practical applications, the order of executing S104 to S106 may be set according to requirements. Preferably, it is recommended that S104 is executed first, and when the verification of the AAC for the second digital signature is failed, the ASVeri is discarded. When the verification of the AAC for the second digital signature is successful, S105 is executed. When the AAC determines that the REQ is legal, S106 is executed. When the AAC determines that the REQ is illegal, the AAC selects, according to a local policy, whether to execute S106. Considering the efficiency, the preferred solution is not to perform S106 and this authentication process is ended.

At S107, the REQ decrypts the $EncData_{AAC}$ by using the message encryption key, to obtain the first authentication result information ciphertext and the first digital signature.

Since the message encryption key may be negotiated between the REQ and the AAC, or may be shared by the REQ and the AAC in advance, after receiving the AACAuth, the REQ may decrypt the $EncData_{AAC}$ by using the message encryption key, to obtain the first authentication result information ciphertext and the first digital signature.

At S108, the REQ verifies the first digital signature by using the public key of the AS-REQ.

Since the first digital signature is a digital signature generated by calculating, by the AS-REQ, to-be-signed data including the first authentication result information ciphertext, and the REQ knows the public key of the AS-REQ trusted by the REQ, the REQ may verify the first digital signature by using the public key of the AS-REQ. S109 is executed if the verification is successful. The AACAuth is discarded if the verification is failed.

At S109, the REQ determines an identity authentication result for the AAC according to the first verification result $Res_{AAC}$ in the first authentication result information obtained by decrypting the first authentication result information ciphertext.

The REQ may decrypt the first authentication result information ciphertext according to a preset encryption and decryption manners. It can also be used as an example of S103, the first authentication result information ciphertext is generated by encrypting the first authentication result information by the AS-AAC using the second protection nonce. In this case, the to-be-encrypted data of the $EncData_{AAC}$ sent to the REQ by the AAC in S106 further includes the second protection nonce, and the REQ decrypts the $EncData_{AAC}$ by using the message encryption key, to obtain the second protection nonce, and decrypts the first authentication result information ciphertext using the second protection nonce, to obtain the first authentication result information.

Since the $Res_{AAC}$ may indicate whether the AAC is legal, the REQ may determine, according to the $Res_{AAC}$ in the first authentication result information obtained by decryption, whether the AAC is legal, for ensuring that the REQ can access a legal network.

From the above technical solutions, it can be seen that, identify information of the REQ and the AAC is subject to confidential processing, to prevent the identify information of the REQ and the AAC from being exposed during a network access process, thereby avoiding an attacker from obtaining private and sensitive information of the REQ and the AAC. Moreover, the authentication server is introduced, thereby achieving real-time mutual identity authentication between the REQ and the AAC while the confidentiality of entity identity related information is guaranteed. This can provides the foundation for communication only between a legal user and a legal network.

In some embodiments, the REQInit of S101 may further include a digital signature $Sig_{REQ}$ of the REQ. The to-be-signed data of the $Sig_{REQ}$ includes other fields ahead of the $Sig_{REQ}$ in the REQInit. Before S105, the AAC further determines whether the verification of the $Sig_{REQ}$ is successful, and S105 can only be executed when the verification is successful. It is to be noted that, if the AS-REQ and the AS-AAC are the same AS, the $Sig_{REQ}$ may be verified by the AS-AAC (which may also be represented as the AS-REQ), or may be verified by the AAC. If the AS-REQ and the AS-AAC are different ASs, the $Sig_{REQ}$ may be verified by the AS-REQ, or may be verified by the AAC. The AAC determines, in the following manners, whether the verification of the $Sig_{REQ}$ is successful.

In an embodiment of verifying the $Sig_{REQ}$ by the AS, in a case that the AS-REQ and the AS-AAC are the same AS (non-roaming), when the AS-AAC (which may also be represented as the AS-REQ) verifies the $Sig_{REQ}$, the $Sig_{REQ}$ may be carried in the AACVeri in S102 and is transmitted to the AS-AAC (which may also be represented as the AS-REQ), and the AS-AAC (which may also be represented as the AS-REQ) verifies the $Sig_{REQ}$ by using the $Cert_{REQ}$ in the AACVeri. If the verification is successful, operations of generating and sending the first authentication response message ASVeri are continued to be executed. If the verification is failed, the operations of generating and sending the first authentication response message ASVeri are not executed. Therefore, the AAC may determine, depending on whether the ASVeri can be received, whether the verification for the $Sig_{REQ}$ is successful. If the ASVeri can be received by the AAC, the AAC determines that the verification for the $Sig_{REQ}$ is successful.

In another embodiment of verifying the $Sig_{REQ}$ by the AS, in a case that the AS-REQ and the AS-AAC are different ASs (roaming), when the AS-REQ verifies the $Sig_{REQ}$, the $Sig_{REQ}$ may be carried in the AACVeri in S102 and the second authentication request message AS-AACVeri sent to the AS-REQ by the AS-AAC, and then transmitted to the AS-REQ. The AS-REQ verifies the $Sig_{REQ}$ by using the $Cert_{REQ}$ in the AS-AACVeri. If the verification is successful, the operations of generating and sending the second authentication response message AS-REQVeri and generating the subsequent first authentication response message ASVeri are then executed. If the verification is failed, the operations of generating and sending the second authentication response message AS-REQVeri and generating the subsequent first authentication response message ASVeri are not executed. Therefore, the AAC may determine, depending on whether the ASVeri can be received, whether the verification of the $Sig_{REQ}$ is successful. If the ASVeri can be received by the AAC, the AAC determines that the verification for the $Sig_{REQ}$ is successful.

In an embodiment of verifying the $Sig_{REQ}$ by the AAC, the AAC may verify the $Sig_{REQ}$ by using the $Cert_{REQ}$ obtained by decrypting the $EncData_{REQ}$ in the REQInit of S101, to determine whether the verification of the $Sig_{REQ}$ is successful.

In another embodiment of verifying the $Sig_{REQ}$ by the AAC, the second authentication result information $Pub_{REQ}$ generated by the AS may further include the $Cert_{REQ}$. After receiving the ASVeri of S103, the AAC verifies the $Sig_{REQ}$ by using the $Cert_{REQ}$ in the $Pub_{REQ}$, to determine whether the verification of the $Sig_{REQ}$ is successful.

In another embodiment of verifying the $Sig_{REQ}$ by the AAC, the second authentication result information $Pub_{REQ}$ generated by the AS may further include the $Cert_{REQ}$. After receiving the ASVeri of S103, the AAC verifies whether the $Cert_{REQ}$ in the $Pub_{REQ}$ is consistent with the $Cert_{REQ}$ obtained by decrypting the $EncData_{REQ}$ at first, and if they are consistent with each other, the AAC verifies the $Sig_{REQ}$ by using the $Cert_{REQ}$, to determine whether the verification of the $Sig_{REQ}$ is successful.

In some embodiments, the AACVeri of S102 may further include a digital signature $Sig_{AAC}$ of the AAC, and to-be-signed data of the $Sig_{AAC}$ includes other fields head of the $Sig_{AAC}$ in the AACVeri. Before S109, the REQ further determines whether the verification of the $Sig_{AAC}$ is successful, and S109 can only be executed when the verification is successful. The REQ determines, by the following manners, whether the verification of the $Sig_{AAC}$ is successful. The AS-AAC trusted by the AAC verifies the $Sig_{AAC}$ by using the $Cert_{AAC}$ obtained by decrypting the identity information ciphertext $EncPub_{AS}$ of the AAC in the AACVeri, and performs subsequent processes only after the verification is successful. Therefore, if the AACAuth of S106 is received by the REQ, the REQ determines that the verification for the $Sig_{AAC}$ is successful.

Similarly, the AACAuth of S106 may further include the digital signature $Sig_{AAC}$ of the AAC. The to-be-signed data of the $Sig_{AAC}$ includes other fields ahead of the $Sig_{AAC}$ in the AACAuth, and the first authentication result information $Pub_{AAC}$ generated by the AS-AAC further includes the $Cert_{AAC}$. Correspondingly, before S109, the REQ further determines whether the verification for the $Sig_{AAC}$ is successful, and S109 can only be executed when the verification is successful. The REQ determines, by the following manners, whether the verification for the $Sig_{AAC}$ is successful. The REQ verifies the $Sig_{AAC}$ by using the $Cert_{AAC}$ in the $Pub_{AAC}$ obtained by decrypting the first authentication result information ciphertext, and determines whether the verification of the $Sig_{AAC}$ is successful according to the verification result.

Referring to FIG. 1, messages transmitted among the REQ, the AAC and the AS may further include parameter information such as nonces generated by the AAC and/or the REQ, and identity identifiers. Normally, during identity authentication, these nonces and/or identity identifiers remain unchanged in the transmission process by the messages. However, in the event of network jitter or attacks or the like, parameter information such as the nonces and/or identity identifiers in messages may be lost or tampered. Therefore, the consistency of the identity identifiers and/or the nonces in the messages may further be verified during identity authentication, to guarantee the reliability and freshness of authentication results.

For example, if the to-be-encrypted data of the identity information ciphertext $EncData_{REQ}$ of the REQ in the REQInit of S101 further includes an identity identifier $ID_{REQ}$ of the REQ, the AACVeri of S102 further includes the ID t, the ASVeri of S103 further includes the $ID_{REQ}$, and the to-be-encrypted data of the authentication result information ciphertext $EncData_{AAC}$ in the AACAuth of S106 further includes the $ID_{REQ}$. Therefore, the REQ decrypts the $EncData_{AAC}$ to obtain the $ID_{REQ}$. Before executing S109, the REQ further verifies whether the $ID_{REQ}$ obtained by decryption is consistent with an own identity identifier $ID_{REQ}$ of the REQ, and S109 is then executed when the verification is successful.

Likewise, if the to-be-encrypted data of identity information ciphertext $EncPub_{AS}$ of the AAC in the AACVeri of S102 further includes identity identifier $ID_{AAC}$ of the AAC and a first protection nonce $Nonce_{AACID}$, and the $Nonce_{AACID}$ is used for encrypting the $ID_{AAC}$. Correspondingly, the ASVeri of S103 further includes identity identifier ciphertext of the AAC, and the identity identifier ciphertext of the AAC is obtained by encrypting the $ID_{AAC}$ by the AS-AAC using the $Nonce_{AACID}$. For example, an XOR may be performed on the $Nonce_{AACID}$ and the $ID_{AAC}$, to obtain the identity identifier ciphertext $ID_{AAC} \oplus Nonce_{AACID}$ of the AAC. Therefore, before S105, the AAC verifies the identity identifier ciphertext of the AAC according to the own $ID_{AAC}$ of the AAC and the $Nonce_{AACID}$. For example, verification is implemented by the following operations. The AAC encrypts the information including the own $ID_{AAC}$ of the AAC by using the $Nonce_{AACID}$ to generate the identity identifier ciphertext of the AAC, and verifies whether the generated identity identifier ciphertext of the AAC is consistent with the received identity identifier ciphertext of the AAC in the ASVeri of S103. Alternatively, the AAC may decrypt the identity identifier ciphertext of the AAC by using the $Nonce_{AACID}$, and verifies whether the $ID_{AAC}$ obtained by decryption is consistent with an own $ID_{AAC}$ of the AAC. S105 is executed after verification is successful.

Similar to the identity identifiers, if the REQInit of S101 further includes a second nonce $Nonce_{REQ}$ generated by the REQ, the AACVeri of S102 may further include the $Nonce_{REQ}$ and a first nonce $Nonce_{AAC}$ generated by the AAC. Correspondingly, the ASVeri of S103 may further include the $Nonce_{REQ}$ and the $Nonce_{AAC}$, and the to-be-encrypted data of the $EncData_{AAC}$ in the AACAuth of S106 may further include the $Nonce_{REQ}$. Before S105, the AAC further verifies whether the $Nonce_{AAC}$ in the ASVeri is consistent with the $Nonce_{AAC}$ generated by the AAC. Before S109, the REQ further verifies whether the $Nonce_{REQ}$ obtained by decrypting the $EncData_{AAC}$ is consistent with the $Nonce_{REQ}$ generated by the REQ.

In addition, in order to guarantee the reliability of the authentication results, the AACAuth of S106 may further include a message integrity check code $MacTag_{AAC}$, and the $MacTag_{AAC}$ is generated by calculating fields in the AACAuth other than the $MacTag_{AAC}$ by the AAC using a message integrity check key. After receiving the AACAuth, the REQ further verifies the $MacTag_{AAC}$, and S109 is executed when the verification is successful. When verifying the $MacTag_{AAC}$, the REQ calculates the fields in the AACAuth other than the $MacTag_{AAC}$ by using the message integrity check key, to generate the $MacTag_{AAC}$, and compares the $MacTag_{AAC}$ obtained by calculation with the received $MacTag_{AAC}$ in the AACAuth. If the two $MacTag_{AAC}$ are consistent, the verification is successful. If the two $MacTag_{AAC}$ are not consistent, the verification is failed. The manner of generating the message integrity check key is described in the next embodiment.

Figure 2:
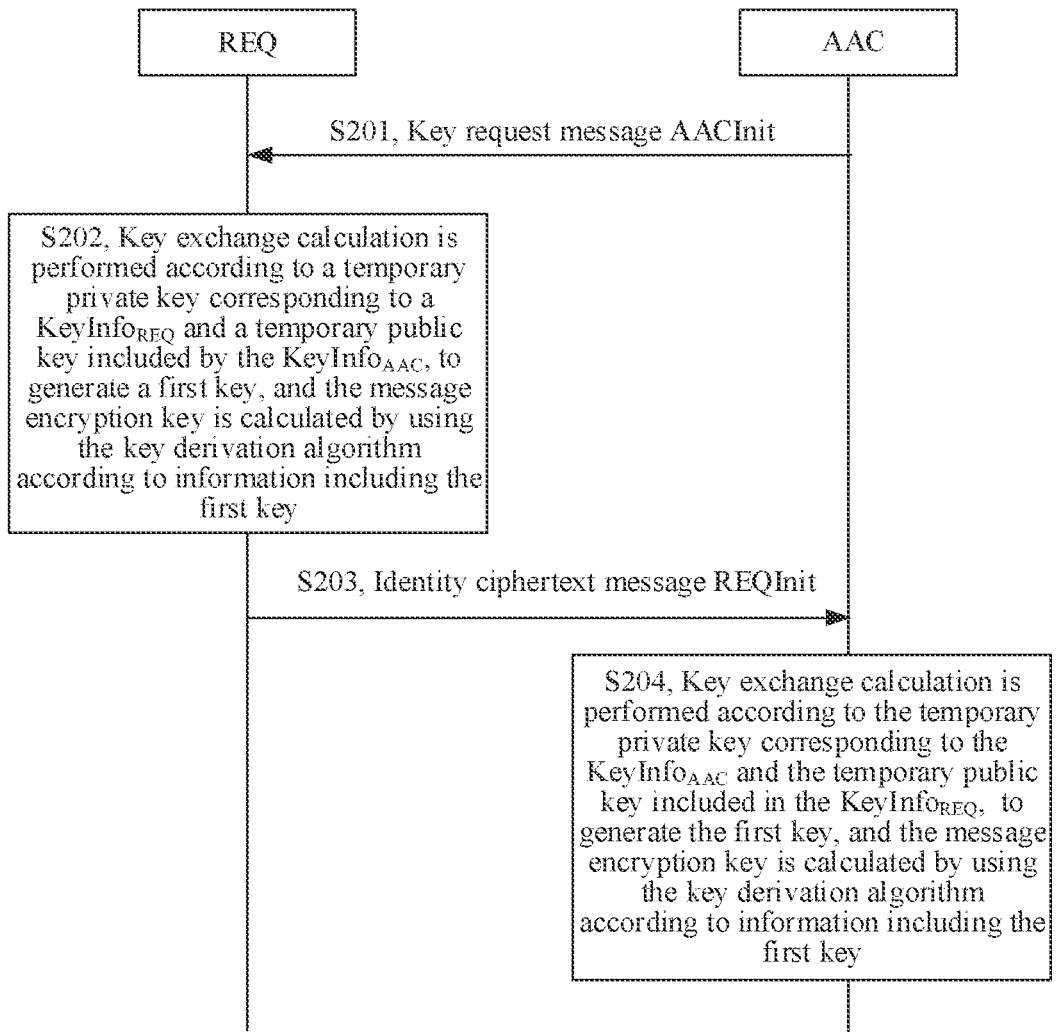
FIG. 2 is a schematic diagram of a method for negotiating a message encryption key between a Requester (REQ) and an Authentication Access Controller (AAC) according to an embodiment of the present disclosure.

The message encryption key in the above embodiments may be obtained by negotiation between the REQ and the AAC. Therefore, this embodiment further provides a method for negotiating the message encryption key between the REQ and the AAC. Referring to FIG. 2, the method includes the following operations S201 to S204.

At S201, the AAC sends a key request message AACInit to the REQ.

The AACInit includes a key exchange parameter $KeyInfo_{AAC}$ of the AAC, and the $KeyInfo_{AAC}$ includes a temporary public key of the AAC. Key exchange refers to a key exchange algorithm such as Diffie-Hellman (DH). The AACInit may further include the first nonce $Nonce_{AAC}$ generated by the AAC.

The AACInit may further include Security capabilities$_{AAC}$, and the Security capabilities$_{AAC}$ represents security capability parameter information supported by the AAC, including an identity authentication suite (which includes one or more identity authentication methods) supported by the AAC, one or more symmetric encryption algorithms, one or more integrity checking algorithms and/or one or more key derivation algorithms, to allow the REQ to select a specific security policy to be use. Therefore, the REQ may select, according to the Security capabilities$_{AAC}$, the Security capabilities$_{REQ}$ used by the REQ. The Security capabilities$_{REQ}$ indicates an identity authentication method, a symmetric encryption algorithm, an integrity checking algorithm and/or a key derivation algorithm which are determined to be used by the REQ.

At S202, the REQ performs key exchange calculation according to a temporary private key corresponding to a key exchange parameter Key Info$_{REQ}$ of the REQ and a temporary public key included in the KeyInfo$_{AAC}$ to generate a first key, and calculates the message encryption key by using the key derivation algorithm according to the information including the first key.

If the AACInit of S201 further includes the Nonce$_{AAC}$ generated by the AAC, the REQ may perform key exchange calculation according to the temporary private key corresponding to the KeyInfo$_{REQ}$ and the temporary public key included in the KeyInfo$_{AAC}$, to generate the first key K1. The K1 is combined with the information including the Nonce$_{AAC}$ and the second nonce Nonce$_{REQ}$ generated by the REQ. The message encryption key is calculated by using the negotiated or preset key derivation algorithm. The negotiated key derivation algorithm may be a key derivation algorithm which is selected by the REQ according to the Security capabilities$_{AAC}$ sent by the AAC. The KeyInfo$_{REQ}$ is a key exchange parameter generated by the REQ, including the temporary public key of the REQ. The temporary private key corresponding to the KeyInfo$_{REQ}$ is a temporary private key that is generated by the REQ and corresponds to the temporary public key of the REQ. That is, the temporary public key and the temporary private key are a pair of temporary public and private keys.

At S203, the REQ sends the identity ciphertext message REQInit to the AAC.

The REQInit includes the KeyInfo$_{REQ}$, and the AAC calculates according to information including the temporary private key corresponding to the KeyInfo$_{AAC}$ and the temporary public key included in the KeyInfo$_{REQ}$, to obtain the message encryption key. The temporary private key corresponding to the KeyInfo$_{AAC}$ is a temporary private key that is generated by the AAC and corresponds to the temporary public key of the AAC. That is, the temporary public key and the temporary private key are a pair of temporary public and private keys.

The REQInit may further include the Security capabilities$_{REQ}$. The REQInit may further include the Nonce$_{REQ}$, and the AAC calculates according to information including the temporary private key corresponding to the KeyInfo$_{AAC}$, the temporary public key included in the KeyInfo$_{REQ}$, the Nonce$_{AAC}$ and the Nonce$_{REQ}$ to obtain the message encryption key.

The REQInit may further include the Nonce$_{AAC}$. Before calculating the message encryption key, the AAC may verify whether the Nonce$_{AAC}$ in the REQInit is consistent with the Nonce$_{AAC}$ generated by the AAC, to ensure that the REQInit received by the AAC is a response message for the AACInit.

At S204, the AAC performs key exchange calculation according to the temporary private key corresponding to the KeyInfo$_{AAC}$ and the temporary public key included by the KeyInfo$_{REQ}$, to generate the first key, and calculates the message encryption key by using the key derivation algorithm according to the information including the first key.

If the REQInit further includes the Nonce$_{REQ}$, the AAC may perform key exchange calculation according to the temporary private key corresponding to the KeyInfo$_{AAC}$ and the temporary public key included in the KeyInfo$_{REQ}$, to generate the first key K1. The K1 is combined with the information including the Nonce$_{AAC}$ and the Nonce$_{REQ}$. The message encryption key is calculated by the negotiated or preset key derivation algorithm. The negotiated key derivation algorithm may be a key derivation algorithm which is selected to be used by the AAC according to the Security capabilities$_{REQ}$ sent by the REQ.

It is to be noted that, in the embodiment of FIG. 2, the REQ and the AAC may also generate the message integrity check key. The REQ and the AAC respectively generates the message integrity check key in the same manner as that in the embodiment of FIG. 2. For example, the AAC may derive a string of key data by using the key derivation algorithm in the manner of the embodiment of FIG. 2. The key data may be used as the message encryption key and may also be used as the message integrity check key. Alternatively, one portion of the key data is used as the message encryption key, and the other portion of the key data is used as the message integrity check key. The AAC may also derive two identical or different strings of key data in batches by using the key derivation algorithm in the manner of the embodiment of FIG. 2, one string is used as the message encryption key, and the other string is used as the message integrity check key. The REQ may derive a string of key data by using the key derivation algorithm key derivation algorithm in the manner of the embodiment of FIG. 2. The key data may be used as the message encryption key and may also be used as the message integrity check key. Alternatively, one portion of the key data is used as the message encryption key, and the other portion of the key data is used as the message integrity check key. The REQ may also derive two identical or different strings of key data in batches by using the key derivation algorithm in the manner of the embodiment of FIG. 2, one string is used as the message encryption key, and the other string is used as the message integrity check key.

An embodiment of the present disclosure further provides a method for determining a first authentication server (AS-AAC) and/or a second authentication server (AS-REQ) used during the authentication process based on the information exchanged between an AAC and a REQ.

Referring to FIG. 2, the AAC adds, in the AACInit of S201, the identity identifier ID$_{AS\_AAC}$ of at least one AS trusted by the AAC. The REQ determines, according to the ID$_{AS\_AAC}$, the identity identifier ID$_{AS\_REQ}$ of at least one AS trusted by the REQ. During implementation, the REQ selects, from the ID$_{AS\_AAC}$, the identity identifier of at least one AS that is trusted by the REQ, as the ID$_{AS\_REQ}$. If selection is failed, the REQ uses the identity identifier of at least one AS that is trusted by the REQ as the ID$_{AS\_REQ}$ (successful selection corresponds to a non-roaming case, and failed selection corresponds to a roaming case), and the ID$_{AS\_REQ}$ is added into the REQInit of S203 and sent to the AAC. Therefore, the AAC may determine the AS-AAC according to the ID$_{AS\_AAC}$ and the ID$_{AS\_REQ}$. For example, the AAC determine whether there is the identity identifier of at least one same AS in the ID$_{AS\_REQ}$ and the ID$_{AS\_AAC}$. If there is the identity identifier of at least one same AS, that is, it is determined to be the non-roaming case, the AAC determines the first authentication server involved in identity authentication from the identity identifier of the at least one AS trusted by both the REQ and the AAC. If there is no identity identifier of at least one same AS, that is, it is determined to be the roaming case, the AAC determines, according to the ID$_{AS\_AAC}$, the first authentication server AS-AAC involved in identity authentication, and sends the $ID_{AS\_REQ}$ to the AS-AAC, and the AS-AAC determines the AS-REQ according to the $ID_{AS\_REQ}$.

As another implementation, the AAC may not send the $ID_{AS\_AAC}$ to the REQ, and the REQ adds, in the REQInit of S203, the identity identifier $ID_{AS\_REQ}$ of at least one AS that is trusted by the REQ. The AS-AAC and/or the AS-REQ involved in the identity authentication process is determined according to the $ID_{AS\_REQ}$ and the $ID_{AS\_AAC}$ of the AS trusted by the AAC in a manner as that in the previous implementation.

Since the AS trusted by the REQ and the AAC may be the same or different, when the AS trusted by the REQ and the AAC are the same, it is the non-roaming case. When the AS trusted by the REQ and the AAC are different, it is the roaming case.

Figure 3:
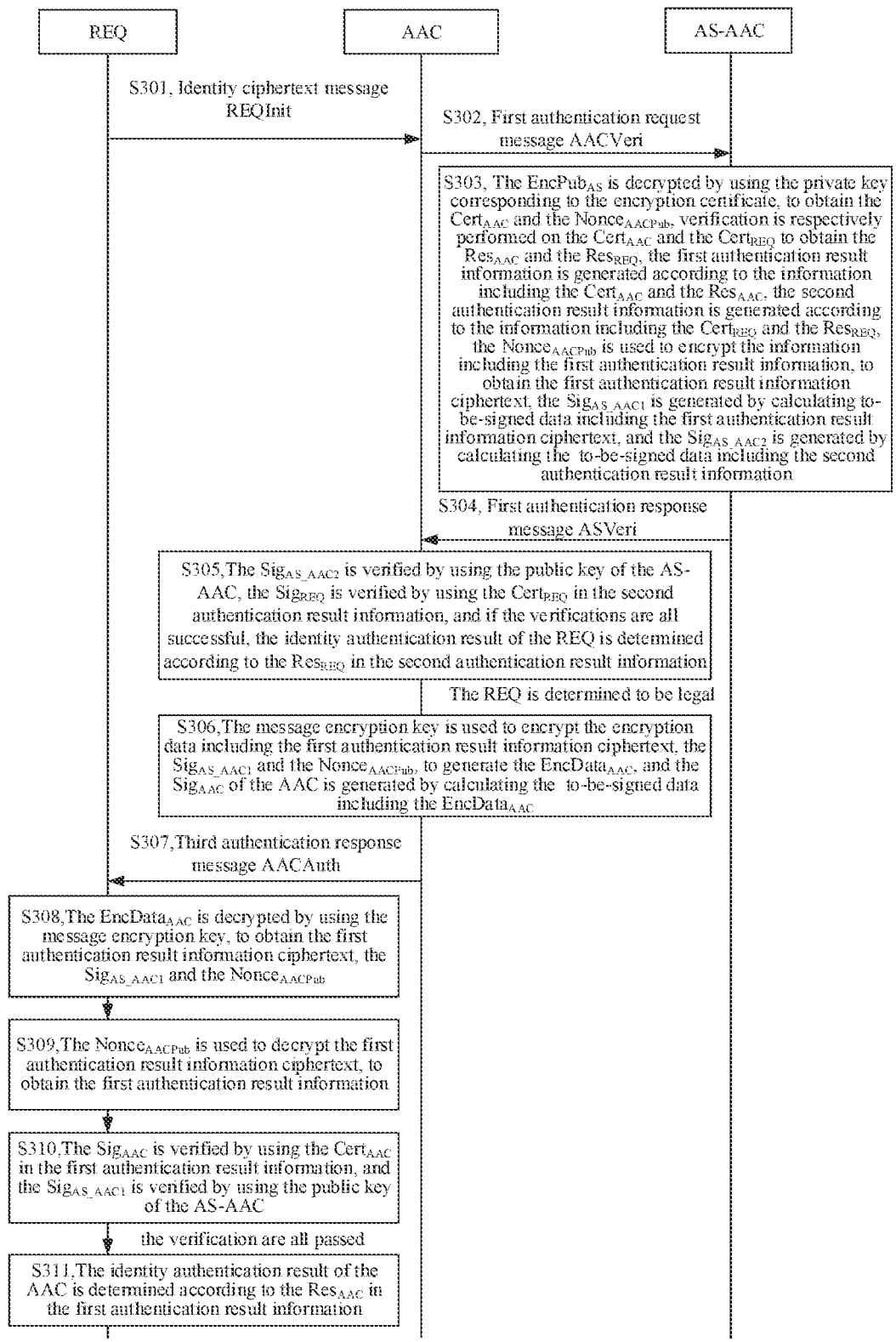
FIG. 3 is a schematic diagram of an identity authentication method in a non-roaming case according to an embodiment of the present disclosure.

FIG. 3 shows an embodiment of the identity authentication method in the non-roaming case. The AS-AAC (or the AS-REQ) may be used to represent the AS trusted by both the REQ and the AAC. Before this embodiment is executed, the REQ and the AAC both have the message encryption key, and the message encryption key may be shared in advance by both the REQ and the AAC, or may be obtained by negotiation by the method shown in FIG. 2. The identity authentication method includes the following operations S301 to S311.

At S301, the AAC acquires an identity ciphertext message REQInit sent by the REQ.

The REQInit includes identity information ciphertext $EncData_{REQ}$ of the REQ and the digital signature $Sig_{REQ}$ of the REQ.

At S302, the AAC sends a first authentication request message AACVeri to the AS-AAC.

The AACVeri includes the identity information ciphertext $EncPub_{AS}$ of the AAC and the $Cert_{REQ}$. The $Cert_{REQ}$ is obtained by decrypting the $EncData_{REQ}$ by the AAC using the message encryption key.

At S303, the AS-AAC decrypts the $EncPub_{AS}$ by using a private key corresponding to an encryption certificate to obtain the $Cert_{AAC}$ and the second protection nonce $Nonce_{AACPub}$, respectively performs legality verification on the $Cert_{AAC}$ and the $Cert_{REQ}$ to obtain the $Res_{AAC}$ and the $Res_{REQ}$, generates the first authentication result information according to the information including the $Cert_{AAC}$ and the $Res_{AAC}$, generates the second authentication result information according to the information including the $Cert_{REQ}$ and the $Res_{REQ}$, encrypts the information including the first authentication result information by using the $Nonce_{AACPub}$ to obtain the first authentication result information ciphertext, calculates the to-be-signed data including the first authentication result information ciphertext to generate the $Sig_{AS\_AAC1}$, and calculates the to-be-signed data including the second authentication result information to generates the $Sig_{AS\_AAC2}$.

At S304, the AAC receives a first authentication response message ASVeri sent by the AS-AAC.

The ASVeri includes the first authentication result information ciphertext, the $Sig_{AS\_AAC1}$, the second authentication result information and the $Sig_{AS\_AAC2}$.

At S305, the AAC verifies the $Sig_{AS\_AAC2}$ by using the public key of the AS-AAC, verifies the $Sig_{REQ}$ by using the $Cert_{REQ}$ in the second authentication result information, and determines the identity authentication result for the REQ according to the $Res_{REQ}$ in the second authentication result information if the verifications are successful.

S306 is executed when the AAC determines that the identity authentication result for the REQ indicates that the REQ is legal. The authentication process is ended when the AAC determines that the identity authentication result for the REQ indicates that the REQ is illegal.

At S306, the AAC encrypts the to-be-encrypted data including the first authentication result information ciphertext, the $Sig_{AS\_AAC1}$ and the $Nonce_{AACPub}$ by using the message encryption key, to generate the $EncData_{AAC}$, and calculates the to-be-signed data including the $EncData_{AAC}$ to generate the $Sig_{AAC}$ of the AAC.

At S307, the AAC sends a third authentication response message AACAuth to the REQ.

The AACAuth includes the $EncData_{AAC}$ and the $Sig_{AAC}$.

At S308, the REQ decrypts the $EncData_{AAC}$ by using the message encryption key, to obtain the first authentication result information ciphertext, the $Sig_{AS\_AAC1}$ and the $Nonce_{AACPub}$.

At S309, the REQ decrypts the first authentication result information ciphertext by using the $Nonce_{AACPub}$, to obtain the first authentication result information.

At S310, the REQ verifies the $Sig_{AAC}$ by using the $Cert_{AAC}$ in the first authentication result information, and verifies the $Sig_{AS\_AAC1}$ by using the public key of the AS-AAC.

S311 is executed in response to the verifications being all successful. The AACAuth is discarded in response to the verifications being failed.

At S311, the REQ determines the identity authentication result for the AAC according to the $Res_{AAC}$ in the first authentication result information.

It is to be noted that, the verification for the $Sig_{REQ}$ in S305 may be changed to be executed in S301. That is, after acquiring the REQInit, the AAC verifies the $Sig_{REQ}$ by using the $Cert_{REQ}$ obtained by decrypting the $EncData_{REQ}$ in the REQInit. After the verification is successful, S302 is then executed. In this case, the second authentication result information may not include the $Cert_{REQ}$. Alternatively, the verification for the $Sig_{REQ}$ in S305 may be changed to be executed in S303. In this case, the $Sig_{REQ}$ may be sent to the AS-AAC by the AACVeri of S302. The AS-AAC verifies the $Sig_{REQ}$ by using the $Cert_{REQ}$, and the subsequent operations are executed after the verification is successful.

Figure 4:
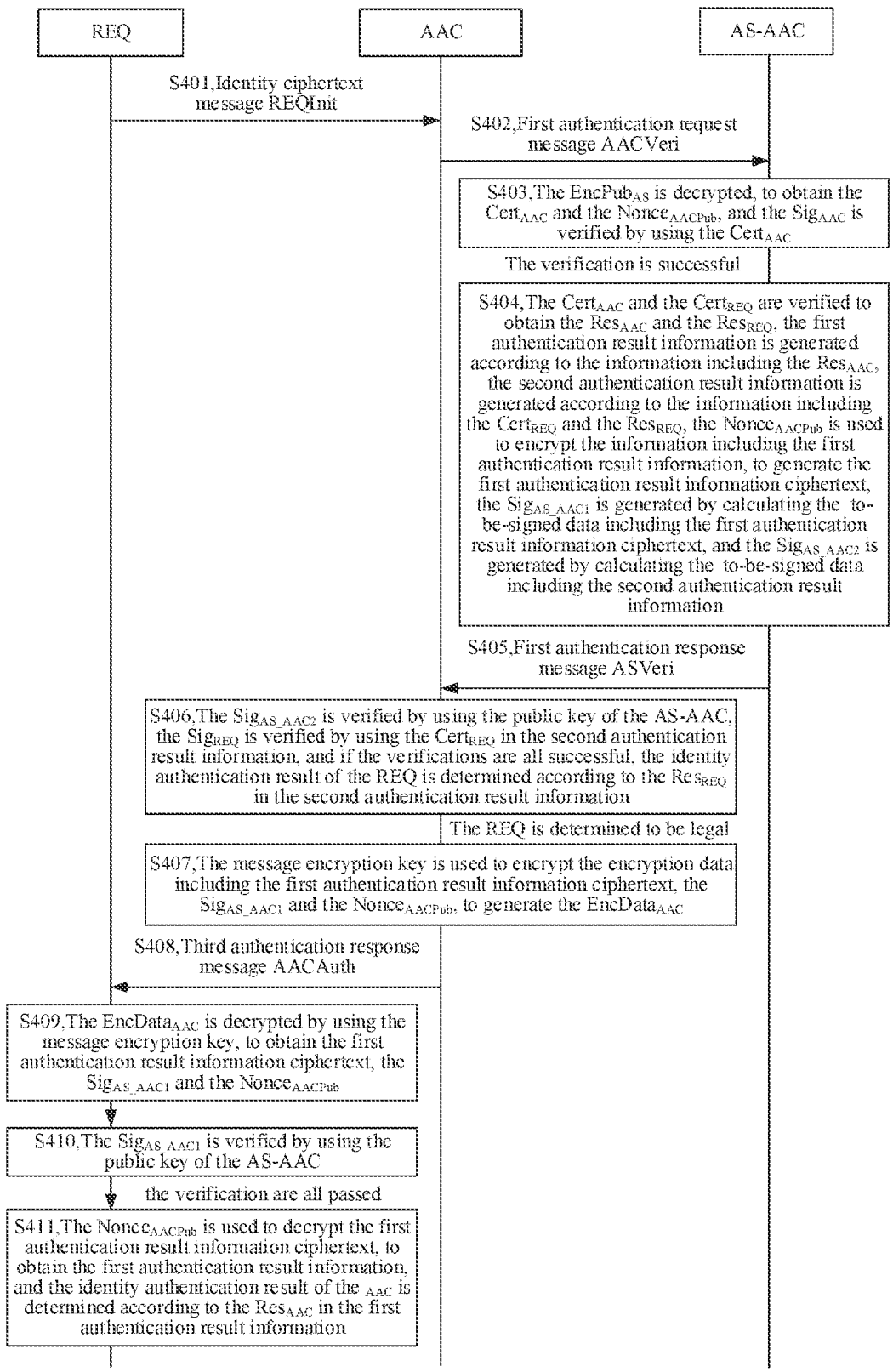
FIG. 4 is a schematic diagram of another identity authentication method in a non-roaming case according to an embodiment of the present disclosure.

FIG. 4 shows another embodiment of the identity authentication method in the non-roaming case. The AS-AAC (or the AS-REQ) may be used to represent the AS trusted by both the REQ and the AAC. Before this embodiment is executed, the REQ and the AAC both have the message encryption key, and the message encryption key may be shared in advance by both the REQ and the AAC, or may be obtained by negotiation by the method shown in FIG. 2. The identity authentication method includes the following operations S401 to S411.

At S401, the AAC acquires an identity ciphertext message REQInit sent by the REQ.

The REQInit includes identity information ciphertext $EncData_{REQ}$ of the REQ and the digital signature $Sig_{REQ}$ of the REQ.

At S402, the AAC sends a first authentication request message AACVeri to the AS-AAC.

The AACVeri includes the identity information ciphertext $EncPub_{AS}$ of the AAC, the $Cert_{REQ}$, and a digital signature of the AAC. The $Cert_{REQ}$ is obtained by decrypting the $EncData_{REQ}$ by the AAC using the message encryption key At S403, the AS-AAC decrypts the identity information ciphertext $EncPub_{AS}$ of the AAC, to obtain the $Cert_{AAC}$ and the second protection nonce $Nonce_{AACPub}$, and verifies the $Sig_{AAC}$ by using the $Cert_{AAC}$.

S404 is executed if the verification is successful. The AACAuth is discarded if the verification is failed.

At S404, the AS-AAC performs legality verification on each of the $Cert_{AAC}$ and the $Cert_{REQ}$, to obtain a first authentication result $Res_{AAC}$ and a second authentication result $Res_{REQ}$, generates first authentication result information according to the information including the $Res_{AAC}$, generates second authentication result information according to the information including the $Cert_{REQ}$ and the $Res_{REQ}$, encrypts the information including the first authentication result information using the $Nonce_{AACPub}$ to generate the first authentication result information ciphertext, calculates the to-be-signed data including the first authentication result information ciphertext to generate the $Sig_{AS\_AAC1}$, and calculates the to-be-signed data including the second authentication result information to generate the $Sig_{AS\_AAC2}$.

At S405, the AAC receives a first authentication response message ASVeri sent by the AS-AAC.

The ASVeri includes the first authentication result information ciphertext, the $Sig_{AS\_AAC1}$, the second authentication result information and the $Sig_{AS\_AAC2}$.

At S406, the AAC verifies the $Sig_{AS\_AAC2}$ by using the public key of the AS-AAC, verifies the $Sig_{REQ}$ by using the $Cert_{REQ}$ in the second authentication result information, and determines the identity authentication result for the REQ according to the $Res_{REQ}$ in the second authentication result information if the verifications are all successful.

S407 is executed in response to that the AAC determines that the identity authentication result for the REQ indicates that the REQ is legal. The authentication process is ended in response to that the AAC determines that the identity authentication result for the REQ indicates that the REQ is illegal.

At S407, the AAC encrypts the to-be-encrypted data including the first authentication result information ciphertext, the $Sig_{AS\_AAC1}$ and the $Nonce_{AACPub}$ by using the message encryption key, to generate the authentication result information ciphertext $EncData_{AAC}$.

At S408, the AAC sends a third authentication response message AACAuth to the REQ.

The AACAuth includes the $EncData_{AAC}$.

At S409, the REQ decrypts the $EncData_{AAC}$ by using the message encryption key, to obtain the first authentication result information ciphertext, the $Sig_{AS\_AAC1}$ and the $Nonce_{AACPub}$.

At S410, the REQ verifies the $Sig_{AS\_AAC1}$ by using the public key of the AS-AAC.

SS411 is executed if the verification is successful. The AACAuth is discarded if the verification is failed.

At S411, the REQ decrypts the first authentication result information ciphertext by using the $Nonce_{AACPub}$ to obtain the first authentication result information, and determines the identity authentication result for the AAC according to the $Res_{AAC}$ in the first authentication result information.

It is to be noted that, the verification for the $Sig_{REQ}$ in S406 may be changed to be executed in S401. That is, after acquiring the REQInit, the AAC verifies the $Sig_{REQ}$ by using the $Cert_{REQ}$ obtained by decrypting the $EncData_{REQ}$ in the REQInit. After the verification is successful. S402 is then executed. In this case, the second authentication result information may not include the $Cert_{REQ}$. Alternatively, the verification for the $Sig_{REQ}$ in S406 may be changed to be executed in S403. In this case, the $Sig_{REQ}$ may be sent to the AS-AAC by the AACVeri of S402. The AS-AAC verifies the $Sig_{REQ}$ by using the $Cert_{REQ}$, and the subsequent operations are executed after the verification is successful.

Figure 5:
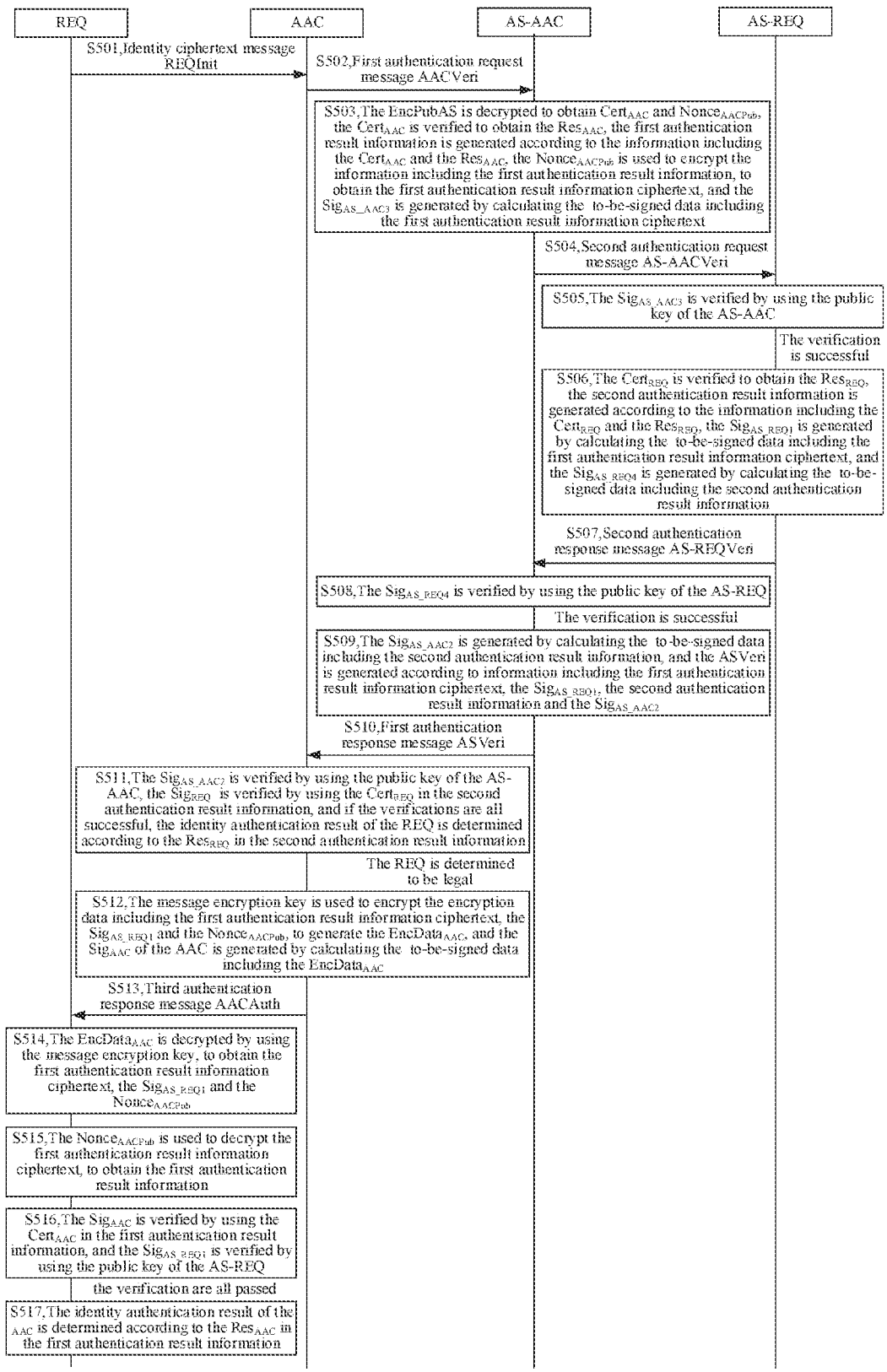
FIG. 5 is a schematic diagram of an identity authentication method in a roaming case according to an embodiment of the present disclosure.

FIG. 5 shows an embodiment of the identity authentication method in the roaming case. In this case, the AS-AAC and the AS-REQ are trusted with each other, and know a digital certificate or a public key in the digital certificate of each other. Before this embodiment is executed, the REQ and the AAC both have a message encryption key, and the message encryption key may be shared in advance by both the REQ and the AAC, or may be obtained by negotiation by the method shown in FIG. 2. The identity authentication method includes the following operations S501 to S517.

At S501, the AAC acquires an identity ciphertext message REQInit sent by the REQ.

The REQInit includes identity information ciphertext $EncData_{REQ}$ of the REQ, the identity identifier $ID_{AS\_REQ}$ of at least one AS trusted by the REQ, and digital signature $Sig_{REQ}$ of the REQ.

At S502, the AAC sends a first authentication request message AACVeri to the AS-AAC.

The AACVeri includes an identity information ciphertext $EncPub_{AS}$ of the AAC, the $Cert_{REQ}$ and the $ID_{AS\_REQ}$. The AS-AAC may determine, according to the $ID_{AS\_REQ}$, the second authentications server AS-REQ used during the authentication process, and send the $Cert_{REQ}$ to the AS-REQ for authentication. The $Cert_{REQ}$ is obtained by decrypting the $EncData_{REQ}$ by the AAC using the message encryption key.

At S503, the AS-AAC decrypts the $EncPub_{AS}$ to obtain the $Cert_{AAC}$ and a second protection nonce $Nonce_{AACPub}$, performs legality verification on the $Cert_{AAC}$ to obtain a first authentication result $Res_{AAC}$, generates first authentication result information according to the information including the $Cert_{AAC}$ and the $Res_{AAC}$, encrypts the information including the first authentication result information by using the $Nonce_{AACPub}$ to obtain the first authentication result information ciphertext, and calculates the to-be-signed data including the first authentication result information ciphertext to generate a third digital signature $Sig_{AS\_AAC3}$.

At S504, the AS-AAC sends a second authentication request message AS-AACVeri to the AS-REQ.

The AS-AACVeri includes the first authentication result information ciphertext, the $Cert_{REQ}$ and the $Sig_{AS\_AAC3}$.

At S505, the AS-REQ verifies the $Sig_{AS\_AAC3}$ by using the public key of the AS-AAC.

S506 is executed if the verification is successful. The AS-AACVeri is discarded if the verification is failed.

At S506, the AS-REQ performs legality verification on the $Cert_{REQ}$, to obtain a second verification result $Res_{REQ}$, generates second authentication result information according to information including the $Cert_{REQ}$ and the $Res_{REQ}$, calculates to-be-signed data including the first authentication result information ciphertext to generate a first digital signature $Sig_{AS\_REQ1}$, and calculates to-be-signed data including the second authentication result information to generate a fourth digital signature $Sig_{AS\_REQ4}$.

At S507, the AS-REQ sends a second authentication response message AS-REQVeri to the AS-AAC.

The AS-REQVeri includes the first authentication result information ciphertext, the first digital signature $Sig_{AS\_REQ1}$, the second authentication result information and the fourth digital signature $Sig_{AS\_REQ4}$.

At S508, the AS-AAC verifies the $Sig_{AS\_REQ4}$ by using a public key of the AS-REQ.

S509 is executed if the verification is successful. The AS-REQVeri is discarded if the verification is failed.

At S509, the AS-AAC calculates to-be-signed data including the second authentication result information to generate a second digital signature $Sig_{AS\_AAC2}$, and generates a first authentication response message ASVeri according to information including the first authentication result information ciphertext, the $Sig_{AS\_REQ1}$, the second authentication result information and the $Sig_{AS\_AAC2}$.

At S510, the AS-AAC sends a first authentication response message ASVeri to the AAC.

At S511, the AAC verifies the $Sig_{AS\_AAC2}$ by using the public key of the AS-AAC, verifies the $Sig_{REQ}$ by using the $Cert_{REQ}$ in the second authentication result information, and determines an identity authentication result for the REQ according to the $Res_{REQ}$ in the second authentication result information in response to the verification are all successful.

S512 is executed in response to that the AAC determines that the identity authentication result for the REQ indicates that the REQ is legal. The authentication process is ended in response to that the AAC determines that the identity authentication result for the REQ indicates that the REQ is illegal.

At S512, the AAC encrypts to-be-encrypted data including the first authentication result information ciphertext, the $Sig_{AS\_REQ1}$ and the $Nonce_{AACPub}$ by using the message encryption key, to generate the $EncData_{AAC}$, and calculates to-be-signed data including the $EncData_{AAC}$ to generate a digital signature $Sig_{AAC}$ of the AAC.

At S513, the AAC sends a third authentication response message AACAuth to the REQ.

The AACAuth includes the $EncData_{AAC}$ and the $Sig_{ACC}$.

At S514, the REQ decrypts the $EncData_{AAC}$ by using the message encryption key, to obtain the first authentication result information ciphertext, the $Sig_{AS\_REQ1}$, and the $Nonce_{AACPub}$.

At S515, the REQ decrypts the first authentication result information ciphertext by using the $Nonce_{AACPub}$, to obtain the first authentication result information.

At S516, the REQ verifies the $Sig_{AAC}$ by using the $Cert_{AAC}$ in the first authentication result information, and verifies the $Sig_{AS\_REQ1}$ by using the public key of the AS-REQ.

S517 is executed if the verification is successful. The AACAuth is discarded if the verification is failed At S517, the REQ determines an identity authentication result for the AAC according to the $Res_{AAC}$ in the first authentication result information.

It is to be noted that, the verification for the $Sig_{REQ}$ in S511 may be changed to be executed in S501. That is, after acquiring the REQInit, the AAC verifies the $Sig_{REQ}$ by using the $Cert_{REQ}$ obtained by decrypting the $EncData_{REQ}$ in the REQInit. After the verification is successful, S502 is then executed. In this case, the second authentication result information may not include the $Cert_{REQ}$. Alternatively, the verification for the $Sig_{REQ}$ in S511 may be changed to be executed in S505. In this case, the $Sig_{REQ}$ may be sent to the AS-REQ by the AACVeri and the AS-AACVeri. The AS-REQ verifies the $Sig_{REQ}$ by using the $Cert_{REQ}$, and the subsequent operations are executed after the verification is successful.

Figure 6:
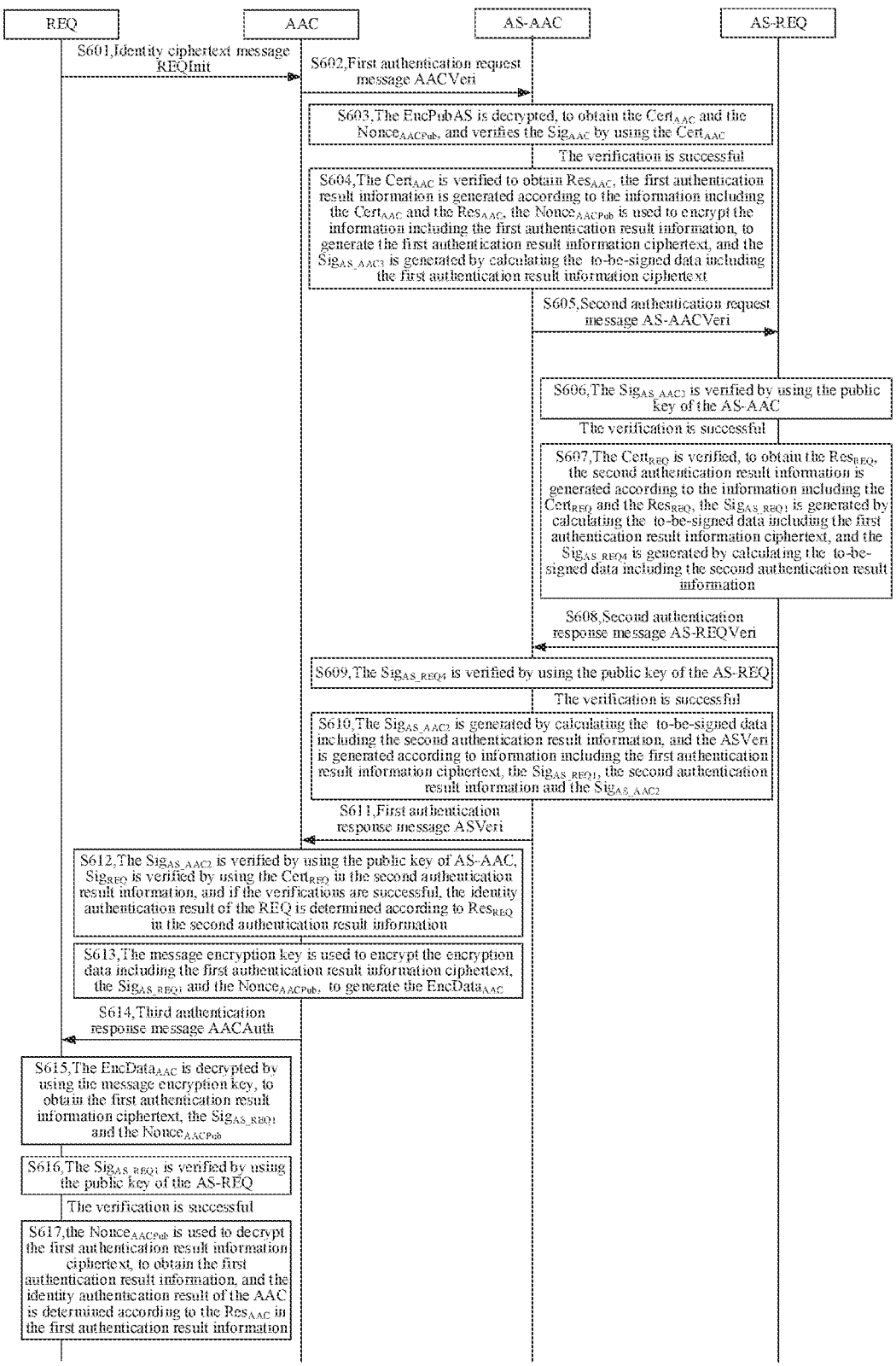
FIG. 6 is a schematic diagram of another identity authentication method in a roaming case according to an embodiment of the present disclosure.

FIG. 6 shows another embodiment of the identity authentication method in the roaming case. In this case, the AS-AAC and the AS-REQ are trusted with each other, and know a digital certificate or a public key in the digital certificate with each other. Before this embodiment is executed, the REQ and the AAC both have a message encryption key, and the message encryption key may be shared in advance by both the REQ and the AAC, or may be obtained by negotiation by the method shown in FIG. 2. The identity authentication method includes the following operations S601 to S617.

At S601, the AAC acquires an identity ciphertext message REQInit sent by the REQ.

The REQInit includes identity information ciphertext $EncData_{REQ}$ of the REQ, the identity identifier $ID_{AS\_REQ}$ of at least one AS trusted by the REQ, and digital signature $Sig_{REQ}$ of the REQ.

At S602, the AAC sends a first authentication request message AACVeri to the AS-AAC.

The AACVeri includes an identity information ciphertext $EncPub_{AS}$ of the AAC, the $Cert_{REQ}$, the $ID_{AS\_REQ}$, and a digital signature $Sig_{AAC}$ of the AAC. The $Cert_{REQ}$ is obtained by decrypting the $EncData_{REQ}$ by the AAC using the message encryption key.

At S603, the AS-AAC decrypts the $EncPub_{AS}$ to obtain the $Cert_{AAC}$ and a second protection nonce $Nonce_{AACPub}$, and verifies the $Sig_{AAC}$ by using the $Cert_{AAC}$.

S604 is executed if the verification is successful. The AACVeri is discarded if the verification is failed.

At S604, the AS-AAC performs legality verification on the $Cert_{AAC}$ to obtain a first verification result $Res_{AAC}$, generates first authentication result information according to the information including the $Res_{AAC}$, encrypts information including the first authentication result information using the $Nonce_{AACPub}$, to generate a first authentication result information ciphertext, and calculates to-be-signed data including the first authentication result information ciphertext to generates a third digital signature $Sig_{AS\_AAC3}$.

At S605, the AS-AAC sends a second authentication request message AS-AACVeri to the AS-REQ.

The AS-AACVeri includes the first authentication result information ciphertext, the $Cert_{REQ}$ and the $Sig_{AS\_AAC3}$.

At S606, the AS-REQ verifies the $Sig_{AS\_AAC3}$ by using the public key of the AS-AAC.

S607 is executed if the verification is successful. The AS-AACVeri is discarded if the verification is failed.

At S607, the AS-REQ performs legality verification on the $Cert_{REQ}$, to obtain a second verification result $Res_{REQ}$, generates second authentication result information according to information including the $Cert_{REQ}$ and the $Res_{REQ}$, calculates to-be-signed data including the first authentication result information ciphertext to generate a first digital signature $Sig_{AS\_REQ1}$, and calculates to-be-signed data including the second authentication result information to generate a fourth digital signature $Sig_{AS\_REQ4}$.

At S608, the AS-REQ sends a second authentication response message AS-REQVeri to the AS-AAC.

The AS-REQVeri includes the first authentication result information ciphertext, the first digital signature $Sig_{AS\_REQ1}$, the second authentication result information and the fourth digital signature $Sig_{AS\_REQ4}$.

At S609, the AS-AAC verifies the $Sig_{AS\_REQ4}$ by using a public key of the AS-REQ.

S610 is executed if the verification is successful. The AS-REQVeri is discarded if the verification is failed.

At S610, the AS-AAC calculates to-be-signed data including the second authentication result information to generate a second digital signature $Sig_{AS\_REQ2}$, and generates a first authentication response message ASVeri according to information including the first authentication result information ciphertext, the $Sig_{AS\_REQ1}$, the second authentication result information and the $Sig_{AS\_AAC2}$.

At S611, the AS-AAC sends a first authentication response message ASVeri to the AAC.

At S612, the AAC verifies the $Sig_{AS\_AAC2}$ by using the public key of the AS-AAC, verifies the $Sig_{REQ}$ by using the $Cert_{REQ}$ in the second authentication result information, and determines an identity authentication result for the REQ according to the Res$_{REQ}$ in the second authentication result information in response to the verification are all successful.

S613 is executed in response to that the AAC determines that the identity authentication result for the REQ indicates that the REQ is legal. The authentication process is ended in response to that the AAC determines that the identity authentication result for the REQ indicates that the REQ is illegal.

At S613, the AAC encrypts to-be-encrypted data including the first authentication result information ciphertext, the Sig$_{AS\_REQ1}$ and the Nonce$_{AACPub}$ by using the message encryption key, to generate an authentication result information ciphertext EncData$_{AAC}$.

At S614, the AAC sends a third authentication response message AACAuth to the REQ.

The AACAuth includes the EncData$_{AAC}$.

At S615, the REQ decrypts the EncData$_{AAC}$ by using the message encryption key, s to obtain the first authentication result information ciphertext, the Sig$_{AS\_REQ1}$ and the Nonce$_{ACCPub}$.

At S616, the REQ verifies the Sig$_{AS\_REQ1}$ by using the public key of the AS-REQ.

S617 is executed if the verification is successful. The AACAuth is discarded if the verification is failed.

At S617, the REQ decrypts the first authentication result information ciphertext using the Nonce$_{AACPub}$, to obtain the first authentication result information, and determines an identity authentication result for the AAC according to the Res$_{AAC}$ in the first authentication result information.

It is to be noted that, the verification for the Sig$_{REQ}$ in S612 may be changed to be executed in S601. That is, after acquiring the REQInit, the AAC verifies the Sig$_{REQ}$ by using the Cert$_{REQ}$ obtained by decrypting the EncData$_{REQ}$ in the REQInit. After the verification is successful. S602 is then executed. In this case, the second authentication result information may not include the Cert$_{REQ}$. Alternatively, the verification for the Sig$_{REQ}$ in S612 may be changed to be executed in S606. In this case, the Sig$_{REQ}$ may be sent to the AS-REQ by the AACVeri and the AS-AACVeri. The AS-REQ verifies the Sig$_{REQ}$ by using the Cert$_{REQ}$, and the subsequent operations are executed after the verification is successful.

For ease of description, the first authentication result information is represented by Pub$_{AAC}$ and the second authentication result information is represented by Pub$_{REQ}$ in the embodiments of FIG. 7 to FIG. 10.

Figure 7:
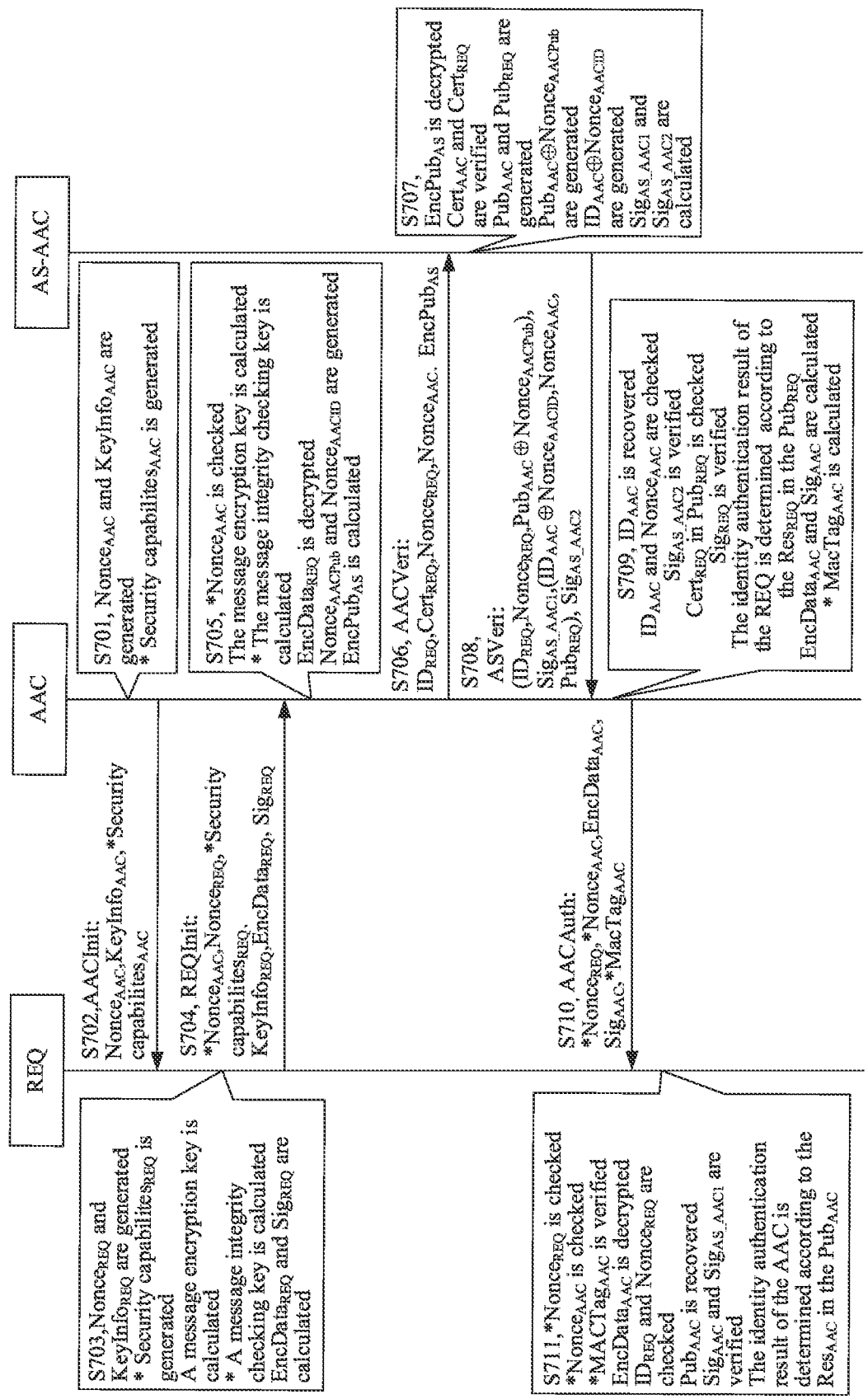
FIG. 7 is a schematic diagram of another identity authentication method in a non-roaming case according to an embodiment of the present disclosure, where "*" represents an optional field or an optional operation.

FIG. 7 shows another embodiment of the identity authentication method in the non-roaming case. The AS-AAC (or the AS-REQ) may represent the AS trusted by both the REQ and the AAC. In this embodiment, the process of negotiating the message encryption key between the REQ and the AAC is fused in the identity authentication process in parallel, for facilitating project implementation. A digital signature Sig$_{AAC}$ of the AAC is verified by the REQ. The method includes the following operations S701 to S711.

At S701, the AAC generates the Nonce$_{AAC}$ and the KeyInfo$_{AAC}$, and generates the Security capabilities$_{AAC}$ according to requirements.

At S702, the AAC sends a key request message AACInit to the REQ.

The AACInit includes the Nonce$_{AAC}$, the KeyInfo$_{AAC}$ and the Security capabilities$_{AAC}$. The Security capabilities$_{AAC}$ is an optional field, which represents the security capability parameter information supported by the AAC, and includes an identity authentication suite supported by the AAC, one or more symmetric encryption algorithms, one or more integrity checking algorithms and/or one or more key derivation algorithms (hereinafter the same).

At S703, the REQ generates the Nonce$_{REQ}$ and the KeyInfo$_{REQ}$ generates the Security capabilities$_{REQ}$ according to requirements, and performs key exchange calculation according to the temporary private key corresponding to the KeyInfo$_{REQ}$ and the temporary public key included by the KeyInfo$_{AAC}$, to generate the first key K1. The K1 is combined with the Nonce$_{AAC}$, the Nonce$_{REQ}$ and other information (other information used by the REQ and the AAC being the same and optional, for example, a specific string), and the message encryption key and the message integrity check key are calculated based on the combination by using the negotiated or preset key derivation algorithm. The EncData$_{REQ}$ is calculated using the message encryption key with the symmetric encryption algorithm. The Sig$_{REQ}$ is calculated.

The Security capabilities$_{REQ}$ indicates a selection for a specific security policy made by the REQ according to the Security capabilities$_{AAC}$. That is, the REQ determines the identity authentication method, the symmetric encryption algorithm, the integrity checking algorithm and/or the key derivation algorithm (which are the same hereinafter) used. Whether the REQ generates the Security capabilities$_{REQ}$ depends on whether the Security capabilities$_{AAC}$ is carried in the AACInit sent by the AAC to the REQ. The operation that the REQ calculates the message integrity check key is an optional operation, which may be executed when the message integrity check key is used.

At S704, the REQ sends an identity ciphertext message REQInit to the AAC.

The REQInit includes the Nonce$_{AAC}$, the Nonce$_{REQ}$, the Security capabilities$_{REQ}$, the KeyInfo$_{REQ}$, the EncData$_{REQ}$, and the Sig$_{REQ}$. The Nonce$_{AAC}$ is an optional field, and is identical with a corresponding field in the AACInit. The Security capabilities$_{REQ}$ is an optional field. The to-be-encrypted data of the EncData$_{REQ}$ includes the Cert$_{REQ}$ and the ID$_{REQ}$. The to-be-signed data of the Sig$_{REQ}$ includes other fields ahead of the Sig$_{REQ}$ in the REQInit. For example, when the REQInit includes the Nonce$_{AAC}$, the Nonce$_{REQ}$, the Security capabilities$_{REQ}$, the KeyInfo$_{REQ}$, the EncData$_{REQ}$, and the Sig$_{REQ}$ in sequence, the to-be-signed data of the Sig$_{REQ}$ includes the Nonce$_{AAC}$, the Nonce$_{REQ}$, the Security capabilities$_{REQ}$, the KeyInfo$_{REQ}$, and the EncData$_{REQ}$. When the REQInit does not include the field Nonce$_{AAC}$, the to-be-signed data of the Sig$_{REQ}$ further includes the field Nonce$_{AAC}$ in the AACInit. In the present disclosure, an object to be signed is called the to-be-signed data.

At S705, after receiving the REQInit, the AAC executes the following operations (1) to (5) (if there is no special explanation or logical relationship, operations numbered with (1). (2), . . . , in this specification do not necessarily have a sequential order due to their numbering, which is the same as in the entire text).

In operation (1), if there is the Nonce$_{AAC}$ in the REQInit, whether the Nonce$_{AAC}$ is the same as the Nonce$_{AAC}$ generated by the AAC is checked. In response to the Nonce$_{AAC}$ being different from the Nonce$_{AAC}$ generated by the AAC, the REQInit is discarded.

In operation (2), key exchange calculation is performed according to the temporary private key corresponding to the KeyInfo$_{AAC}$ and the temporary public key included in the KeyInfo$_{REQ}$, to generate the first key K1. The K1 is combined with the Nonce$_{AAC}$, the Nonce$_{REQ}$ and other information (other information used by the AAC and the REQ being identical and optional, for example, a specific string), and the message encryption key and the message integrity check key are calculated based on the combination by using the negotiated or preset key derivation algorithm. The operation that the AAC calculates the message integrity check key is an optional operation, which may be executed when the message integrity check key is used.

In operation (3), the EncData$_{REQ}$ is decrypted using the message encryption key with the symmetric encryption algorithm, to obtain the Cert$_{REQ}$ and the ID$_{REQ}$.

In operation (4), the Nonce$_{AACID}$ and the Nonce$_{AACPub}$ are generated.

In operation (5), the identity information ciphertext EncPub$_{AS}$ of the AAC is calculated using the public key of the encryption certificate.

At S706, the AAC sends a first authentication request message AACVeri to the AS-AAC.

The AACVeri includes the ID$_{REQ}$, the Cert$_{REQ}$, the Nonce$_{REQ}$, the Nonce$_{AAC}$, the EncPub$_{AS}$. The ID$_{REQ}$, the Cert$_{REQ}$, and the Nonce$_{REQ}$ are identical with corresponding fields in the REQInit. The Nonce$_{AAC}$ is identical with the Nonce$_{AAC}$ generated by the AAC, and the to-be-encrypted data of the EncPub$_{AS}$ includes the ID$_{AAC}$, the Cert$_{AAC}$, the Nonce$_{AACPub}$, the Nonce$_{AACID}$.

At S707, after receiving the AACVeri, the AS-AAC executes the following operations (1) to (3).

In operation (1), the EncPub$_{AS}$ is decrypted using the private key corresponding to the encryption certificate, to obtain the ID$_{AAC}$, the Cert$_{AAC}$, the Nonce$_{AACID}$ and the Nonce$_{AACPub}$.

In operation (2), the legality of the Cert$_{AAC}$ and the Cert$_{REQ}$ is respectively verified to obtain the Res$_{AAC}$ and the Res$_{REQ}$. The Pub$_{AAC}$ is generated according to the information including the Cert$_{AAC}$ and the Res$_{AAC}$, and the Pub$_{REQ}$ is generated according to the information including the Cert$_{REQ}$ and the Res$_{REQ}$. An XOR is performed on the ID$_{AAC}$ and the Nonce$_{AACID}$, to generate the ID$_{AAC}\oplus$Nonce$_{AACID}$. An XOR is performed on the Pub$_{AAC}$ and the Nonce$_{AACPub}$, to generate the Pub$_{AAC}\oplus$Nonce$_{AACPub}$.

In operation (3), a first digital signature Sig$_{AS\_AAC1}$ and a second digital signature Sig$_{AS\_AAC2}$ are calculated.

At S708, the AS-AAC sends a first authentication response message ASVeri to the AAC.

The ASVeri includes the ID$_{REQ}$, the Nonce$_{REQ}$, the Pub$_{AAC}\oplus$Nonce$_{AACPub}$, the Sig$_{AS\_AAC1}$, the ID$_{AAC}\oplus$Nonce$_{AACID}$, the Nonce$_{AAC}$, the Pub$_{REQ}$ and the Sig$_{AS\_AAC2}$. The ID$_{REQ}$, the Nonce$_{REQ}$, the Nonce$_{AACPub}$, the ID$_{AAC}$, the Nonce$_{AACID}$ and the Nonce$_{AAC}$ are respectively identical with corresponding fields in the AACVeri. The to-be-signed data of the Sig$_{AS\_AAC1}$ includes the ID$_{REQ}$, the Nonce$_{REQ}$, and the Pub$_{AAC}\oplus$Nonce$_{AACPub}$. The to-be-signed data of the Sig$_{AS\_AAC2}$ includes the ID$_{AAC}\oplus$Nonce$_{AACID}$, the Nonce$_{AAC}$, and the Pub$_{REQ}$.

At S709, after receiving the ASVeri, the AAC executes the following operations (1) to (9).

In operation (1), an XOR is performed on the Nonce$_{AACID}$ and the ID$_{AAC}$Nonce$_{AACID}$, to recover the ID$_{AAC}$, and whether the ID$_{AAC}$ is the same as the own identity identifier ID$_{AAC}$ of the AAC is checked.

In operation (2), whether the Nonce$_{AAC}$ is the same as the Nonce$_{AAC}$ generated by the AAC is checked.

In operation (3), the Sig$_{AS\_AAC2}$ is verified by using the public key of the AS-AAC.

In operation (4), whether the Cert$_{REQ}$ in the Pub$_{REQ}$ is the same as the Cert$_{REQ}$ obtained by decrypting the EncData$_{REQ}$.

In operation (5), the Sig$_{REQ}$ in the REQInit is verified by using the Cert$_{REQ}$.

In operation (6), if any one of the above checking and verification is failed, the ASVeri is discarded. If the checking and verification are all successful, an identity authentication result for the REQ is determined according to the Res$_{REQ}$ in the Pub$_{REQ}$. If it is determined that the REQ is illegal, the authentication process is ended.

In operation (7), the authentication result information ciphertext EncData$_{AAC}$ is calculated using the message encryption key with the symmetric encryption algorithm.

In operation (8), the Sig$_{AAC}$ of the AAC is calculated.

In operation (9), the MacTag$_{AAC}$ is calculated according to requirements.

At S710, the AAC sends a third authentication response message AACAuth to the REQ.

The AACAuth includes the Nonce$_{REQ}$, the Nonce$_{AAC}$, the EncData$_{AAC}$, the Sig$_{AAC}$, and the MacTag$_{AAC}$. The Nonce$_{REQ}$ and the Nonce$_{AAC}$ are optional fields, and are respectively identical with the Nonce$_{REQ}$ in the REQInit and the Nonce$_{AAC}$ generated by the AAC. The to-be-encrypted data of the EncData$_{AAC}$ includes the ID$_{REQ}$, the Nonce$_{REQ}$, the Pub$_{AAC}\oplus$Nonce$_{AACPub}$, the Sig$_{AS\_AAC1}$, and the Nonce$_{AACPub}$. The to-be-signed data of the Sig$_{ACC}$ includes other fields ahead of the Sig$_{AAC}$ in the AACAuth. The MacTag$_{AAC}$ is an optional field, and is generated by calculating the information including the fields in the AACAuth other than the MacTag$_{AAC}$ using the message integrity check key with the integrity checking algorithm.

At S711, after receiving the AACAuth, the REQ executes the following operations (1) to (7).

In operation (1), if there is the Nonce$_{REQ}$ in the AACAuth, whether the Nonce$_{REQ}$ is the same as the Nonce$_{REQ}$ generated by the REQ is checked. If there is the Nonce$_{AAC}$ in the AACAuth, whether the Nonce$_{AAC}$ is the same as the Nonce$_{AAC}$ in the received AACInit is checked.

In operation (2), if there is the MacTag$_{AAC}$ in the AACAuth, the MacTag$_{AAC}$ is verified by the following verification process.

The information including the fields in the AACAuth other than the MacTag$_{AAC}$ is locally calculated using the message integrity check key with the integrity checking algorithm, to generate the MacTag$_{AAC}$ (the calculation manner is the same as the manner that the AAC calculates the MacTag$_{AAC}$), and the calculated MacTag$_{AAC}$ is compared with the MacTag$_{AAC}$ in the received AACAuth.

In operation (3), the EncData$_{AAC}$ is decrypted using the message encryption key with the symmetric encryption algorithm, to obtain the ID$_{REQ}$, the Nonce$_{REQ}$, the Pub$_{AAC}\oplus$Nonce$_{AACPub}$, the Sig$_{AS\_AAC1}$, and the Nonce$_{AACPub}$.

In operation (4), whether the ID$_{REQ}$ and the Nonce$_{REQ}$ obtained by the decryption are respectively identical with the own identity identifier ID$_{REQ}$ of the REQ and the Nonce$_{REQ}$ generated by the REQ.

In operation (5), an XOR is performed on the Nonce$_{AACPub}$ and the Pub$_{AAC}\oplus$Nonce$_{AACPub}$ obtained by the decryption, to recover the Pub$_{AAC}$.

In operation (6), the Sig$_{AAC}$ is verified by using the Cert$_{AAC}$ in the Pub$_{AAC}$, and the Sig$_{AS\_AAC1}$ is verified by using the public key of the AS-AAC.

In operation (7), if the above checking and the verification are all successful, the identity authentication result of the AAC is determined according to the Res$_{AAC}$ in the Pub$_{AAC}$. If any one of the above checking and verification is failed, the AACAuth is discarded.

It is to be noted that, the verification for the Sig$_{REQ}$ in S709 may be changed to be executed in S705. That is, after acquiring the REQInit, the AAC verifies the Sig$_{REQ}$ by using the Cert$_{REQ}$ obtained by decrypting the EncData$_{REQ}$ in the REQInit. After the verification is successful, S706 is then executed. In this case, the Pub$_{REQ}$ in the embodiment of FIG. 7 may be replaced with the Res$_{REQ}$. Alternatively, the verification for the Sig$_{REQ}$ in S709 may be changed to be executed in S707. In this case, the Sig$_{REQ}$ may be sent to the AS-AAC by the AACVeri of S706. The AS-AAC verifies the Sig$_{REQ}$ by using the Cert$_{REQ}$. The subsequent operations are then executed after the verification is successful.

Figure 8:
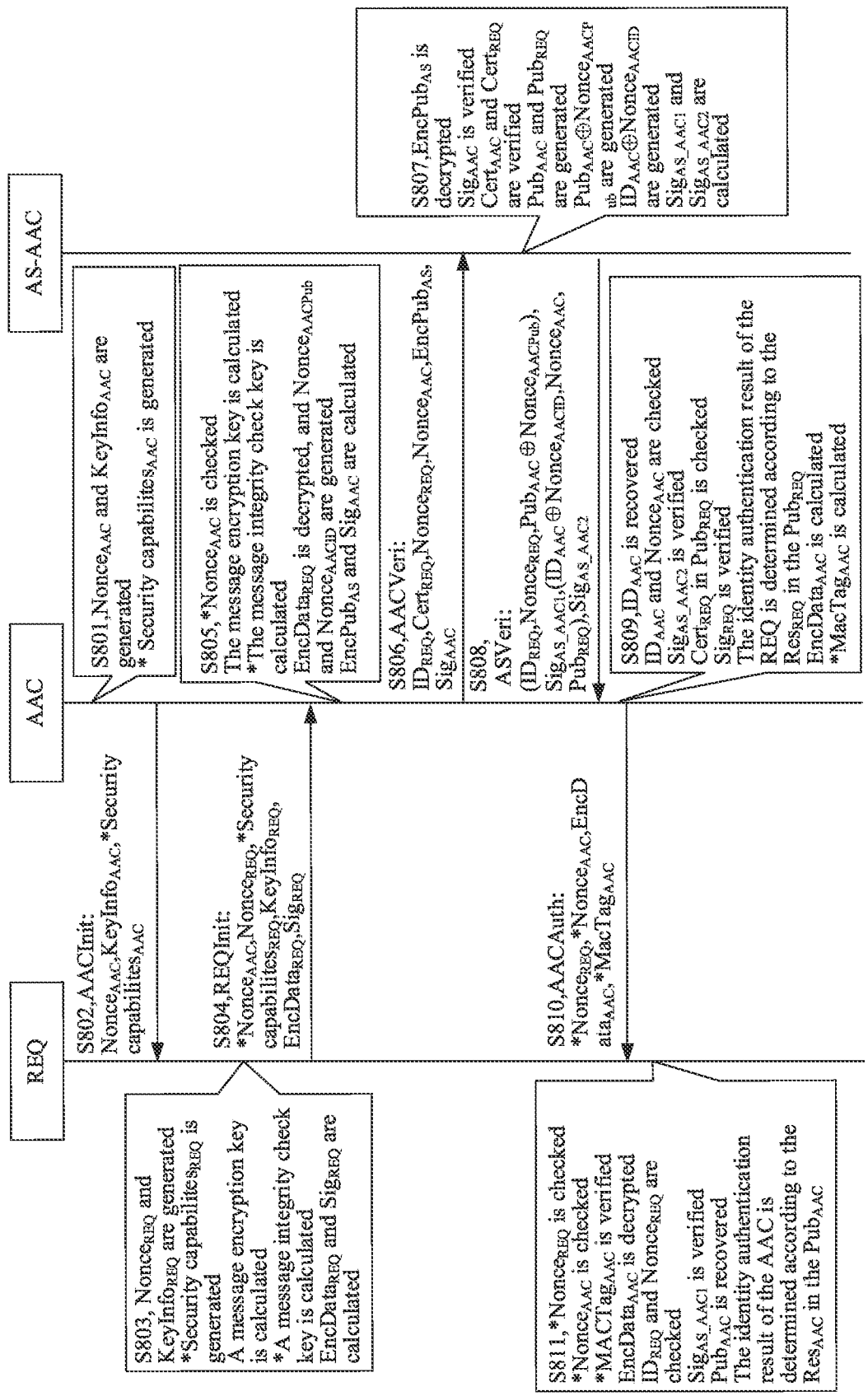
FIG. 8 is a schematic diagram of yet another identity authentication method in a non-roaming case according to an embodiment of the present disclosure, wherein "*" represents an optional field or an optional operation.

FIG. 8 shows another embodiment of the identity authentication method in the non-roaming case. The AS-AAC (or the AS-REQ) may represent the AS trusted by both the REQ and the AAC. In this embodiment, the process of negotiating the message encryption key between the REQ and the AAC is fused in the identity authentication process in parallel, for facilitating project implementation. A digital signature Sig$_{AAC}$ of the AAC is verified by the AS-AAC. The method includes the following operations S801 to S811.

At S801, the AAC generates the Nonce$_{AAC}$ and the KeyInfo$_{AAC}$, and generates the Security capabilities$_{AAC}$ according to requirements.

At S802, the AAC sends a key request message AACInit to the REQ.

The AACInit includes the Nonce$_{AAC}$, the KeyInfo$_{AAC}$ and the Security capabilities$_{AAC}$. The Security capabilities$_{AAC}$ is an optional field.

At S803, the REQ generates the Nonce$_{REQ}$ and the KeyInfo$_{REQ}$, generates the Security capabilities$_{REQ}$ according to requirements, and performs key exchange calculation according to the temporary private key corresponding to the KeyInfo$_{REQ}$ and the temporary public key included by the KeyInfo$_{AAC}$, to generate the first key K1. The K1 is combined with the Nonce$_{AAC}$, the Nonce$_{REQ}$ and other information (other information used by the REQ and the AAC being the same and optional, for example, a specific string), and the message encryption key and the message integrity check key are calculated based on the combination by using the negotiated or preset key derivation algorithm. The EncData$_{REQ}$ is calculated using the message encryption key with the symmetric encryption algorithm. The Sig$_{REQ}$ is calculated.

The operation that the REQ calculates the message integrity check key is an optional operation, which may be executed when the message integrity check key is used.

At S804, the REQ sends an identity ciphertext message REQInit to the AAC.

The REQInit includes the Nonce$_{AAC}$, the Nonce$_{REQ}$, the Security capabilities$_{REQ}$, the KeyInfo$_{REQ}$, the EncData$_{REQ}$, and the Sig$_{REQ}$. The Nonce$_{AAC}$ and the Security capabilities$_{REQ}$ are optional fields, and the Nonce$_{AAC}$ is identical with the Nonce$_{AAC}$ in the AACInit. The to-be-encrypted data of the EncData$_{REQ}$ includes the ID$_{REQ}$ and the Cert$_{REQ}$. The to-be-signed data of the Sig$_{REQ}$ includes other fields ahead of the Sig$_{REQ}$ in the REQInit.

At S805, after receiving the REQInit, the AAC executes the following operations (1) to (6).

In operation (1), if there is the Nonce$_{AAC}$ in the REQInit, whether the Nonce$_{AAC}$ is the same as the Nonce$_{AAC}$ generated by the AAC is checked. In response to the Nonce$_{AAC}$ being different from the Nonce$_{AAC}$ generated by the AAC, the REQInit is discarded.

In operation (2), key exchange calculation is performed according to the temporary private key corresponding to the KeyInfo$_{AAC}$ and the temporary public key included in the KeyInfo$_{REQ}$, to generate the first key K1. The K1 is combined with the Nonce$_{AAC}$, the Nonce$_{REQ}$ and other information (other information used by the AAC and the REQ being identical and optional, for example, a specific string), and the message encryption key and the message integrity check key are calculated based on the combination by using the negotiated or preset key derivation algorithm. The operation that the AAC calculates the message integrity check key is an optional operation, which may be executed when the message integrity check key is used.

In operation (3), the EncData$_{REQ}$ is decrypted using the message encryption key with the symmetric encryption algorithm, to obtain the Cert$_{REQ}$ and the ID$_{REQ}$.

In operation (4), the Nonce$_{AACID}$ and the Nonce$_{AACPub}$ are generated.

In operation (5), the identity information ciphertext EncPub$_{AS}$ of the AAC is calculated using the public key of the encryption certificate.

In operation (6), the digital signature Sig$_{AA}$ of the AAC is calculated.

At S806, the AAC sends a first authentication request message AACVeri to the AS-AAC.

The AACVeri includes the ID$_{REQ}$, the Cert$_{REQ}$, the Nonce$_{REQ}$, the Nonce$_{AAC}$, the EncPub$_{AS}$ and the Sig$_{AAC}$. The ID$_{REQ}$, the Cert$_{REQ}$, and the Nonce$_{REQ}$ are respectively identical with corresponding fields in the REQInit. The to-be-encrypted data of the EncPub$_{AS}$ includes the ID$_{AAC}$, the Cert$_{AAC}$, the Nonce$_{AACPub}$, the Nonce$_{AACID}$. The to-be-signed data of the Sig$_{AAC}$ includes other fields ahead of the Sig$_{AAC}$ in the AACVeri.

At S807, after receiving the AACVeri, the AS-AAC executes the following operations (1) to (4).

In operation (1), the EncPub$_{AS}$ is decrypted, to obtain the ID$_{AAC}$, the Cert$_{AAC}$, the Nonce$_{AACID}$ and the Nonce$_{AACPub}$.

In operation (2), the Sig$_{AAC}$ is verified by using the Cert$_{AAC}$.

In operation (3), the legality of the Cert$_{AAC}$ and the Cert$_{REQ}$ is respectively verified to obtain the Res$_{AAC}$ and the Res$_{REQ}$. The Pub$_{AAC}$ is generated according to the information including the Res$_{AAC}$, and the Pub$_{REQ}$ is generated according to the information including the Cert$_{REQ}$ and the Res$_{REQ}$. An XOR is performed on the ID$_{AAC}$ and the Nonce$_{AACID}$, to generate the ID$_{AAC}\oplus$Nonce$_{AACID}$. An XOR is performed on the Pub$_{AAC}$ and the Nonce$_{AACID}$, to generate the Pub$_{AAC}\oplus$Nonce$_{AACPub}$.

In operation (4), a first digital signature Sig$_{AS\_AAC1}$ and a second digital signature Sig$_{AS\_AAC2}$ are calculated.

At S808, the AS-AAC sends a first authentication response message ASVeri to the AAC.

The ASVeri includes the ID$_{REQ}$, the Nonce$_{REQ}$, the Pub$_{AAC}\oplus$Nonce$_{AACPub}$, the Sig$_{AS\_AAC1}$, the ID$_{AAC}\oplus$Nonce$_{AACID}$, the Nonce$_{AAC}$, the Pub$_{REQ}$ and the Sig$_{AS\_AAC2}$. The ID$_{REQ}$, the Nonce$_{REQ}$, the Nonce$_{AACPub}$, the ID$_{AAC}$, the Nonce$_{AACID}$ and the Nonce$_{AAC}$ are respectively identical with corresponding fields in the AACVeri. The to-be-signed data of the Sig$_{AS\_AAC1}$ includes the ID$_{REQ}$, the Nonce$_{REQ}$, and the Pub$_{AAC}\oplus$Nonce$_{AACPub}$. The to-be-signed data of the Sig$_{AS\_AAC2}$ includes the ID$_{AAC}\oplus$Nonce$_{AACID}$, the Nonce$_{AAC}$, and the Pub$_{REQ}$.

At S809, after receiving the ASVeri, the AAC executes the following operations (1) to (8).

In operation (1), an XOR is performed on the Nonce$_{AACID}$ and the ID$_{AAC}$ Nonce$_{AAC1}$, to recover the ID$_{AAC}$, and whether the ID$_{AAC}$ is the same as the own identity identifier ID$_{AAC}$ of the AAC is checked.

In operation (2), whether the Nonce$_{AAC}$ is the same as the Nonce$_{AAC}$ generated by the AAC is checked.

In operation (3), the Sig$_{AS\_AAC2}$ is verified by using the public key of the AS-AAC.

In operation (4), whether the $Cert_{REQ}$ in the $Pub_{REQ}$ is the same as the $Cert_{REQ}$ obtained by decrypting the $EncData_{REQ}$.

In operation (5), the $Sig_{REQ}$ in the REQInit is verified by using the $Cert_{REQ}$.

In operation (6), if any one of the above operations of checking and verification is failed, the ASVeri is discarded. If checking and verification are all successful, an identity authentication result for the REQ is determined according to the $Res_{REQ}$ in the $Pub_{REQ}$. If it is determined that the REQ is illegal, the authentication process is ended.

In operation (7), the $EncData_{AAC}$ is calculated using the message encryption key with the symmetric encryption algorithm.

In operation (8), the $MacTag_{AAC}$ is calculated according to requirements.

At S810, the AAC sends a third authentication response message AACAuth to the REQ.

The AACAuth includes the $Nonce_{REQ}$, the $Nonce_{AAC}$, the $EncData_{AAC}$, and the $MacTag_{AAC}$. The $Nonce_{REQ}$ and the $Nonce_{AAC}$ are optional fields, and are respectively identical with the $Nonce_{REQ}$ in the REQInit and the $Nonce_{AAC}$ generated by the AAC. The to-be-encrypted data of the $EncData_{AAC}$ includes the $ID_{REQ}$, the $Nonce_{REQ}$, the $Pub_{ACC} \oplus Nonce_{AACPub}$, the $Sig_{AS\_AAC1}$ and the $Nonce_{AACPub}$. The $ID_{REQ}$, the $Nonce_{REQ}$, the $Pub_{AAC} \oplus Nonce_{AACPub}$, and the $Sig_{AS\_AAC1}$ are respectively identical with corresponding fields in the ASVeri. The $MacTag_{AAC}$ is an optional field, and is calculated in the process as described in the embodiment of FIG. 7.

At S811, after receiving the AACAuth, the REQ executes the following operations (1) to (7).

In operation (1), if there is the $Nonce_{REQ}$ in the AACAuth, whether the $Nonce_{REQ}$ is the same as the $Nonce_{REQ}$ generated by the REQ is checked. If there is the $Nonce_{AAC}$ in the AACAuth, whether the $Nonce_{AAC}$ is the same as the $Nonce_{AAC}$ in the received AACInit is checked.

In operation (2), if there is the $MacTag_{AAC}$ in the AACAuth, the $MacTag_{AAC}$ is verified by the verification process as described in the embodiment of FIG. 7.

In operation (3), the $EncData_{AAC}$ is decrypted using the message encryption key with the symmetric encryption algorithm, to obtain the $ID_{REQ}$, the $Nonce_{REQ}$, the $Pub_{AAC} \oplus Nonce_{AACPub}$, the $Sig_{AS\_AAC1}$, and the $Nonce_{AACPub}$.

In operation (4), whether the $ID_{REQ}$ and the $Nonce_{REQ}$ obtained by the decryption are respectively identical with the own $ID_{REQ}$ of the REQ and the $Nonce_{REQ}$ generated by the REQ.

In operation (5), the $Sig_{AS\_AAC1}$ is verified by using the public key of the AS-AAC.

In operation (6), an XOR is performed on the $Nonce_{AACPub}$ and the $Pub_{AAC} \oplus Nonce_{AACPub}$ obtained by the decryption, to recover the $Pub_{AAC}$.

In operation (7), if the checking and the verification are all successful, the identity authentication result of the AAC is determined according to the $Res_{AAC}$ in the $Pub_{AAC}$. If any one of the operations of checking and verification is failed, the AACAuth is discarded.

It is to be noted that, the verification for the $Sig_{REQ}$ in S809 may be changed to be executed in S805. That is, after acquiring the REQInit, the AAC verifies the $Sig_{REQ}$ by using the $Cert_{REQ}$ obtained by decrypting the $EncData_{REQ}$ in the REQInit. After the verification is successful, S806 is then executed. In this case, the $Pub_{REQ}$ in the embodiment of FIG. 8 may be replaced with the $Res_{REQ}$. Alternatively, the verification for the $Sig_{REQ}$ in S809 may be changed to be executed in S807. In this case, the $Sig_{REQ}$ may be sent to the AS-AAC by the AACVeri of S806. The AS-AAC verifies the $Sig_{REQ}$ by using the $Cert_{REQ}$. The subsequent operations are then executed after the verification is successful.

Figure 9:
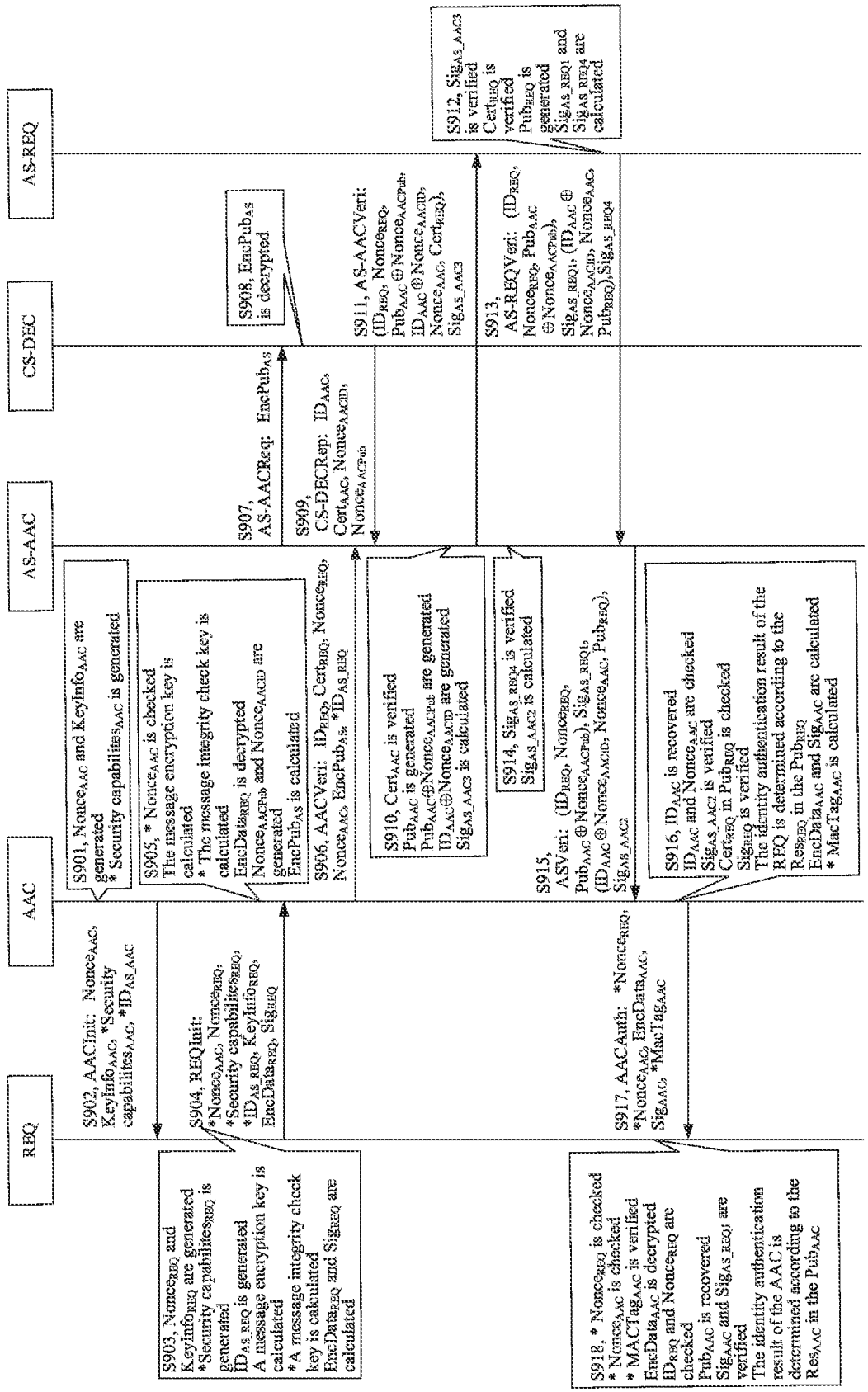
FIG. 9 is a schematic diagram of another identity authentication method in a roaming case according to an embodiment of the present disclosure, wherein "*" represents an optional field or an optional operation.

FIG. 9 shows another embodiment of the identity authentication method in the roaming case. In this embodiment, the process of negotiating the message encryption key between the REQ and the AAC is fused in the identity authentication process in parallel, for facilitating project implementation. A digital signature $Sig_{AAC}$ of the AAC is verified by the REQ. The method includes the following operations S901 to S918.

At S901, the AAC generates $Nonce_{AAC}$ and $KeyInfo_{AAC}$, and generates Security $capabilities_{AAC}$ according to requirements.

At S902, the AAC sends a key request message AACInit to the REQ.

The AACInit includes the $Nonce_{AAC}$, the $KeyInfo_{AAC}$, the Security $capabilities_{AAC}$, and the $ID_{AS\_AAC}$. The Security $capabilities_{AAC}$ and the $ID_{AS\_AAC}$ are optional fields. The $ID_{AS\_AAC}$ represents the identity identifier of at least one AS trusted by the AAC, and the REQ determine, according to the $ID_{AS\_AAC}$, whether there is an AS trusted by the AS and the REQ (hereinafter the same).

At S903, the REQ generates the $Nonce_{REQ}$ and the $KeyInfo_{REQ}$, generates the $ID_{AS\_REQ}$ and the Security $capabilities_{REQ}$ according to requirements, and performs key exchange calculation according to the temporary private key corresponding to the $KeyInfo_{REQ}$ and the temporary public key included by the $KeyInfo_{AAC}$, to generate the first key K1. The K1 is combined with the $Nonce_{AAC}$, the $Nonce_{REQ}$ and other information (other information used by the AAC and the REQ being identical and optional, for example, a specific string), and the message encryption key and the message integrity check key are calculated based on the combination by using the negotiated or preset key derivation algorithm. An identity information ciphertext $EncData_{REQ}$ of the REQ is calculated using the message encryption key with the symmetric encryption algorithm. The $Sig_{REQ}$ is calculated.

The $ID_{AS\_REQ}$ and the Security $capabilities_{AAC}$ are optional fields. The $ID_{AS\_REQ}$ represents the identity identifier of at least one AS trusted by the REQ. When there is the $ID_{AS\_AAC}$ in the AACInit, the REQ tries to select, from the trusted ASs, the identity identifier of at least one AS which is the same as that in the $ID_{AS\_AAC}$, as the $ID_{AS\_REQ}$. If the selection is failed, the REQ takes the identity identifier of at least one AS trusted by the REQ as the $ID_{AS\_REQ}$. When there is no $ID_{AS\_AAC}$ in the AACInit, the REQ takes the identity identifier of at least one AS trusted by the REQ as the $ID_{AS\_REQ}$ (which can be applied to the entire text). The operation that the REQ calculates the message integrity check key is an optional operation, which may be executed when the message integrity check key is used.

At S904, the REQ sends an identity ciphertext message REQInit to the AAC.

The REQInit includes the $Nonce_{AAC}$, the $Nonce_{REQ}$, the Security $capabilities_{REQ}$, the $ID_{AS\_REQ}$, the $KeyInfo_{REQ}$, the $EncData_{REQ}$, and the $Sig_{REQ}$. The $Nonce_{AAC}$, the $ID_{AS\_REQ}$, and the Security $capabilities_{REQ}$ are optional fields. The $Nonce_{AAC}$ is identical with a corresponding field in the AACInit. The to-be-encrypted data of the $EncData_{REQ}$ includes the $ID_{REQ}$ and the $Cert_{REQ}$. The to-be-signed data of the $Sig_{REQ}$ includes other fields ahead of the $Sig_{REQ}$ in the REQInit. When the REQInit does not include the field $Nonce_{AAC}$, the to-be-signed data of the $Sig_{REQ}$ further includes the field $Nonce_{AAC}$ in the AACInit.

At S905, after receiving the REQInit, the AAC executes the following operations (1) to (6).

In operation (1), if there is the $\text{Nonce}_{AAC}$ in the REQInit, whether the $\text{Nonce}_{AAC}$ is the same as the $\text{Nonce}_{AAC}$ generated by the AAC is checked. In response to the $\text{Nonce}_{AAC}$ being different from the $\text{Nonce}_{AAC}$ generated by the AAC, the REQInit is discarded.

In operation (2), key exchange calculation is performed according to the temporary private key corresponding to the $\text{KeyInfo}_{AAC}$ and the temporary public key included in the $\text{KeyInfo}_{REQ}$, to generate the first key K1. The K1 is combined with the $\text{Nonce}_{AAC}$, the $\text{Nonce}_{REQ}$ and other information (other information used by the AAC and the REQ being identical and optional, for example, a specific string), and the message encryption key and the message integrity check key are calculated based on the combination by using the negotiated or preset key derivation algorithm. The operation that the AAC calculates the message integrity check key is an optional operation, which may be executed when the message integrity check key is used.

In operation (3), the $\text{EncData}_{REQ}$ is decrypted using the message encryption key with the symmetric encryption algorithm, to obtain the $\text{Cert}_{REQ}$ and the $\text{ID}_{REQ}$.

In operation (4), the $\text{Nonce}_{AACID}$ and the $\text{Nonce}_{AACPub}$ are generated.

In operation (5), if the REQInit carries the $\text{ID}_{AS\_REQ}$, and the AACInit carries the $\text{ID}_{AS\_AAC}$, the AAC determines whether there is the identity identifier of at least one same AS in the $\text{ID}_{AS\_REQ}$ and the $\text{ID}_{AS\_AAC}$. If there is the identity identifier of at least one same AS, that is, it is determined to be the non-roaming case, the AAC determines the first authentication server involved in identity authentication from the identity identifier of the at least one AS trusted by both the REQ and the AAC. If there is no the identity identifier of at least one same AS, that is, it is determined to be the roaming case, the AAC determines, according to the $\text{ID}_{AS\_AAC}$, the first authentication server AS-AAC involved in identity authentication, and sends the $\text{ID}_{AS\_REQ}$ to the AS-AAC, and the AS-AAC determines the second authentication server AS-REQ according to the $\text{ID}_{AS\_REQ}$.

Alternatively, if the REQInit carries the $\text{ID}_{AS\_REQ}$, but the AACInit does not carry the $\text{ID}_{AS\_AAC}$, the AAC determines whether there is the identity identifier of at least one same AS in the ASs trusted by the $\text{ID}_{AS\_REQ}$ and the AAC. If there is the identity identifier of at least one same AS, that is, it is determined to be the non-roaming case, the AAC determines the first authentication server involved in identity authentication from the identity identifier of the at least one AS trusted by both the REQ and the AAC. If there is no the identity identifier of at least one same AS, that is, it is determined to be the roaming case, the AAC determines, according to the authentication server trusted by the AAC, the first authentication server AS-AAC involved in identity authentication, and sends the $\text{ID}_{AS\_REQ}$ to the AS-AAC, and the AS-AAC determines the second authentication server AS-REQ according to the $\text{ID}_{AS\_REQ}$.

It is to be noted that, a result of the determination in this embodiment indicates the roaming case.

In operation (6), the $\text{EncPub}_{AS}$ of the AAC is calculated by using the public key of the encryption certificate.

At S906, the AAC sends a first authentication request message AACVeri to the AS-AAC.

The AACVeri includes the $\text{ID}_{REQ}$, the $\text{Cert}_{REQ}$, the $\text{Nonce}_{REQ}$, the $\text{Nonce}_{AAC}$, the $\text{EncPub}_{AS}$, and the $\text{ID}_{AS\_REQ}$. The $\text{ID}_{AS\_REQ}$ is an optional field. The $\text{Nonce}_{REQ}$, the $\text{ID}_{AS\_REQ}$, the $\text{ID}_{REQ}$, and the $\text{Cert}_{REQ}$ are respectively identical with corresponding fields in the REQInit. The $\text{Nonce}_{AAC}$ are identical with the $\text{Nonce}_{AAC}$ generated by the AAC. The to-be-encrypted data of the $\text{EncPub}_{AS}$ includes the $\text{ID}_{AAC}$, the $\text{Cert}_{AAC}$, the $\text{Nonce}_{AACPub}$, the $\text{Nonce}_{AACID}$.

At S907, after receiving the AACVeri, the AS-AAC sends a decryption request message AS-AACReq to a Certificate Sever-Decrypt CS-DEC.

The AS-AACReq includes the EncPubAS in the AACVeri.

At S908, after receiving the AS-AACReq, the CS-DEC decrypts the $\text{EncPub}_{AS}$ by using the private key corresponding to the encryption certificate, to obtain the $\text{ID}_{AAC}$, the $\text{Cert}_{AAC}$, the $\text{Nonce}_{AACID}$, and the $\text{Nonce}_{AACPub}$.

At S909, the CS-DEC sends a decryption response message CS-DECRep to the AS-AAC.

The CS-DECRep includes the $\text{ID}_{AAC}$, the $\text{Cert}_{AAC}$, the $\text{Nonce}_{AACID}$ and the $\text{Nonce}_{AACPub}$, which are obtained by decryption.

At S910, after receiving the CS-DECRep, the AS-AAC executes the following operations (1) to (4).

In operation (1), the legality of the $\text{Cert}_{AAC}$ is verified to obtain the $\text{Res}_{AAC}$, and the $\text{Pub}_{AAC}$ is generated according to the information including the $\text{Cert}_{AAC}$ and the $\text{Res}_{AAC}$.

In operation (2), an XOR is performed on the $\text{ID}_{AAC}$ and the $\text{Nonce}_{AACID}$, to generate $\text{ID}_{AAC}\text{Nonce}_{AACID}$, and an XOR is performed on the $\text{Pub}_{AAC}$ and the $\text{Nonce}_{AACPub}$, to generate the $\text{Pub}_{AAC}\text{Nonce}_{AACPub}$.

In operation (3), if there is the $\text{ID}_{AS\_REQ}$ in the AACVeri, the AS-AAC determines the second authentication server AS-REQ according to the $\text{ID}_{AS\_REQ}$. If there is no $\text{ID}_{AS\_REQ}$ in the AACVeri, it indicates that the AS-AAC is known to the AS-REQ.

In operation (4), the $\text{Sig}_{AS\_AAC3}$ is calculated.

At S911, the AS-AAC sends a second authentication request message AS-AACVeri to the AS-REQ.

The AS-AACVeri includes the $\text{ID}_{REQ}$, the $\text{Nonce}_{REQ}$, the $\text{Pub}_{AAC} \oplus \text{Nonce}_{AACPub}$, the $\text{ID}_{AAC} \oplus \text{Nonce}_{AACID}$, the $\text{Nonce}_{AAC}$, the $\text{Cert}_{REQ}$, and the $\text{Sig}_{AS\_AAC3}$. The $\text{ID}_{REQ}$, the $\text{Nonce}_{REQ}$, the $\text{Cert}_{REQ}$, the $\text{Nonce}_{AACPub}$, the $\text{ID}_{AAC}$, the $\text{Nonce}_{AACID}$, and the $\text{Nonce}_{AAC}$ are respectively identical with corresponding fields in the AACVeri. The to-be-signed data of the $\text{Sig}_{AS\_AAC3}$ includes other fields ahead of the $\text{Sig}_{AS\_AAC3}$ in the AS-AACVeri.

At S912, after receiving the AS-AACVeri, the AS-REQ executes the following operations (1) to (3).

In operation (1), the $\text{Sig}_{AS\_AAC3}$ is verified by using the public key of the AS-AAC. If the verification is failed, the AS-AACVeri is discarded.

In operation (2), the legality of the $\text{Cert}_{REQ}$ is verified to obtain the $\text{Res}_{REQ}$, and the $\text{Pub}_{REQ}$ is generated according to the information including the $\text{Cert}_{REQ}$ and the $\text{Res}_{REQ}$.

In operation (3), the first digital signature $\text{Sig}_{AS\_REQ1}$ and the fourth digital signature $\text{Sig}_{AS\_REQ4}$ are calculated.

At S913, the AS-REQ sends a second authentication response message AS-REQVeri to the AS-AAC.

The AS-REQVeri includes the $\text{ID}_{REQ}$, the $\text{Nonce}_{REQ}$, the $\text{Pub}_{AAC} \text{Nonce}_{AACPub}$, the $\text{Sig}_{AS\_REQ1}$, $\text{ID}_{AAC} \text{Nonce}_{AACID}$, the $\text{Nonce}_{AAC}$, the $\text{Pub}_{REQ}$, and the $\text{Sig}_{AS\_REQ}$. The $\text{ID}_{REQ}$, the $\text{Nonce}_{REQ}$, the $\text{Pub}_{AAC} \text{Nonce}_{AACPub}$, $\text{ID}_{AAC}$ $\text{Nonce}_{AACID}$, and the $\text{Nonce}_{AAC}$ are respectively identical to corresponding fields in the AS-AACVeri. The to-be-signed data of the $\text{Sig}_{AS\_REQ1}$ includes the $\text{ID}_{REQ}$, the $\text{Nonce}_{REQ}$, and the $\text{Pub}_{AAC} \text{Nonce}_{AACPub}$. The to-be-signed data of the $\text{Sig}_{AS\_REQ4}$ includes $\text{ID}_{AAC} \text{Nonce}_{AACID}$, the $\text{Nonce}_{AAC}$, and the $\text{Pub}_{REQ}$.

At S914, after receiving the AS-REQVeri, the AS-AAC executes the following operations (1) to (2).

In operation (1), the $Sig_{AS\_REQ4}$ is verified by using the public key of the AS-REQ.

The AS-REQVeri is discarded in response to the verification being failed.

In operation (2), the second digital signature $Sig_{AS\_AAC2}$ is calculated.

At S915, the AS-AAC sends a first authentication response message ASVeri to the AAC.

The ASVeri includes the $ID_{REQ}$, the $Nonce_{REQ}$, the $Pub_{AAC}$ $Nonce_{AACPub}$, the $Sig_{AS\_REQ1}$, the $ID_{AAC}$ $Nonce_{AACID}$, the $Nonce_{AAC}$, the $Pub_{REQ}$, and the $Sig_{AS\_AAC2}$. The $ID_{REQ}$, the $Nonce_{REQ}$, the $Pub_{AAC}Nonce_{AACPub}$, the $Sig_{AS\_REQ1}$, the $ID_{AAC}$ $Nonce_{AACID}$, the $Nonce_{AAC}$, and the $Pub_{REQ}$ are respectively identical to corresponding fields in the AS-REQVeri. The to-be-signed data of the $Sig_{AS\_AAC2}$ includes the $ID_{AAC}Nonce_{AACID}$, the $Nonce_{AAC}$, and the $Pub_{REQ}$.

At S916, after receiving the ASVeri, the AAC executes the following operations (1) to (9).

In operation (1), an XOR is performed on the $Nonce_{AACID}$ and the $ID_{AAC}Nonce_{AACID}$, to recover the $ID_{AAC}$, and whether the $ID_{AAC}$ is the same as the own identity identifier $ID_{AAC}$ of the AAC is checked.

In operation (2), whether the $Nonce_{AAC}$ is the same as the $Nonce_{AAC}$ generated by the AAC is checked.

In operation (3), the $Sig_{AS\_AAC2}$ is verified by using the public key of the AS-AAC.

In operation (4), whether the $Cert_{REQ}$ in the $Pub_{REQ}$ is the same as the $Cert_{REQ}$ obtained by decrypting the $EncData_{REQ}$.

In operation (5), the $Sig_{REQ}$ in the REQInit is verified by using the $Cert_{REQ}$.

In operation (6), if any one of the above checking and verification is failed, the ASVeri is discarded. If the checking and verification are all successful, an identity authentication result for the REQ is determined according to the $Res_{REQ}$ in the $Pub_{REQ}$. If it is determined that the REQ is illegal, the authentication process is ended.

In operation (7), the authentication result information ciphertext $EncData_{AAC}$ is calculated using the message encryption key with the symmetric encryption algorithm.

In operation (8), the $Sig_{AAC}$ is calculated.

In operation (9), the $MacTag_{AAC}$ is calculated according to requirements.

At S917, the AAC sends a third authentication response message AACAuth to the REQ.

The AACAuth includes the $Nonce_{REQ}$, the $Nonce_{AAC}$, the $EncData_{AAC}$, the $Sig_{AAC}$, and the $MacTag_{AAC}$. The $Nonce_{REQ}$ and the $Nonce_{AAC}$ are optional fields, and are respectively identical with the $Nonce_{REQ}$ in the REQInit and the $Nonce_{AAC}$ generated by the AAC. The $MacTag_{AAC}$ is an optional field, and is calculated in a process as described in the embodiment of FIG. 7. The to-be-encrypted data of the $EncData_{AAC}$ includes the $ID_{REQ}$, the $Nonce_{REQ}$, the $Pub_{AAC}\oplus Nonce_{ACCPub}$, the $Sig_{AS\_REQ1}$, and the $Nonce_{AACPub}$. The $ID_{REQ}$, the $Nonce_{REQ}$, the $Pub_{AAC}$ $Nonce_{AACPub}$, and the $Sig_{AS\_REQ1}$ are respectively identical to corresponding fields in the ASVeri. The to-be-signed data of the $Sig_{AAC}$ includes other fields ahead of the $Sig_{AAC}$ in the AACAuth.

At S918, after receiving the AACAuth, the REQ executes the following operations (1) to (7).

In operation (1), if there is the $Nonce_{REQ}$ in the AACAuth, whether the $Nonce_{REQ}$ is the same as the $Nonce_{REQ}$ generated by the REQ is checked. If there is the $Nonce_{AAC}$ in the AACAuth, whether the $Nonce_{AAC}$ is the same as the $Nonce_{AAC}$ in the received AACInit is checked.

In operation (2), if there is the $MacTag_{AAC}$ in the AACAuth, the $MacTag_{AAC}$ is verified by a process as described in the embodiment of FIG. 7.

In operation (3), the $EncData_{AAC}$ is decrypted using the message encryption key with the symmetric encryption algorithm, to obtain the $ID_{REQ}$, the $Nonce_{REQ}$, the $Pub_{AAC}\oplus Nonce_{ACCPub}$, the $Sig_{AS\_AAC1}$, and the $Nonce_{AACPub}$.

In operation (4), whether the $ID_{REQ}$ and the $Nonce_{REQ}$ obtained by the decryption are respectively identical with the own $ID_{REQ}$ of the REQ and the $Nonce_{REQ}$ generated by the REQ.

In operation (5), an XOR is performed on the $Nonce_{AACPub}$ and the $Pub_{AAC}\oplus Nonce_{AACPub}$ obtained by the decryption, to recover the $Pub_{AAC}$.

In operation (6), the $Sig_{AAC}$ is verified by using the $Cert_{AAC}$ in the $Pub_{AAC}$, and the $Sig_{AS\_REQ1}$ is verified by using the public key of the AS-REQ.

In operation (7), if the above checking and the verification are all successful, the identity authentication result of the AAC is determined according to the $Res_{AAC}$ in the $Pub_{AAC}$. If any one of the above checking and verification is failed, the AACAuth is discarded.

It is to be noted that, the verification for the $Sig_{REQ}$ in S916 may be changed to be executed in S905. That is, after acquiring the REQInit, the AAC verifies the $Sig_{REQ}$ by using the $Cert_{REQ}$ obtained by decrypting the $EncData_{REQ}$ in the REQInit. After the verification is successful, S906 is then executed. In this case, the $Pub_{REQ}$ in the embodiment of FIG. 9 may be replaced with the $Res_{REQ}$. Alternatively, the verification for the $Sig_{REQ}$ in S916 may be changed to be executed in S912. In this case, the $Sig_{REQ}$ may be sent to the AS-REQ by the AACVeri of S906 or the AS-AACVeri of S911. The AS-REQ verifies the $Sig_{REQ}$ by using the $Cert_{REQ}$. The subsequent operations are then executed after the verification is successful.

Figure 10:
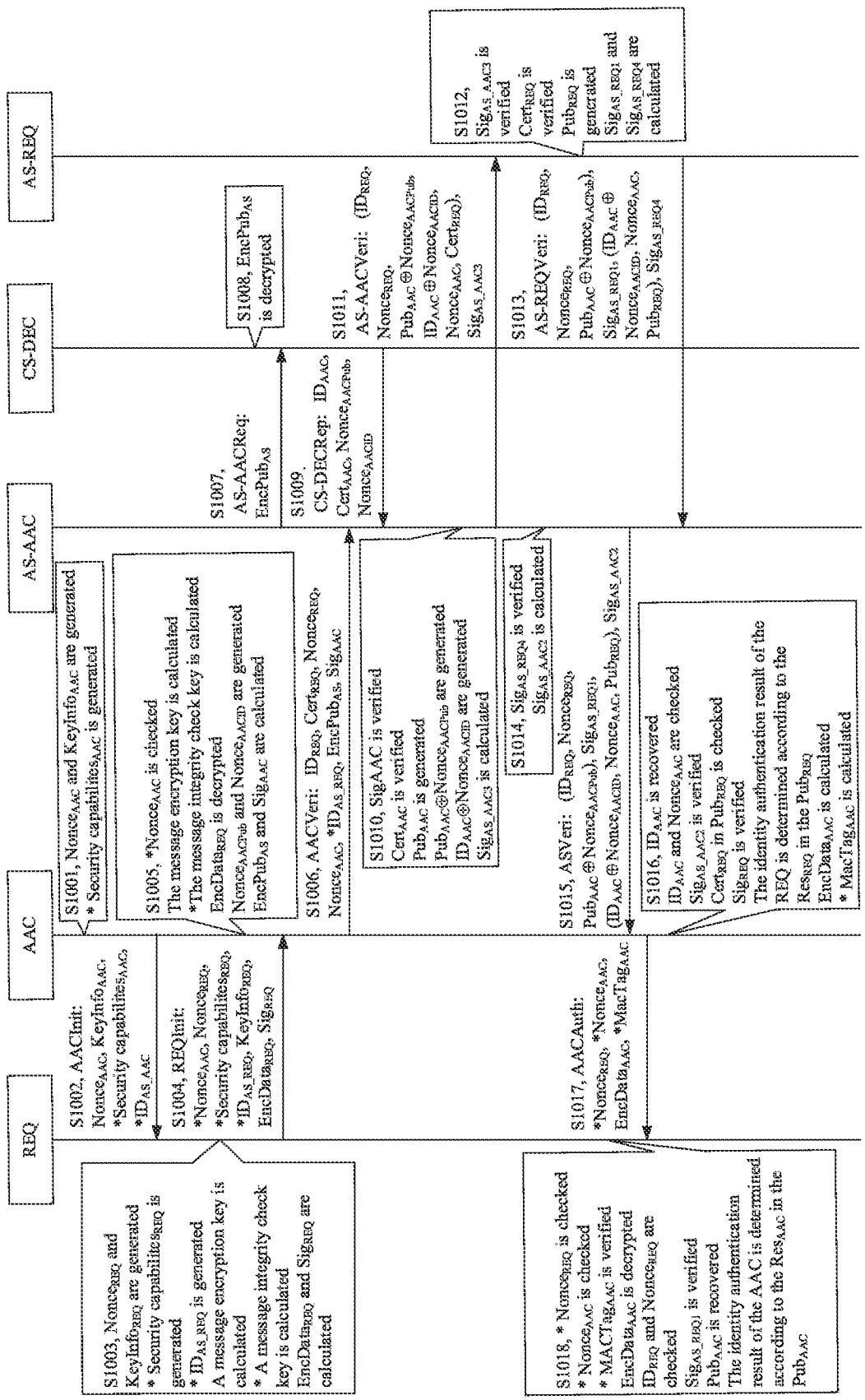
FIG. 10 is a schematic diagram of another identity authentication method in a roaming case according to an embodiment of the present disclosure, wherein "*" represents an optional field or an optional operation.

FIG. 10 shows another embodiment of the identity authentication method in the roaming case. In this embodiment, the process of negotiating the message encryption key between the REQ and the AAC is fused in the identity authentication process in parallel, for facilitating project implementation. A digital signature $Sig_{AAC}$ of the AAC is verified by the AS-AAC. The method includes the following operations S1001 to S1018.

At S1001, the AAC generates $Nonce_{AAC}$ and $KeyInfo_{AAC}$, and generates Security capabilities$_{AAC}$ according to requirements.

At S1002, the AAC sends a key request message AACInit to the REQ.

The AACInit includes the $Nonce_{AAC}$, the $KeyInfo_{AAC}$, the Security capabilities$_{AAC}$, and the $ID_{AS\_AAC}$. The Security capabilities$_{AAC}$ and the $ID_{AS\_AAC}$ are optional fields.

At S1003, the REQ generates the $Nonce_{REQ}$ and the $KeyInfo_{REQ}$, generates the $ID_{AS\_REQ}$ and the Security capabilities$_{REQ}$ according to requirements, and performs key exchange calculation according to the temporary private key corresponding to the $KeyInfo_{REQ}$ and the temporary public key included by the $KeyInfo_{AAC}$, to generate the first key K1. The K1 is combined with the $Nonce_{AAC}$, the $Nonce_{REQ}$ and other information (other information used by the AAC and the REQ being identical and optional, for example, a specific string), and the message encryption key and the message integrity check key are calculated based on the combination by using the negotiated or preset key derivation algorithm. An identity information ciphertext $EncData_{REQ}$ of the REQ is calculated using the message encryption key with the symmetric encryption algorithm. The $Sig_{REQ}$ is calculated.

The $ID_{AS\_REQ}$ and the Security capabilities$_{AAC}$ are optional fields. The operation that the REQ calculates the message integrity check key is an optional operation, which may be executed when the message integrity check key is used.

At S1004, the REQ sends an identity ciphertext message REQInit to the AAC.

The REQInit includes the Nonce$_{AAC}$, the Nonce$_{REQ}$, the Security capabilities$_{REQ}$, the $ID_{AS\_REQ}$, the KeyInfo$_{REQ}$, the EncData$_{REQ}$, and the $Sig_{REQ}$. The Nonce$_{AAC}$, the $ID_{AS\_REQ}$ and the Security capabilities$_{REQ}$ are optional fields. The Nonce$_{AAC}$ is identical to a corresponding field in the AACInit. The to-be-encrypted data of the EncData$_{REQ}$ includes the Cert$_{REQ}$ and the $ID_{REQ}$. The to-be-signed data of the $Sig_{REQ}$ includes other fields ahead of the $Sig_{REQ}$ in the REQInit.

At S1005, after receiving the REQInit, the AAC executes the following operations (1) to (6).

In operation (1), if there is the Nonce$_{AAC}$ in the REQInit, whether the Nonce$_{AAC}$ is the same as the Nonce$_{AAC}$ generated by the AAC is checked. In response to the Nonce$_{AAC}$ being different from the Nonce$_{AAC}$ generated by the AAC, the REQInit is discarded.

In operation (2), key exchange calculation is performed according to the temporary private key corresponding to the KeyInfo$_{AAC}$ and the temporary public key included in the KeyInfo$_{REQ}$, to generate the first key K1. The K1 is combined with the Nonce$_{AAC}$, the Nonce$_{REQ}$ and other information (other information used by the AAC and the REQ being identical and optional, for example, a specific string), and the message encryption key and the message integrity check key are calculated based on the combination by using the negotiated or preset key derivation algorithm. The operation that the AAC calculates the message integrity check key is an optional operation, which may be executed when the message integrity check key is used.

In operation (3), the EncData$_{REQ}$ is decrypted using the message encryption key with the symmetric encryption algorithm, to obtain the Cert$_{REQ}$ and the $ID_{REQ}$.

In operation (4), a first protection nonce Nonce$_{AACID}$ and a second protection nonce Nonce$_{AACPub}$ are generated.

In operation (5), identity information ciphertext EncPub$_{AS}$ of the AAC is calculated using the public key of the encryption certificate.

In operation (6), if the REQInit carries the $ID_{AS\_REQ}$, and the AACInit carries the $ID_{AS\_AAC}$, the AAC determines whether there is the identity identifier of at least one same AS in the $ID_{AS\_REQ}$ and the $ID_{AS\_AAC}$. If there is the identity identifier of at least one same AS, that is, it is determined to be the non-roaming case, the AAC determines the first authentication server involved in identity authentication from the identity identifier of the at least one AS trusted by both the REQ and the AAC. If there is no the identity identifier of at least one same AS, that is, it is determined to be the roaming case, the AAC determines, according to the $ID_{AS\_AAC}$, the first authentication server AS-AAC involved in identity authentication, and sends the $ID_{AS\_REQ}$ to the AS-AAC, and the AS-AAC determines the second authentication server AS-REQ according to the $ID_{AS\_REQ}$.

Alternatively, if the REQInit carries the $ID_{AS\_REQ}$, but the AACInit does not carry the $ID_{AS\_AAC}$, the AAC determines whether there is the identity identifier of at least one same AS in the ASs trusted by the $ID_{AS\_REQ}$ and the AAC. If there is the identity identifier of at least one same AS, that is, it is determined to be the non-roaming case, the AAC determines the first authentication server involved in identity authentication from the identity identifier of the at least one AS trusted by both the REQ and the AAC. If there is no the identity identifier of at least one same AS, that is, it is determined to be the roaming case, the AAC determines, according to the authentication server trusted by the AAC, the first authentication server AS-AAC involved in identity authentication, and sends the $ID_{AS\_REQ}$ to the AS-AAC, and the AS-AAC determines the second authentication server AS-REQ according to the $ID_{AS\_REQ}$.

It is to be noted that a result of the determination in this embodiment indicates the roaming case.

In operation (7), the $Sig_{AAC}$ of the AAC is calculated.

At S1006, the AAC sends a first authentication request message AACVeri to the AS-AAC.

The AACVeri may include the $ID_{REQ}$, the Cert$_{REQ}$, the Nonce$_{REQ}$, the Nonce$_{AAC}$, the $ID_{AS\_REQ}$, the EncPub$_{AS}$, and the $Sig_{AAC}$. The Nonce$_{REQ}$, $ID_{AS\_REQ}$, $ID_{REQ}$, and Cert$_{REQ}$ are respectively identical to corresponding fields in the REQInit. The Nonce$_{AAC}$ is identical to the Nonce$_{AAC}$ generated by the AAC, and the $ID_{AS\_REQ}$ is an optional field. The to-be-signed data of the EncPub$_{AS}$ includes the $ID_{AAC}$, the Cert$_{AAC}$, the Nonce$_{AACPub}$, and the Nonce$_{AACID}$. The to-be-encrypted data of the $Sig_{AAC}$ includes other fields ahead of the $Sig_{AAC}$ in the AACVeri.

At S1007, after receiving the AACVeri, the AS-AAC sends a decryption request message AS-AACReq to the CS-DEC.

The AS-AACReq includes the EncPub$_{AS}$ in the AACVeri.

At S1008, after receiving the AS-AACReq, the CS-DEC decrypts the EncPub$_{AS}$ by using the private key corresponding to the encryption certificate, to obtain the $ID_{AAC}$, the Cert$_{AAC}$, the Nonce$_{AACID}$, and the Nonce$_{AACPub}$.

At S1009, the CS-DEC sends a decryption response message CS-DECRep to the AS-AAC.

The CS-DECRep includes the $ID_{AAC}$, the Cert$_{AAC}$, the Nonce$_{AACID}$ and the Nonce$_{AACPub}$, which are obtained by decryption.

At S1010, after receiving the CS-DECRep, the AS-AAC executes the following operations (1) to (5).

In operation (1), the $Sig_{AAC}$ is verified by using the Cert$_{AAC}$.

In operation (2), if the verification of the $Sig_{AAC}$ is successful, the legality of the Cert$_{AAC}$ is verified to obtain the Res$_{AAC}$, and the Pub$_{AAC}$ is generated according to the information including the Res$_{AAC}$.

In operation (3), an XOR is performed on the $ID_{AAC}$ and the Nonce$_{AACID}$, to generate the $ID_{AAC}$ Nonce$_{AACID}$, and an XOR is performed on the Pub$_{AAC}$ and the Nonce$_{AACPub}$, to generate the Pub$_{AAC}$ Nonce$_{AACPub}$.

In operation (4), if there is the $ID_{AS\_REQ}$ in the AACVeri, the AS-AAC determines the second authentication server AS-REQ according to the $ID_{AS\_REQ}$. If there is no $ID_{AS\_REQ}$ in the AACVeri, it indicates that the AS-AAC is known to the AS-REQ.

In operation (5), the $Sig_{AS\_AAC3}$ is calculated.

At S1011, the AS-AAC sends a second authentication request message AS-AACVeri to the AS-REQ.

The AS-AACVeri includes the $ID_{REQ}$, the Nonce$_{REQ}$, the Pub$_{AAC}$ Nonce$_{AACPub}$, the $ID_{AAC}$ Nonce$_{AACID}$, the Nonce$_{AAC}$, the Cert$_{REQ}$, and the $Sig_{AS\_AAC3}$. The $ID_{REQ}$, the Nonce$_{REQ}$, the Cert$_{REQ}$, the Nonce$_{AACPub}$, the $ID_{AAC}$, the Nonce$_{AACID}$, and the Nonce$_{AAC}$ are respectively identical with corresponding fields in the AACVeri. The to-be-signed data of the $Sig_{AS\_AAC3}$ includes other fields ahead of the $Sig_{AS\_AAC3}$ in the AS-AACVeri.

At S1012, after receiving the AS-AACVeri, the AS-REQ executes the following operations (1) to (3).

In operation (1), the $Sig_{AS\_AAC3}$ is verified by using the public key of the AS-AAC. If the verification is failed, the AS-AACVeri is discarded.

In operation (2), the legality of the $Cert_{REQ}$ in the AS-AACVeri is verified to obtain the $Res_{REQ}$, and the $Pub_{REQ}$ is generated according to the information including the $Cert_{REQ}$ and the $Res_{REQ}$.

In operation (3), the first digital signature $Sig_{AS\_REQ1}$ and the fourth digital signature $Sig_{AS\_REQ4}$ are calculated.

At S1013, the AS-REQ sends a second authentication response message AS-REQVeri to the AS-AAC.

The AS-REQVeri includes the $ID_{REQ}$, the $Nonce_{REQ}$, the $Pub_{AAC}$ $Nonce_{AACPub}$, the $Sig_{AS\_REQ1}$, the $ID_{AAC}$ $Nonce_{AACID}$, the $Nonce_{AAC}$, the $Pub_{REQ}$, and the $Sig_{AS\_REQ4}$. The $ID_{REQ}$, the $Nonce_{REQ}$, the $Pub_{AAC}$ $Nonce_{AACPub}$, the $ID_{AAC}$ $Nonce_{AACID}$, and the $Nonce_{AAC}$ are respectively identical to corresponding fields in the AS-AACVeri. The to-be-signed data of the $Sig_{AS\_REQ1}$ includes the $ID_{REQ}$, the $Nonce_{REQ}$, and the $Pub_{AACPub}$. The to-be-signed data of the $Sig_{AS\_REQ4}$ includes $ID_{AAC}Nonce_{AACID}$, the $Nonce_{AAC}$, and the $Pub_{REQ}$.

At S1014, after receiving the AS-REQVeri, the AS-AAC executes the following operations (1) to (2).

In operation (1), the $Sig_{AS\_REQ4}$ is verified by using the public key of the AS-REQ. The AS-REQVeri is discarded in response to the verification being failed.

In operation (2), the second digital signature $Sig_{AS\_AAC2}$ is calculated.

At S1015, the AS-AAC sends a first authentication response message ASVeri to the AAC.

The ASVeri includes the $ID_{REQ}$, the $Nonce_{REQ}$, the $Pub_{AAC}$ $Nonce_{AACPub}$, the $Sig_{AS\_REQ1}$, the $ID_{AAC}$ $Nonce_{AACID}$, the $Nonce_{AAC}$, the $Pub_{REQ}$, and the $Sig_{AS\_AAC2}$. The $ID_{REQ}$, the $Nonce_{REQ}$, the $Pub_{AAC}Nonce_{ACCPub}$, the $Sig_{AS\_REQ1}$, the $ID_{AAC}Nonce_{AACID}$, the $Nonce_{AAC}$, and the $Pub_{REQ}$ are respectively identical to corresponding fields in the AS-REQVeri. The to-be-signed data of the $Sig_{AS\_AAC2}$ includes the $ID_{AAC}$ $Nonce_{AACID}$, the $Nonce_{AAC}$, and the $Pub_{REQ}$.

At S1016, after receiving the ASVeri, the AAC executes the following operations (1) to (8).

In operation (1), an XOR is performed on the $Nonce_{AACID}$ and the $ID_{AAC}Nonce_{AACID}$, to recover the $ID_{AAC}$, and whether the $ID_{AAC}$ is the same as the own identity identifier $ID_{AAC}$ of the AAC is checked.

In operation (2), whether the $Nonce_{AAC}$ is the same as the $Nonce_{AAC}$ generated by the AAC is checked.

In operation (3), the $Sig_{AS\_AAC2}$ is verified by using the public key of the AS-AAC.

In operation (4), whether the $Cert_{REQ}$ in the $Pub_{REQ}$ is the same as the $Cert_{REQ}$ obtained by decrypting the $EncData_{REQ}$.

In operation (5), the $Sig_{REQ}$ in the REQInit is verified by using the $Cert_{REQ}$.

In operation (6), if any one of the above checking and verification is failed, the ASVeri is discarded. If the checking and verification are all successful, an identity authentication result for the REQ is determined according to the $Res_{REQ}$ in the $Pub_{REQ}$. If the identity authentication result indicates that the REQ is illegal, the authentication process is ended.

In operation (7), the $EncData_{AAC}$ is calculated using the message encryption key with the symmetric encryption algorithm.

In operation (8), the $MacTag_{AAC}$ is calculated according to requirements.

At S1017, the AAC sends a third authentication response message AACAuth to the REQ.

The AACAuth includes the $Nonce_{REQ}$, the $Nonce_{AAC}$, the $EncData_{AAC}$ and the $MacTag_{AAC}$. The $Nonce_{REQ}$ and the $Nonce_{AAC}$ are optional fields, and are respectively identical to the $Nonce_{REQ}$ in the REQInit and the $Nonce_{AAC}$ generated by the AAC. The $MacTag_{AAC}$ is an optional field, and is calculated in a process as described in the embodiment of FIG. 7. The to-be-encrypted data of the $EncData_{AAC}$ includes the $ID_{REQ}$, the $Nonce_{REQ}$, the $Pub_{AAC}$ $Nonce_{AACPub}$, the $Sig_{AS\_REQ1}$, and the $Nonce_{ACCPub}$. The $ID_{REQ}$, the $Nonce_{REQ}$, the $Pub_{AAC}Nonce_{AACPub}$, and the $Sig_{AS\_REQ1}$ are respectively identical to corresponding fields in the ASVeri.

At S1018, after receiving the AACAuth, the REQ executes the following operations (1) to (7).

In operation (1), if there is the $Nonce_{REQ}$ in the AACAuth, whether the $Nonce_{REQ}$ is the same as the $Nonce_{REQ}$ generated by the REQ is checked. If there is the $Nonce_{AAC}$ in the AACAuth, whether the $Nonce_{AAC}$ is the same as the $Nonce_{AAC}$ in the received AACInit is checked.

In operation (2), if there is the $MacTag_{AAC}$ in the AACAuth, the $MacTag_{AAC}$ is verified by a process as described in the embodiment of FIG. 7.

In operation (3), the $EncData_{AAC}$ is decrypted using the message encryption key with the symmetric encryption algorithm, to obtain the $ID_{REQ}$, the $Nonce_{REQ}$, the $Pub_{AAC}Nonce_{AACPub}$, the $Sig_{AS\_AAC1}$, and the $Nonce_{AACPub}$.

In operation (4), whether the $ID_{REQ}$ and the $Nonce_{REQ}$ obtained by the decryption are respectively identical with the own $ID_{REQ}$ of the REQ and the $Nonce_{REQ}$ generated by the REQ.

In operation (5), the $Sig_{AS\_REQ1}$ is verified by using the public key of the AS-REQ.

In operation (6), an XOR is performed on the $Nonce_{AACPub}$ and the $Pub_{AAC}$ $Nonce_{AACPub}$ obtained by the decryption, to recover the $Pub_{AAC}$.

In operation (7), if the above checking and the verification are all successful, the identity authentication result of the AAC is determined according to the $Res_{AAC}$ in the $Pub_{AAC}$. If any one of the above checking and verification is failed, the AACAuth is discarded.

It is to be noted that, the verification for the $Sig_{REQ}$ in S1016 may be changed to be executed in S1005. That is, after acquiring the REQInit, the AAC verifies the $Sig_{REQ}$ by using the $Cert_{REQ}$ obtained by decrypting the $EncData_{REQ}$ in the REQInit. After the verification is successful. S1006 is then executed. In this case, the $Pub_{REQ}$ in the embodiment of FIG. 10 may be replaced with the $Res_{REQ}$. Alternatively, the verification for the $Sig_{REQ}$ in S1016 may be changed to be executed in S1012. In this case, the $Sig_{REQ}$ may be sent to the AS-REQ by the AACVeri of S1006 or the AS-AACVeri of S1011. The AS-REQ verifies the $Sig_{REQ}$ by using the $Cert_{REQ}$. The subsequent operations are then executed after the verification is successful.

In the above embodiments, each message may further carry a hash value $HASH_{X\_Y}$. The hash value $HASH_{X\_Y}$ is obtained by calculating the received latest preceding message sent by an opposite-end entity Y by a sender entity X of the message using a hash algorithm, and is used by the opposite-end entity Y to verify whether the whole latest preceding message is received by the entity X. The $HASH_{REQ\_AAC}$ represents a hash value that is calculated by the REQ for the received latest preceding message sent by the AAC. The $HASH_{AAC\_REQ}$ represents a hash value that is calculated by the AAC for the received latest preceding message sent by the REQ. The $HASH_{AAC\_AS-AAC}$ represents a hash value that is calculated by the AAC for the received latest preceding message sent by the AS-AAC, and the $HASH_{AS\text{-}AAC\_AAC}$ represents a hash value that is calculated by the AS-AAC for the received latest preceding message sent by the AAC. The $HASH_{AS\text{-}AAC\_AS\text{-}REQ}$ represents a hash value that is calculated by the AS-AAC for the received latest preceding message sent by the AS-REQ, and the $HASH_{AS\text{-}REQ\_AS\text{-}AAC}$ represents a hash value that is calculated by the AS-REQ for the received latest preceding message sent by the AS-AAC. If the message currently sent by the sender entity X is the first message during the interaction between the entity X and the entity Y, which means that the entity X has not received the preceding message sent by the opposite-end entity Y, and the $HASH_{X\_Y}$ in the message may be non-existent or meaningless.

Correspondingly, after the message sent by the entity X is received by the opposite-end entity Y, the entity Y ignores the $HASH_{X\_Y}$ when the entity Y has not sent a preceding message to the entity X if the message includes the $HASH_{X\_Y}$. When the entity Y has sent a preceding message to the entity X, the entity Y calculates, using the hash algorithm a hash value for the latest preceding message which is sent to the entity X previously, and compares the hash value with the hash value $HASH_{X\_Y}$ carried in the received message. The subsequent steps are executed if the hash value is consistent with the $HASH_{X\_Y}$, and the message is discarded or the authentication process is ended if the hash value is inconsistent with the $HASH_{X\_Y}$.

In the present disclosure, the preceding message for the entity X which is sent to the entity X by the opposite-end entity Y is a message, which is sent to the entity X by the opposite-end entity Y before the entity X sends the message M to the opposite-end entity Y. The latest preceding message sent to the entity X by the opposite-end entity Y is a latest message, which is sent to the entity X by the opposite-end entity Y before the entity X sends the message M to the opposite-end entity Y. If the message M sent by the entity X to the opposite-end entity Y is the first message during the interaction between the entity X and the entity Y, there is no preceding message sent by the opposite-end entity Y to the entity X before the entity X sends the message M to the opposite-end entity Y.

It is to be noted that, the optional fields and the optional operations in the corresponding embodiments in FIG. 7, FIG. 8, FIG. 9 and FIG. 10 are represented as "*" in FIG. 7, FIG. 8, FIG. 9 and FIG. 10 of the drawings of the specification. A sequence of the contents included in the messages involved in all of the above embodiments is not limited. In addition, a sequence of processing the messages after a message receiver receives the message and a sequence of processing the contents included in the messages are not limited unless otherwise specified.

Figure 11:
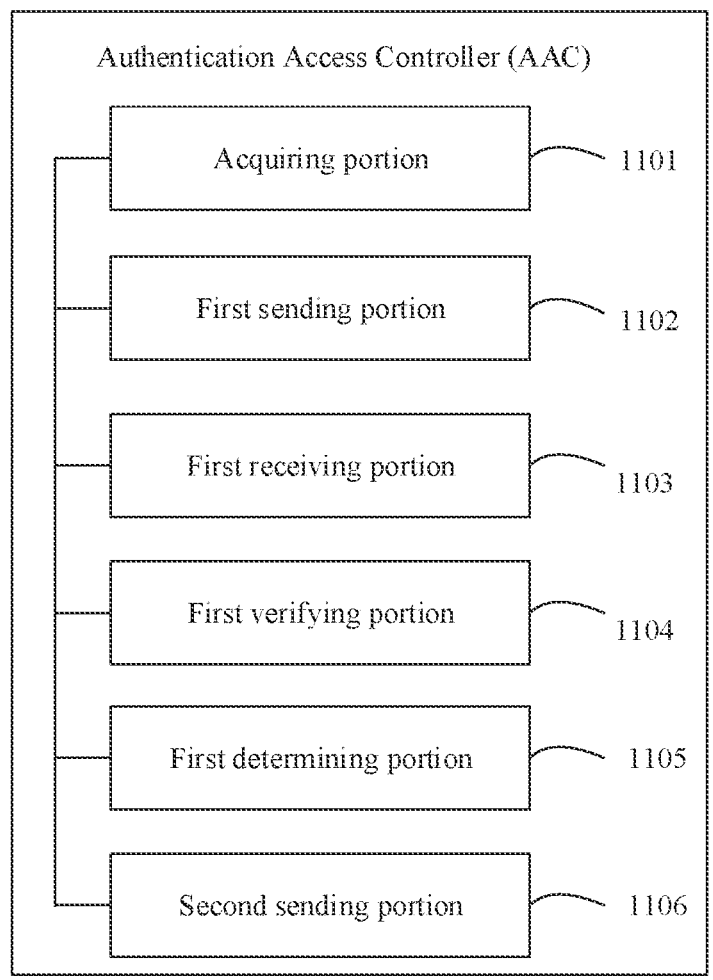
FIG. 11 is a structural block diagram of an AAC according to an embodiment of the present disclosure.

On the basis of the embodiments corresponding to FIG. 1 to FIG. 10, referring to FIG. 11, an embodiment of the present disclosure provides an authentication access controller AAC. The AAC includes an acquiring portion 1101, a first sending portion 1102, a first receiving portion 1103, a first verifying portion 1104, a first determining portion 1105, and a second sending portion 1106.

The acquiring portion 1101 is configured to acquire an identity ciphertext message sent by a requester REQ. The identity ciphertext message includes identity information ciphertext of the REQ. The identity information ciphertext of the REQ is obtained by encrypting to-be-encrypted data including a digital certificate of the REQ using a message encryption key.

The first sending portion 1102 is configured to send a first authentication request message to a first authentication server (AS) which is trusted by the AAC. The first authentication request message includes the identity information ciphertext of the AAC and the digital certificate of the REQ. The identity information ciphertext of the AAC is obtained by encrypting to-be-encrypted data including a digital certificate of the AAC using a public key of an encryption certificate, and the digital certificate of the REQ is obtained by decrypting the identity information ciphertext of the REQ by the AAC using the message encryption key.

The first receiving portion 1103 is configured to receive a first authentication response message sent by the first AS. The first authentication response message includes first authentication result information ciphertext, a first digital signature, second authentication result information and a second digital signature. The first authentication result information ciphertext is obtained by encrypting information including first authentication result information. The first authentication result information includes a first verification result for the digital certificate of the AAC. The first digital signature is a digital signature which is generated by calculating, by a second AS trusted by the REQ, to-be-signed data including the first authentication result information ciphertext. The second authentication result information includes a second verification result for the digital certificate of the REQ, and the second digital signature is a digital signature which is generated by calculating, by the first AS, to-be-signed data including the second authentication result information The first verifying portion 1104 is configured to verify the second digital signature by using a public key of the first AS, In response to the verification being successful, the first determining portion 1105 determines an identity authentication result for the REQ according to the second verification result in the second authentication result information. When the first determining portion 1105 determines the identity authentication result for the REQ indicates that the REQ is legal, the second sending portion 1106 sends a third authentication response message to the REQ.

Alternatively, the first verifying portion 1104 is configured to verify the second digital signature by using the public key of the first AS. In response to the verification being successful, the second sending portion 1106 sends the third authentication response message to the REQ, and the first determining portion 1105 determines the identity authentication result for the REQ according to the second verification result in the second authentication result information.

Alternatively, the first verifying portion 1104 is configured to verify the second digital signature by using the public key of the first AS. In response to the verification being successful, the first determining portion 1105 determines the identity authentication result for the REQ according to the second verification result in the second authentication result information, and the second sending portion 1106 sends the third authentication response message to the REQ.

The third authentication response message includes authentication result information ciphertext. The authentication result information ciphertext is generated by encrypting to-be-encrypted data including the first authentication result information ciphertext and the first digital signature using the message encryption key.

In some embodiments, the AAC further includes a third sending portion and a calculating portion.

The third sending portion is configured to send a key request message to the REQ.

The key request message includes a key exchange parameter of the AAC, and the identity ciphertext message acquired by the acquiring portion 1101 further includes a key exchange parameter of the REQ.

The calculating portion is configured to perform key exchange calculation according to a temporary private key corresponding to the key exchange parameter of the AAC and a temporary public key included by the key exchange parameter of the REQ, to generate the first key, and calculate the message encryption key according to information including the first key using the key derivation algorithm.

In some embodiments, the key request message sent by the third sending portion further includes a first nonce generated by the AAC. The identity ciphertext message acquired by the acquiring portion 1101 further includes a second nonce generated by the REQ.

The calculating portion is further configured to calculate the message encryption key according to the information including the first key, the first nonce and the second nonce.

In some embodiments, the identity ciphertext message acquired by the acquiring portion 1101 further includes the first nonce. The AAC further includes a second verifying portion.

The second verifying portion is configured to verify whether the first nonce in the identity ciphertext message is consistent with the first nonce generated by the AAC.

In some embodiments, the key request message sent by the third sending portion further includes security capability parameter information supported by the AAC; The identity ciphertext message acquired by the acquiring portion 1101 further includes a specific security policy, and the specific security policy is determined by the REQ according to the security capability parameter information supported by the AAC.

In some embodiments, the key request message sent by the third sending portion further includes the identity identifier of at least one AS trusted by the AAC. The identity ciphertext message acquired by the acquiring portion 1101 further includes the identity identifier of at least one AS trusted by the REQ.

The AAC further includes a second determining portion.

The second determining portion is configured to determine a first authentication server according to the identity identifier of at least one AS trusted by the REQ in the identity ciphertext message and the identity identifier of at least one AS trusted by the AAC in the key request message.

In some embodiments, the identity ciphertext message acquired by the acquiring portion 1101 further includes the identity identifier of at least one AS trusted by the REQ. The AAC further includes a third determining portion.

The third determining portion is configured to determine the first authentication server according to the identity identifier of at least one AS trusted by the REQ and the identity identifier of at least one AS trusted by the AAC.

In some embodiments, the to-be-encrypted data of the identity information ciphertext of the AAC further includes the identity identifier of the AAC and a first protection nonce.

Correspondingly, the first authentication response message further includes identity identifier ciphertext of the AAC, and the identity identifier ciphertext of the AAC is generated by encrypting information including the identity identifier of the AAC using the first protection nonce.

The AAC further includes a third verifying portion.

Third verifying portion is configured to verify the identity identifier ciphertext of the AAC according to the own identity identifier of the AAC and the first protection nonce.

In some embodiments, the to-be-encrypted data of the identity information ciphertext of the AAC further includes a second protection nonce. Correspondingly, the first authentication result information ciphertext is obtained by encrypting the information including the first authentication result information using the second protection nonce.

The to-be-encrypted data of the authentication result information ciphertext in the third authentication response message sent by the second sending portion 1106 further includes the second protection nonce.

In some embodiments, the identity ciphertext message acquired by the acquiring portion 1101 further includes a digital signature of the REQ. The first determining portion 1105 is further configured to determine whether the verification for the digital signature of the REQ is successful, and in response to the verification for the digital signature of the REQ is successful, determine an identity authentication result of the REQ according to the second verification result.

In some implementations, the first determining portion 1105 is further configured to perform the following operations.

The digital signature of the REQ is verified by using the digital certificate of the REQ that is obtained by decrypting the identity information ciphertext of the REQ, and whether the verification for the digital signature of the REQ is successful is determined according to a verification result.

Alternatively, when a second authentications server verifies the digital signature of the REQ by using the digital certificate of the REQ, and when the first authentication response message is received by the first receiving portion 1103, the first determining portion 1105 determines that the verification for the digital signature of the REQ is successful.

Alternatively, when the second authentication result information further includes the digital certificate of the REQ, after the first receiving portion 1103 receives the first authentication response message, the first determining portion 1105 verifies the digital signature of the REQ by using the digital certificate of the REQ in the second authentication result information, and determine, according to a verification result, whether the verification of the digital signature of the REQ is successful.

Alternatively, if the second authentication result information further includes the digital certificate of the REQ, the first determining portion 1105 first verifies whether the digital certificate of the REQ in the second authentication result information is consistent with the digital certificate of the REQ obtained by decrypting the identity information ciphertext of the REQ. In response to that the digital certificate of the REQ in the second authentication result information is consistent with the digital certificate of the REQ, the first determining portion 1105 then verifies the digital signature of the REQ by using the digital certificate of the REQ, and determine, according to a verification result, whether the verification for the digital signature of the REQ is successful.

In some implementations, the third authentication response message sent by the second sending portion 1106 further includes a message integrity check code. The message integrity check code is generated by calculating fields in the third authentication response message other than the message integrity check code through the calculating portion using a message integrity check key. A manner of generating the message integrity check key is the same as that of generating the message encryption key.

In some implementations, the message sent to the REQ by the AAC further includes a hash value, which is calculated by the AAC for the received latest preceding message sent by the REQ. The message sent to the first authentication server by the AAC further includes a hash value which is calculated by the AAC for the received latest preceding message sent by the first authentication server.

Figure 12:
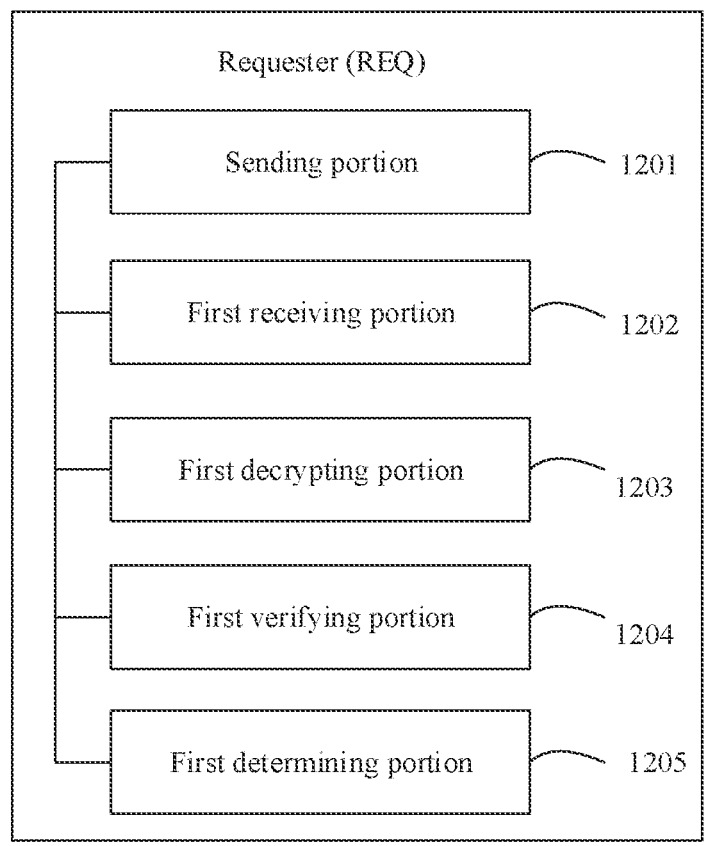
FIG. 12 is a structural block diagram of an REQ according to an embodiment of the present disclosure.

On the basis of the embodiments corresponding to FIG. 1 to FIG. 10, referring to FIG. 12, an embodiment of the present disclosure provides an REQ. The REQ includes a sending portion 1201, a first receiving portion 1202, a first decrypting portion 1203, a first verifying portion 1204, and a first determining portion 1205.

The sending portion 1201 is configured to send an identity ciphertext message to an authentication access controller AAC. The identity ciphertext message includes identity information ciphertext of the REQ. The identity information ciphertext of the REQ is obtained by encrypting to-be-encrypted data including a digital certificate of the REQ using a message encryption key.

The first receiving portion 1202 is configured to receive a third authentication response message sent by the AAC. The third authentication response message includes authentication result information ciphertext, and the authentication result information ciphertext is generated by encrypting to-be-encrypted data including first authentication result information ciphertext and a first digital signature using the message encryption key. The first authentication result information ciphertext is obtained by encrypting information including first authentication result information. The first authentication result information includes a first verification result for a digital certificate of the AAC.

The first decrypting portion 1203 is configured to decrypt the authentication result information ciphertext using the message encryption key, to obtain the first authentication result information ciphertext and the first digital signature.

The first verifying portion 1204 is configured to verify the first digital signature by using a public key of a second authentication server.

The first determining portion 1205 is configured to, when the verification for the first digital signature is successful, determine an identity authentication result for the AAC according to the first verification result in the first authentication result information that is obtained by decrypting the first authentication result information ciphertext.

In some embodiments, the REQ further includes a second receiving portion and a calculating portion.

The second receiving portion is configured to receive a key request message sent by the AAC. The key request message includes a key exchange parameter of the AAC.

The calculating portion is configured to perform key exchange calculation according to a temporary private key corresponding to a key exchange parameter of the REQ and a temporary public key included in the key exchange parameter of the AAC, to generate a first key, and calculate the message encryption key using a key derivation algorithm according to information including the first key.

The identity ciphertext message sent by the sending portion 1201 further includes a key exchange parameter of the REQ.

In some embodiments, the key request message received by the second receiving portion further includes a first nonce generated by the AAC.

The calculating portion is further configured to calculate the message encryption key according to information including the first key, the first nonce and a second nonce generated by the REQ.

Correspondingly, the identity ciphertext message sent by the sending portion 1201 further includes the second nonce.

Correspondingly, the identity ciphertext message sent by the sending portion 1201 further includes the first nonce.

In some embodiments, the key request message received by the second receiving portion further includes security capability parameter information supported by the AAC. The REQ further includes a second determining portion.

The second determining portion is configured to determine, according to the security capability parameter information supported by the AAC, a specific security policy used by the REQ. The identity ciphertext message sent by the sending portion 1201 further includes the specific security policy used by the REQ.

In some embodiments, the key request message received by the second receiving portion further includes the identity identifier of at least one AS trusted by the AAC. The REQ further includes a third determining portion.

The third determining portion is configured to determine, according to the identity identifier of at least one AS trusted by the AAC, the identity identifier of at least one AS trusted by the REQ.

The identity ciphertext message sent by the sending portion 1201 further includes the identity identifier of at least one AS trusted by the REQ.

In some embodiments, the identity ciphertext message sent by the sending portion 1201 further includes the identity identifier of at least one AS trusted by the REQ.

In some embodiments, the to-be-encrypted data of the identity information ciphertext of the REQ sent by the sending portion 1201 further includes the identity identifier of the REQ.

Correspondingly, the to-be-encrypted data of the authentication result information ciphertext in the third authentication response message received by the first receiving portion 1202 further includes the identity identifier of the REQ. The REQ further includes a second verifying portion.

The second verifying portion is configured to verify whether the identity identifier of the REQ that is obtained by decrypting the authentication result information ciphertext is consistent with the own identity identifier of the REQ.

In some embodiments, the to-be-encrypted data of the authentication result information ciphertext in the third authentication response message received by the first receiving portion 1202 further includes the second protection nonce.

The first decrypting portion 1203 decrypts the authentication result information ciphertext using the message encryption key to obtain the second protection nonce, and decrypts the first authentication result information ciphertext using the second protection nonce to obtain the first authentication result information.

In some embodiments, before determining the identity authentication result for the AAC, the first determining portion 1205 is further configured to determine whether the verification for the digital signature of the AAC is successful, and determine the identity authentication result for the AAC according to the first verification result in response to it is determined that the verification for the digital signature of the AAC is successful.

In some implementations, the first determining portion 1205 is further configured to perform the following operations.

When the first authentication request message sent, by the AAC, to a first authentication server trusted by the AAC includes the digital signature of the AAC, the first authentication server verifies the digital signature of the AAC by using the digital certificate of the AAC that is obtained by decrypting the identity information ciphertext of the AAC.

In response to that the first receiving portion 1202 receives the third authentication response message, the first determining portion 1205 determines that the verification for the digital signature of the AAC is successful.

Alternatively, when the third authentication response message further includes the digital signature of the AAC, the first authentication result information obtained by decrypting the first authentication result information ciphertext further correspondingly includes the digital certificate of the AAC, the first determining portion 1205 verifies the digital signature of the AAC by using the digital certificate of the AAC, and determines, according to a verification result, whether the verification for the digital signature of the AAC is successful.

In some implementations, the third authentication response message received by the first receiving portion 1202 further includes a message integrity check code. The REQ further includes a third verifying portion.

The third verifying portion is configured to verify the message integrity check code by using a message integrity check key. A manner of generating the message integrity check key is the same as that of generating the message encryption key.

In some implementations, the message sent to the AAC by the REQ further includes a hash value, which is calculated by the REQ for the received latest preceding message sent by the AAC.

Figure 13:
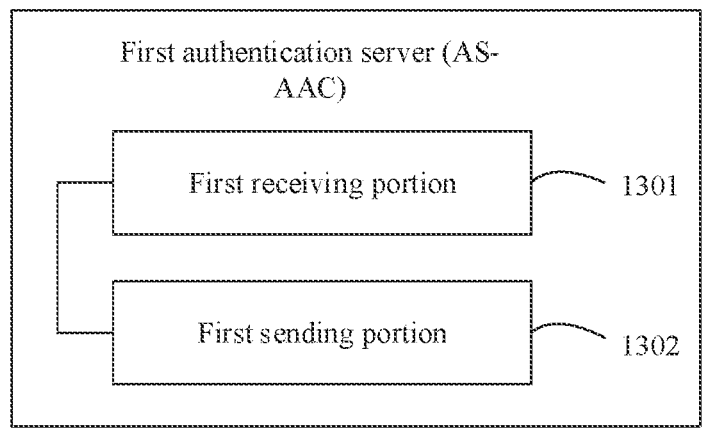
FIG. 13 is a structural block diagram of a first AS (AS-AAC) according to an embodiment of the present disclosure.

On the basis of the embodiments corresponding to FIG. 1 to FIG. 10, referring to FIG. 13, an embodiment of the present disclosure provides a first authentication server AS-AAC. The AS-AAC is an AS trusted by the AAC, and includes a first receiving portion 1301 and a first sending portion 1302.

The first receiving portion 1301 is configured to receive a first authentication request message sent by the AAC. The first authentication request message includes identity information ciphertext of the AAC and a digital certificate of an REQ. The identity information ciphertext of the AAC is generated by encrypting to-be-encrypted data including a digital certificate of the AAC using a public key of an encryption certificate.

The first sending portion 1302 is configured to send a first authentication response message to the AAC. The first authentication response message includes first authentication result information ciphertext, a first digital signature, second authentication result information and a second digital signature. The first authentication result information ciphertext is obtained by encrypting information including first authentication result information. The first authentication result information includes a first verification result for the digital certificate of the AAC. The first digital signature is a digital signature which is generated by calculating, by a second authentication server trusted by the REQ, to-be-signed data including the first authentication result information ciphertext. The second authentication result information includes a second verification result for the digital certificate of the REQ, and the second digital signature is a digital signature which is generated by calculating, by the first authentication server, to-be-signed data including the second authentication result information.

In some implementations, if the first authentication request message received by the first receiving portion 1301 further includes a digital signature of the AAC. The first authentication server further includes a first verifying portion.

The first verifying portion is configured to verify the digital signature of the AAC by using the digital certificate of the AAC that is obtained by decrypting the identity information ciphertext of the AAC.

In some implementations, the first authentication server trusted by the AAC and the second authentication server trusted by the REQ are the same authentication server. The first authentication server further includes a first decrypting portion, a second verifying portion, and a first generating portion.

The first decrypting portion is configured to decrypt the identity information ciphertext of the AAC by using a private key corresponding to the encryption certificate, to obtain the digital certificate of the AAC.

The second verifying portion is configured to perform legality verification on the digital certificate of the AAC obtained by decryption, to obtain the first verification result, and perform legality verification on the digital certificate of the REQ, to obtain the second verification result.

The first generating portion is configured to generate the first authentication result information according to information including the first verification result, generate first authentication result information ciphertext, generate second authentication result information according to information including the second verification result, calculate the to-be-signed data including the first authentication result information ciphertext to generate the first digital signature, calculate the to-be-signed data including the second authentication result information to generate the second digital signature, and generate the first authentication response message according to information including the first authentication result information ciphertext, the first digital signature, the second authentication result information and the second digital signature.

In some implementations, the first authentication server trusted by the AAC and the second authentication server trusted by the REQ are different ASs. The first authentication server further includes a third verifying portion, a second generating portion, a second sending portion, a second receiving portion, a fourth verifying portion, and a third generating portion.

The third verifying portion is configured to decrypt the identity information ciphertext of the AAC by using the private key corresponding to the encryption certificate, to obtain the digital certificate of the AAC, and perform legality verification on the digital certificate of the AAC, to obtain the first verification result.

The second generating portion is configured to generate the first authentication result information according to the information including the first verification result, and then generate the first authentication result information ciphertext.

The second sending portion is configured to send a second authentication request message to the second authentication server. The second authentication request message includes the first authentication result information ciphertext, the digital certificate of the REQ, and a third digital signature of the first authentication server. The third digital signature is a digital signature, which is generated by calculating, by the first authentication server, to-be-signed data including the first authentication result information ciphertext and the digital certificate of the REQ.

The second receiving portion is configured to receive a second authentication response message sent by the second authentication server. The second authentication response message includes the first authentication result information ciphertext, the first digital signature, the second authentication result information and a fourth digital signature. The first digital signature is a digital signature which is generated by calculating, by the second authentication server, to-be-signed data including the first authentication result information ciphertext, and the fourth digital signature is a digital signature which is generated by calculating, by the second authentication server, the to-be-signed data including the second authentication result information.

The fourth verifying portion is configured to verify the fourth digital signature by using a public key of the second authentication server.

The third generating portion is configured to, when the verification for the fourth digital signature is successful, generate the second digital signature by calculating the to-be-signed data including the second authentication result information, and generate the first authentication response message according to information including the first authentication result information ciphertext, the first digital signature, the second authentication result information and the second digital signature.

In some implementations, the message sent to the AAC by the first authentication server further includes a hash value, which is calculated by the first authentication server for the received latest preceding message sent by the AAC. The message sent to the second authentication server by the first authentication server further includes a hash value, which is calculated by the first authentication server for the received latest preceding message sent by the second authentication server.

Figure 14:
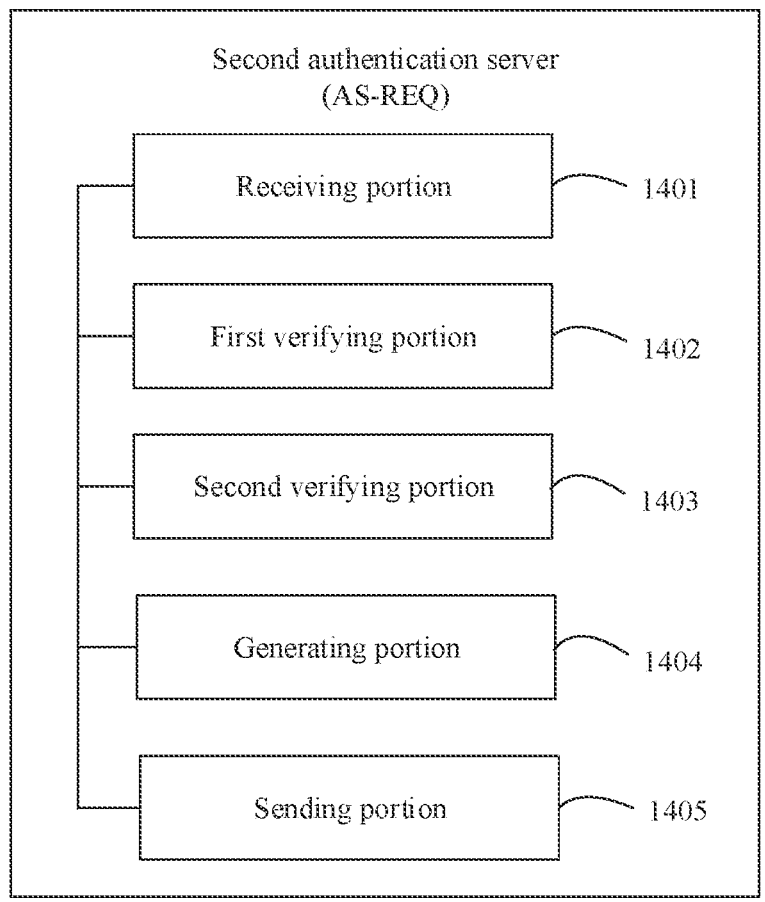
FIG. 14 is a structural block diagram of a second AS (AS-REQ) according to an embodiment of the present disclosure.

On the basis of the embodiments corresponding to FIG. 1 to FIG. 10, referring to FIG. 14, an embodiment of the present disclosure provides a second authentication server. The second authentication server is a authentication server AS trusted by an REQ. If a first authentication server trusted by an AAC and the second authentication server trusted by the REQ are different ASs, the second authentication server includes a receiving portion 1401, a first verifying portion 1402, a second verifying portion 1403, a generating portion 1404, and a sending portion 1405.

The receiving portion 1401 is configured to receive a second authentication request message sent by the first authentication server. The second authentication request message includes first authentication result information ciphertext, a digital certificate of the REQ, and a third digital signature of the first authentication server. The third digital signature is a digital signature which is generated by calculating, by the first authentication server, to-be-signed data including the first authentication result information ciphertext and the digital certificate of the REQ.

The first verifying portion 1402 is configured to verify the third digital signature.

The second verifying portion 1403 is configured to, when the verification for the third digital signature is successful, perform legality verification on the digital certificate of the REQ, to obtain a second verification result.

The generating portion 1404 is configured to generate second authentication result information according to information including the second verification result.

The sending portion 1405 is configured to send a second authentication response message to the first authentication server. The second authentication response message includes the first authentication result information ciphertext, a first digital signature, the second authentication result information and a fourth digital signature. The first digital signature is a digital signature which is generated by calculating, by the second authentication server, to-be-signed data including the first authentication result information ciphertext. The fourth digital signature is a digital signature which is generated by calculating, by the second authentication server, to-be-signed data including the second authentication result information.

In some implementations, the message sent to the first authentication server by the second authentication server further includes a hash value which is calculated by the second authentication server for the received latest preceding message sent by the first authentication server.

Figure 15:
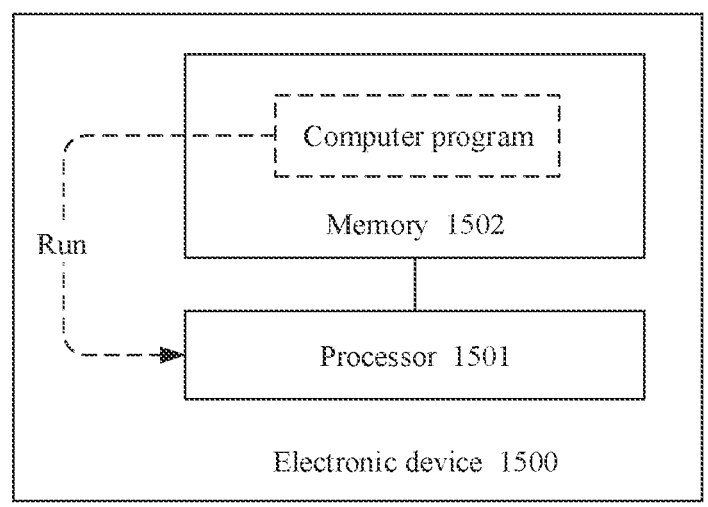
FIG. 15 is a schematic structural diagram of an electronic device according to an embodiment of the present disclosure.

FIG. 15 is a schematic structural diagram of an electronic device according to an embodiment of the present disclosure. As shown in FIG. 15, the electronic device 1500 may be an authentication access controller (AAC), a requester (REQ), a first authentication server (AS-AAC), or a second authentication server (AS-REQ). The electronic device 1500 includes a processor 1501 and a memory 1502. The memory 1502 is configured to store a computer program. The processor 1501 is configured to call and run the computer program stored in the memory 1502, to execute steps in any one of the above embodiments executed by the AAC, the REQ, the AS-AAC or the AS-REQ. The processor 1501 and the memory 1502 of the electronic device 1500 may respectively be the processor 1501 and the memory 1502 of the AAC, the REQ, the AS-AAC or the AS-REQ.

In combination with FIG. 15, the AAC, the REQ, the AS-AAC or the AS-REQ is respectively exemplarily described below.

An embodiment of the present disclosure further provides an authentication access controller (AAC). The AAC includes a processor and a memory. The memory is configured to store a computer program, and the processor is configured to call and run the computer program stored in the memory, to execute operations, which are executed by the AAC in any one of the above embodiments.

It should be understood that, the AAC may implement corresponding flows implemented by the AAC in each method of the embodiments of the present disclosure. For simplicity, elaborations are omitted herein.

An embodiment of the present disclosure further provides a requester (REQ). The REQ includes a processor and a memory. The memory is configured to store a computer program, and the processor is configured to call and run the computer program stored in the memory, to execute operations which are executed by the REQ in any one of the above embodiments.

It should be understood that, the REQ may implement corresponding flows implemented by the REQ in each method of the embodiments of the present disclosure. For simplicity, elaborations are omitted herein.

An embodiment of the present disclosure further provides a first authentication server (AS-AAC). The AS-AAC is an authentication server (AS) trusted by the AAC, and includes a processor and a memory. The memory is configured to store a computer program; and the processor is configured to call and run the computer program stored in the memory, to execute operations which are executed by the AS-AAC in any one of the above embodiments.

It should be understood that, the first authentication server may implement corresponding flows implemented by the AS-AAC in each method of the embodiments of the present disclosure. For simplicity, elaborations are omitted herein.

An embodiment of the present disclosure further provides a second authentication server (AS-REQ). The AS-REQ is an authentication server (AS) trusted by the REQ. If the first authentication server trusted by the AAC and the second authentication server trusted by the REQ are two different, the second authentication server includes a processor and a memory. The memory is configured to store a computer program; and the processor is configured to call and run the computer program stored in the memory, to execute steps, which are executed by the AS-REQ in any one of the above embodiments.

It should be understood that, the second authentication server may implement corresponding flows implemented by the AS-REQ in each method of the embodiments of the present application. For simplicity, elaborations are omitted herein.

It is to be noted that, the processors in the AAC, the REQ, the AS-AAC, or the AS-REQ in the embodiments of the present disclosure may further execute the method in other embodiments, for example, other methods in the above method embodiments, and the embodiments of the present disclosure are not limited thereto.

Figure 16:
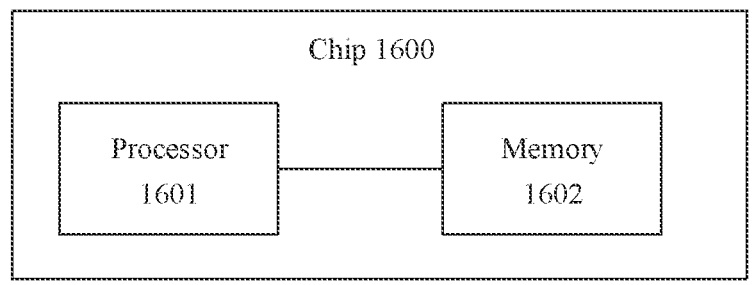
FIG. 16 is a schematic structural diagram of a chip according to an embodiment of the present disclosure.

FIG. 16 is a schematic structural diagram of a chip according to an embodiment of the present disclosure. As shown in FIG. 16, the chip 1600 includes a processor 1601 and a memory 1602. The processor 1601 is configured to call and run a computer program from a memory 1602, to enable an authentication access controller (AAC) installed with the chip 1600 to execute operations which are executed by the AAC in any one of the above embodiments.

Alternatively, the processor 1601 is configured to call and run the computer program from the memory 1602, to enable a requester (REQ) installed with the chip 1600 to execute operations which are executed by the REQ in any one of the above embodiments.

Alternatively, the processor 1601 is configured to call and run the computer program from the memory 1602, to enable a first authentication server installed with the chip 1600 to execute operations which are executed by the first authentication server in any one of the above embodiments.

Alternatively, the processor 1601 is configured to call and run the computer program from the memory 1602, to enable a second authentication server installed with the chip 1600 to execute operations which are executed by the second authentication server in any one of the above embodiments.

The memory 1602 may be included in the chip 1600, or the memory 1602 may be provided outside the chip 1600.

An embodiment of the present disclosure further provides a computer storage medium. The computer storage medium is configured to store a computer program. The computer program enables an authentication access controller (AAC) to execute operations which are executed by the AAC in any one of the above embodiments.

Alternatively, the computer program enables a requester (REQ) to execute operations which are executed by the REQ in any one of the above embodiments.

Alternatively, the computer program enables a first authentication server to execute operations which are executed by the first authentication server in any one of the above embodiments.

Alternatively, the computer program enables a second authentication server to execute operations which are executed by the second authentication server in any one of the above embodiments.

An embodiment of the present disclosure further provides a computer program. The computer program enables an authentication access controller (AAC) to execute operations which are executed by the AAC in any one of the above embodiments.

Alternatively, the computer program enables a requester (REQ) to execute operations which are executed by the REQ in any one of the above embodiments.

Alternatively, the computer program enables a first authentication server to execute operations which are executed by the first authentication server in any one of the above embodiments.

Alternatively, the computer program enables a second authentication server to execute operations which are executed by the second authentication server in any one of the above embodiments.

Those of ordinary skill in the art should know that all or part of the steps of the method embodiment may be implemented by related hardware instructed by a program. The program may be stored in a computer storage medium, and the program is executed to execute the steps of the method embodiment. The computer storage medium may be at least one of a Read-Only Memory (ROM), a Random Access Memory (RAM) and various media that can store program codes, such as a magnetic disk, or an optical disk.

Each component, the chip or the processor in the embodiments of the present disclosure may be an integrated circuit chip and has a signal processing capacity. During implementation, each step of the method embodiments may be completed by an integrated logical circuit of hardware in the processor or an instruction in a software form. Each component, the chip or the processor may include the integration of any one or at least two of a general processor, an Application Specific Integrated Circuit (ASIC), a Digital Signal Processor (DSP), a Digital Signal Processing Device (DSPD), a Programmable Logic Device (PLD), a Field Programmable Gate Array (FPGA), a Central Processing Unit (CPU), a Graphics Processing Unit (GPU), a Neural-network Processing Unit (NPU), a controller, a microcontroller, a microprocessor, a programmable logic device, a discrete gate or transistor logic device, and a discrete hardware component.

It is to be noted that, the embodiments in this specification are described in a progressive manner, and reference may be made to each other for the same and similar parts among the various embodiments, and each embodiment focuses on the difference from other embodiments. In particular, since the device and system embodiments are consistent with and correspond to the method embodiments, the description is relatively simple, and for related parts, reference can be made to the partial descriptions of the method embodiments. The above described device and system embodiments are merely exemplary. The parts described as separate components may or may not be physically separated. The components displayed as parts may or may not be physical parts, that is, the components may be located in the same place, or may be distributed on the plurality of network parts. Part or all of the modules may be selected according to actual requirements to achieve the purposes of the solutions of this embodiment. It can be understood and implemented by those of ordinary skill in the art without creative labor.

The above is only the exemplary implementations of the present disclosure and not intended to limit the scope of protection of the present disclosure. Any variations or replacements apparent to those skilled in the art within the technical scope disclosed by the present disclosure shall fall within the scope of protection of the present disclosure. Therefore, the protection scope of the present disclosure shall be subject to the protection scope of the claims

INDUSTRIAL APPLICABILITY

The embodiments of the present disclosure provide an identity authentication method and apparatus, and a device, a chip, a storage medium and a program. Identify information of the REQ and the AAC is subject to confidential processing, to prevent the identify information of the REQ and the AAC from being exposed during a transmission process, thereby avoiding an attacker from obtaining private and sensitive information. Moreover, an authentication server is introduced, thereby achieving real-time mutual identity authentication between the REQ and the AAC while the confidentiality of entity identity related information is guaranteed. This can provides the foundation for communication only between a legal user and a legal network.

The invention claimed is:

1. An identity authentication method, comprising:
acquiring, by an authentication access controller (AAC), an identity ciphertext message sent by a requester (REQ), wherein the identity ciphertext message comprises identity information ciphertext of the REQ, and the identity information ciphertext of the REQ is obtained by encrypting to-be-encrypted data including a digital certificate of the REQ using a message encryption key;
sending, by the AAC, a first authentication request message to a first Authentication Server (AS) trusted by the AAC, wherein the first authentication request message comprises identity information ciphertext of the AAC and the digital certificate of the REQ, the identity information ciphertext of the AAC is obtained by encrypting to-be-encrypted data including a digital certificate of the AAC using a public key of an encryption certificate, and the digital certificate of the REQ is obtained by decrypting the identity information ciphertext of the REQ by the AAC using the message encryption key;
receiving, by the AAC, a first authentication response message sent by the first AS, wherein the first authentication response message comprises first authentication result information ciphertext, a first digital signature, second authentication result information and a second digital signature, the first authentication result information ciphertext is obtained by encrypting information comprising first authentication result information, the first authentication result information comprises a first verification result for the digital certificate of the AAC, the first digital signature is a digital signature generated by calculating to-be-signed data comprising the first authentication result information ciphertext by a second AS trusted by the REQ, the second authentication result information comprises a second verification result for the digital certificate of the REQ, and the second digital signature is a digital signature generated by calculating to-be-signed data comprising the second authentication result information by the first AS; and
performing one of following operations:
verifying, by the AAC, the second digital signature by using a public key of the first AS, determining, by the AAC, an identity authentication result of the REQ according to the second verification result in the second authentication result information in response to the verification being successful, sending, by the AAC, a third authentication response message to the REQ in response to the identity authentication result indicating that the REQ is legal; or
verifying, by the AAC, the second digital signature by using the public key of the first AS, sending, by the AAC, the third authentication response message to the REQ in response to the verification being successful, and determining, by the AAC, the identity authentication result of the REQ according to the second verification result in the second authentication result information; or
verifying, by the AAC, the second digital signature by using the public key of the first AS, determining, by the AAC, the identity authentication result of the REQ according to the second verification result in the second authentication result information in response to the verification for the second digital signature being successful, and sending, by the AAC, the third authentication response message to the REQ,
wherein the third authentication response message comprises authentication result information ciphertext, and the authentication result information ciphertext is generated by encrypting to-be-encrypted data comprising the first authentication result information ciphertext and the first digital signature using the message encryption key; and
upon receiving the third authentication response message, decrypting, by the REQ, the authentication result information ciphertext using the message encryption key, to obtain the first authentication result information ciphertext and the first digital signature, verifying, by the REQ, the first digital signature by using a public key of the second AS, and determining, by the REQ in response to the verification being successful, an identity authentication result of the AAC according to the first verification result in the first authentication result information obtained by decrypting the first authentication result information ciphertext.

2. The method of claim 1, further comprising: before the acquiring, by the AAC, the identity ciphertext message sent by the REQ,
sending, by the AAC, a key request message to the REQ, wherein the key request message comprises a key exchange parameter of the AAC;
performing, by the REQ, key exchange calculation according to a temporary private key corresponding to a key exchange parameter of the REQ and a temporary public key comprised in the key exchange parameter of the AAC, to generate a first key, and calculating, by the REQ, the message encryption key according to information comprising the first key by using a key derivation algorithm, wherein the identity ciphertext message further comprises the key exchange parameter of the REQ; and
performing, by the AAC, key exchange calculation according to the temporary private key corresponding to the key exchange parameter of the AAC and the temporary public key comprised in the key exchange parameter of the REQ, to generate the first key, and calculating, by the AAC, the message encryption key by using the key derivation algorithm according to information comprising the first key.

3. The method of claim 2, wherein the key request message further comprises a first nonce generated by the AAC, and
the calculating, by the REQ, the message encryption key comprises:
calculating, by the REQ, the message encryption key according to information comprising the first key, the first nonce and a second nonce generated by the REQ, and
wherein the identity ciphertext message further comprises the second nonce, and the calculating, by the AAC, the message encryption key further comprises:
 calculating, by the AAC, the message encryption key according to the information comprising the first key, the first nonce and the second nonce.

4. The method of claim 3, wherein the identity ciphertext message further comprises the first nonce; and
 the method further comprises: before the calculating, by the AAC, the message encryption key,
 verifying, by the AAC, whether the first nonce in the identity ciphertext message is consistent with the first nonce generated by the AAC; and
 calculating, by the AAC, the message encryption key in response to the verification being successful.

5. The method of claim 2, wherein the key request message further comprises security capability parameter information supported by the AAC; and the method further comprises:
 determining, by the REQ, a specific security policy used by the REQ according to the security capability parameter information, wherein the identity ciphertext message further comprises the specific security policy.

6. The method of claim 2, wherein the key request message further comprises an identity identifier of at least one AS trusted by the AAC, and the method further comprises:
 determining, by the REQ, an identity identifier of at least one AS trusted by the REQ according to the identity identifier of at least one AS trusted by the AAC, and wherein the identity ciphertext message further comprises an identity identifier of at least one AS trusted by the REQ, and the method further comprises:
 determining, by the AAC, the first AS according to the identity identifier of at least one AS trusted by the REQ in the identity ciphertext message and the identity identifier of at least one AS trusted by the AAC in the key request message.

7. The method of claim 1, wherein the identity ciphertext message further comprises an identity identifier of at least one AS trusted by the REQ, and the method further comprises:
 determining, by the AAC, the first AS according to the identity identifier of at least one AS trusted by the REQ and the identity identifier of at least one AS trusted by the AAC.

8. The method of claim 1, wherein the to-be-encrypted data of the identity information ciphertext of the REQ further comprises an identity identifier of the REQ,
 the to-be-encrypted data of the identity information ciphertext of the AAC further comprises an identity identifier of the AAC and a first protection nonce,
 the first authentication request message further comprises the identity identifier of the REQ, wherein the identity identifier of the REQ is obtained by decrypting the identity information ciphertext of the REQ by the AAC using the message encryption key;
 the first authentication response message correspondingly further comprises the identity identifier of the REQ and identity identifier ciphertext of the AAC, and the identity identifier ciphertext of the AAC is generated by encrypting information comprising the identity identifier of the AAC using the first protection nonce;
 wherein the method further comprises: before the determining, by the AAC, the identity authentication result of the REQ,
 verifying, by the AAC, the identity identifier ciphertext of the AAC according to the identity identifier of the AAC and the first protection nonce, and determining, by the AAC, the identity authentication result of the REQ in response to the verification being successful,
 wherein the to-be-encrypted data of the authentication result information ciphertext in the third authentication response message further comprises the identity identifier of the REQ, and the method further comprises:
 before the determining, by the REQ, the identity authentication result of the AAC,
 decrypting, by the REQ, the authentication result information ciphertext to obtain the identity identifier of the REQ, and verifying, by the REQ, whether the identity identifier is consistent with an own identity identifier of the REQ, and determining, by the REQ, the identity authentication result of the AAC in response to the verification being successful.

9. The method of claim 1, wherein the to-be-encrypted data of the identity information ciphertext of the AAC further comprises a second protection nonce, and the first authentication result information ciphertext is obtained by encrypting information comprising the first authentication result information using the second protection nonce;
 the to-be-encrypted data of the authentication result information ciphertext in the third authentication response message further comprises the second protection nonce; and
 the REQ decrypts the authentication result information ciphertext by using the message encryption key, to obtain the second protection nonce, and decrypts the first authentication result information ciphertext by using the second protection nonce, to obtain the first authentication result information.

10. The method of claim 1, further comprising: before the determining, by the REQ, the identity authentication result of the AAC,
 determining, by the REQ, whether verification for a digital signature of the AAC is successful; and determining, by the REQ, the identity authentication result of the AAC in response to the verification for the digital signature of the AAC being successful.

11. The method of claim 10, wherein the determining, by the REQ, whether verification for a digital signature of the AAC is successful comprises:
 in response to the first authentication request message further comprises the digital signature of the AAC, verifying, by the first AS, the digital signature of the AAC by using the digital certificate of the AAC obtained by decrypting the identity information ciphertext of the AAC, and determining, by the REQ, that the verification for the digital signature of the AAC is successful in response to the third authentication response message being received by the REQ; or
 in response to the third authentication response message further comprising the digital signature of the AAC, the first authentication result information obtained by decrypting the first authentication result information ciphertext by the REQ further comprising a digital certificate of the AAC, verifying, by the REQ, the digital signature of the AAC by using the digital certificate of the AAC obtained by decryption, and determining, by the REQ according to a verification result, whether the verification for the digital signature of the AAC is successful.

12. The method of claim 1, wherein the identity ciphertext message further comprises a digital signature of the REQ, and the method further comprises: before the determining, by the AAC, the identity authentication result of the REQ, determining, by the AAC, whether verification for the digital signature of the REQ is successful; and determining, by the AAC, the identity authentication result of the REQ in response to the verification of the digital signature of the REQ being successful.

13. The method of claim 12, wherein the determining, by the AAC, whether verification for the digital signature of the REQ is successful comprises:
verifying, by the AAC, the digital signature of the REQ by using the digital certificate of the REQ obtained by decrypting the identity information ciphertext of the REQ, and determining, by the AAC, according to a verification result, whether the verification for the digital signature of the REQ is successful; or
verifying, by the second AS, the digital signature of the REQ by using the digital certificate of the REQ, and determining that the verification for the digital signature of the REQ is successful in response to the first authentication response message being received by the AAC; or
in response to the second authentication result information further comprising the digital certificate of the REQ, verifying, by the AAC, the digital signature of the REQ by using the digital certificate of the REQ in the second authentication result information is consistent with after receiving the first authentication response message, and determining, according to a verification result, whether the verification of the digital signature of the REQ is successful; or
in response to the second authentication result information further comprising the digital certificate of the REQ, verifying, by the AAC, whether the digital certificate of the REQ in the second authentication result information is consistent with the digital certificate of the REQ obtained by decrypting the identity information ciphertext of the REQ, verifying, by the AAC, the digital signature of the REQ by using the digital certificate of the REQ in response to the digital certificate of the REQ in the second authentication result information being consistent with the digital certificate of the REQ, and determining, according to a verification result, whether the verification of the digital signature of the REQ is successful.

14. The method of claim 2, wherein
the third authentication response message further comprising a message integrity check code, wherein the message integrity check code is generated by calculating fields in the third authentication response message other than the message integrity check code by the AAC using a message integrity check key, and a manner of generating the message integrity check key by the AAC is the same as that of generating the message encryption key by the AAC, and
the method further comprises: verifying, by the REQ, the message integrity checkcode by using the message integrity check key, and determining, by the REQ, the identity authentication result of the AAC in response to the verification being successful, wherein a manner of generating the message integrity check key by the REQ is the same as that of generating the message encryption key by the REQ.

15. The method of claim 1, wherein the first AS trusted by the AAC and the second AS trusted by the REQ are a same AS, and the method further comprises: before the first AS sends the first authentication response message,
performing, by the first AS, legality verification on the digital certificate of the AAC obtained by decrypting the identity information ciphertext of the AAC using a private key corresponding to the encryption certificate, to obtain the first verification result, performing, by the first AS, legality verification on the digital certificate of the REQ, to obtain the second verification result, generating the first authentication result information according to information comprising the first verification result, generating the first authentication result information ciphertext, generating the second authentication result information according to information comprising the second verification result, calculating the to-be-signed data comprising the first authentication result information ciphertext to generate the first digital signature, calculating the to-be-signed data comprising the second authentication result information to generate the second digital signature, and generating the first authentication response message according to information comprising the first authentication result information ciphertext, the first digital signature, the second authentication result information and the second digital signature.

16. The method of claim 1, wherein the first AS trusted by the AAC and the second AS trusted by the REQ are different Ass, and the method further comprises: before the first AS sends the first authentication response message,
performing, by the first AS, legality verification on the digital certificate of the AAC obtained by decrypting the identity information ciphertext of the AAC using the private key corresponding to the encryption certificate, to obtain the first verification result, generating the first authentication result information according to the information comprising the first verification result, and generating the first authentication result information ciphertext;
sending, by the first AS, a second authentication request message to the second AS, wherein the second authentication request message comprises the first authentication result information ciphertext, the digital certificate of the REQ, and a third digital signature, and the third digital signature is a digital signature generated by calculating, by the first AS, to-be-signed data comprising the first authentication result information ciphertext and the digital certificate of the REQ;
verifying, by the second AS, the third digital signature, performing legality verification on the digital certificate of the REQ after the verification is successful, to obtain the second verification result, generating the second authentication result information according to the information comprising the second verification result, sending a second authentication response message to the first AS, wherein the second authentication response message comprises the first authentication result information ciphertext, the first digital signature, the second authentication result information and a fourth digital signature, and the fourth digital signature is a digital signature generated by calculating the to-be-signed data comprising the second authentication result information by the second AS; and
receiving, by the first AS, the second authentication response message, verifying the fourth digital signature by using the public key of the second AS, and calculating, by the first AS, the to-be-signed data comprising the second authentication result information in response to the verification being successful, to generate the second digital signature, and generating the first authentication response message according to information comprising the first authentication result information ciphertext, the first digital signature, the second authentication result information and the second digital signature.

17. The method of claim 1, wherein the message sent to the AAC by the REQ further comprises a hash value calculated by the REQ for a received latest preceding message sent by the AAC, and upon receiving the message sent by the REQ, the AAC verifies the hash value in the received message, and executes following operations after the verification is successful;
the message sent to the REQ by the AAC further comprises a hash value calculated by the AAC for a received latest preceding message sent by the REQ, and upon receiving the message sent by the AAC, the REQ verifies the hash value in the received message, and executes following operations after the verification is successful;
the message sent to the first AS by the AAC further comprises a hash value calculated by the AAC for a received latest preceding message sent by the first AS, and upon receiving the message sent by the AAC, the first AS verifies the hash value in the received message, and executes following operations after the verification is successful;
the message sent to the AAC by the first AS further comprises a hash value calculated by the first AS for a received latest preceding message sent by the AAC, and upon receiving the message sent by the first AS, the AAC verifies the hash value in the received message, and executes following operations after the verification is successful;
the message sent to the second AS by the first AS further comprises a hash value calculated by the first AS for a received latest preceding message sent by the second AS, and upon receiving the message sent by the first AS, the second AS verifies the hash value in the received message, and executes following operations after the verification is successful; and
the message sent to the first AS by the second AS further comprises a hash value calculated by the second AS for a received latest preceding message sent by the first AS, and upon receiving the message sent by the second AS, the first AS verifies the hash value in the received message, and executes following operations after the verification is successful.

18. An authentication access controller (AAC) comprising a processor and a memory, wherein the memory is configured to store a computer program, and the processor is configured to call and run the computer program stored in the memory, to execute following operations:
acquiring an identity ciphertext message sent by a requester (REQ), wherein the identity ciphertext message comprises identity information ciphertext of the REQ, and the identity information ciphertext of the REQ is obtained by encrypting to-be-encrypted data including a digital certificate of the REQ using a message encryption key;
sending a first authentication request message to a first Authentication Server (AS) trusted by the AAC, wherein the first authentication request message comprises identity information ciphertext of the AAC and the digital certificate of the REQ, the identity information ciphertext of the AAC is obtained by encrypting to-be-encrypted data including a digital certificate of the AAC using a public key of an encryption certificate, and the digital certificate of the REQ is obtained by decrypting the identity information ciphertext of the REQ by the AAC using the message encryption key:
receiving a first authentication response message sent by the first AS, wherein the first authentication response message comprises first authentication result information ciphertext, a first digital signature, second authentication result information and a second digital signature, the first authentication result information ciphertext is obtained by encrypting information comprising first authentication result information, the first authentication result information comprises a first verification result for the digital certificate of the AAC, the first digital signature is a digital signature generated by calculating to-be-signed data comprising the first authentication result information ciphertext by a second AS trusted by the REQ, the second authentication result information comprises a second verification result for the digital certificate of the REQ, and the second digital signature is a digital signature generated by calculating to-be-signed data comprising the second authentication result information by the first AS; and
performing one of:
verifying the second digital signature by using a public key of the first AS, determining an identity authentication result of the REQ according to the second verification result in the second authentication result information in response to the verification being successful, sending a third authentication response message to the REQ in response to the identity authentication result indicating that the REQ is legal; or
verifying the second digital signature by using the public key of the first AS, sending the third authentication response message to the REQ in response to the verification being successful, and determining the identity authentication result of the REQ according to the second verification result in the second authentication result information; or
verifying the second digital signature by using the public key of the first AS, determining the identity authentication result of the REQ according to the second verification result in the second authentication result information in response to the verification for the second digital signature being successful, and sending the third authentication response message to the REQ,
wherein the third authentication response message comprises authentication result information ciphertext, and the authentication result information ciphertext is generated by encrypting to-be-encrypted data comprising the first authentication result information ciphertext and the first digital signature using the message encryption key, and
upon receiving the third authentication response message, the REQ decrypts the authentication result information ciphertext using the message encryption key, to obtain the first authentication result information ciphertext and the first digital signature, verifies the first digital signature by using a public key of the second AS, and determines, in response to the verification being successful, an identity authentication result of the AAC according to the first verification result in the first authentication result information obtained by decrypting the first authentication result information ciphertext.

19. A requester (REQ) comprising a processor and a memory, wherein the memory is configured to store a computer program, and the processor is configured to call and run the computer program stored in the memory, to execute following operations:

sending an identity ciphertext message to an Authentication Access Controller (AAC), wherein the identity ciphertext message comprises identity information ciphertext of the REQ, and the identity information ciphertext of the REQ is obtained by encrypting to-be-encrypted data including a digital certificate of the REQ using a message encryption key;

receiving a third authentication response message sent by the AAC, wherein the third authentication response message comprises authentication result information ciphertext, the authentication result information ciphertext is generated by encrypting to-be-encrypted data comprising first authentication result information ciphertext and a first digital signature using the message encryption key, the first authentication result information ciphertext is obtained by encrypting information comprising the first authentication result information, and the first authentication result information comprises a first verification result for a digital certificate of the AAC;

decrypting the authentication result information ciphertext using the message encryption key, to obtain the first authentication result information ciphertext and the first digital signature;

verifying the first digital signature by using a public key of a second Authentication Server (AS); and determining, in response to the verification for the first digital signature being successful, an identity authentication result of the AAC according to the first verification result in the first authentication result information obtained by decrypting the first authentication result information ciphertext.

20. A first authentication server (AS) trusted by an authentication access controller (AAC) and comprising a processor and a memory, wherein the memory is configured to store a computer program, and the processor is configured to call and run the computer program stored in the memory, to execute following operations:

receiving a first authentication request message sent by the AAC, wherein the first authentication request message comprises identity information ciphertext of the AAC and a digital certificate of a Requester (REQ), the identity information ciphertext of the AAC is generated by encrypting to-be-encrypted data comprising a digital certificate of the AAC using a public key of an encryption certificate; and sending a first authentication response message to the AAC, wherein the first authentication response message comprises first authentication result information ciphertext, a first digital signature, second authentication result information and a second digital signature, the first authentication result information ciphertext is obtained by encrypting information comprising first authentication result information, the first authentication result information comprises a first verification result for the digital certificate of the AAC, the first digital signature is a digital signature generated by calculating to-be-signed data comprising the first authentication result information ciphertext by a second AS trusted by the REQ, the second authentication result information comprises a second verification result for the digital certificate of the REQ, and the second digital signature is a digital signature generated by calculating to-be-signed data comprising the second authentication result information by the first AS.

* * * * *